United States Patent
Arita et al.

(10) Patent No.: US 6,188,388 B1
(45) Date of Patent: *Feb. 13, 2001

(54) INFORMATION PRESENTATION APPARATUS AND INFORMATION DISPLAY APPARATUS

(75) Inventors: Setsuo Arita, Hitachiota; Yukiharu Ohga, Katsuta; Hiroyuki Yuchi; Hiroshi Seki, both of Hitachi; Yukio Nagaoka, Ibaraki-ken; Koichi Kawaguchi; Akira Kaji, both of Hitachi, all of (JP)

(73) Assignee: Hitachi, Ltd., Tokyo (JP)

( * ) Notice: Under 35 U.S.C. 154(b), the term of this patent shall be extended for 0 days.

This patent is subject to a terminal disclaimer.

(21) Appl. No.: 09/061,113

(22) Filed: Apr. 16, 1998

Related U.S. Application Data

(60) Continuation of application No. 08/484,814, filed on Jun. 7, 1995, which is a division of application No. 08/301,141, filed on Sep. 6, 1994, now Pat. No. 5,712,658.

(30) Foreign Application Priority Data

Dec. 28, 1993 (JP) .................................................. 5-334907
Dec. 28, 1993 (JP) .................................................. 5-349391
Mar. 18, 1994 (JP) .................................................. 6-048234

(51) Int. Cl.$^7$ ............................... G09G 5/08; G09G 5/00
(52) U.S. Cl. ......................... 345/158; 345/145; 345/179
(58) Field of Search ........................... 345/87, 145, 119, 345/156, 157, 158, 166, 340, 173–183; 178/18, 18.01, 18.09, 19, 19.01–19.05; 273/148 B; 340/706, 707; 341/157; 348/734; 356/375; 434/324, 325, 337; 463/37–39

(56) References Cited

U.S. PATENT DOCUMENTS

| | | | |
|---|---|---|---|
| 4,862,172 | * 8/1989 | Ross | 341/157 |
| 5,115,230 | * 5/1992 | Smoot | 345/9 |
| 5,181,015 | * 1/1993 | Marshall et al. | 340/706 |
| 5,287,119 | * 2/1994 | Drumm | 345/158 |
| 5,341,155 | * 8/1994 | Elrod et al. | 345/179 |
| 5,448,261 | * 9/1995 | Koike et al. | 345/158 |
| 5,488,391 | * 1/1996 | Favot et al. | 345/156 |
| 5,548,304 | * 8/1996 | Yoshino et al. | 345/145 |
| 5,712,658 | * 1/1998 | Arita et al. | 345/158 |
| 5,835,078 | * 11/1998 | Arita et al. | 345/158 |
| 5,880,726 | * 3/1999 | Takiguchi et al. | 345/340 |
| 5,999,171 | * 12/1999 | Goff et al. | 345/180 |

FOREIGN PATENT DOCUMENTS

| | | |
|---|---|---|
| 61-114329 | 6/1986 | (JP) . |
| 2-207303 | 8/1990 | (JP) . |
| 3-179517 | 8/1991 | (JP) . |
| 4-037922 | 2/1992 | (JP) . |
| 4-123122 | 4/1992 | (JP) . |
| 5-150901 | 6/1993 | (JP) . |
| 5-280927 | 10/1993 | (JP) . |
| 6-035607 | 2/1994 | (JP) . |

OTHER PUBLICATIONS

Newton, vol. 1, 11, No. 12, pp. 104–107, 1991 Fall.

* cited by examiner

Primary Examiner—Vijay Shankar
Assistant Examiner—Jeff Piziali
(74) Attorney, Agent, or Firm—Kenyon & Kenyon

(57) ABSTRACT

A pointer remotely points a display screen of a large screen display device. The display screen is picked up by a monitor camera. An image processing unit extracts a feature of the pointer used for pointing based on the resulting image signal to identify the position of the pointing point and the pointer based on the feature. A computer generates information on an object to be displayed at a position pointed by the pointer. The generated information is displayed on a display device (CRT display device or large screen display device) assigned to the pointer. Even when a plurality of pointers are used, the information on the object to be displayed pointed by the pointer is properly displayed.

12 Claims, 61 Drawing Sheets

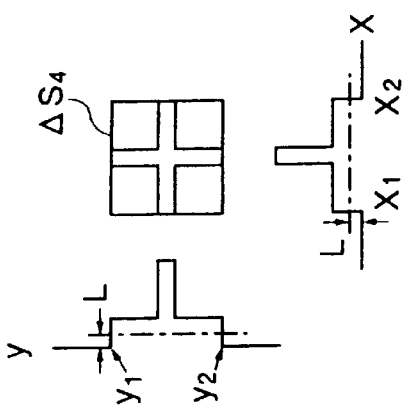
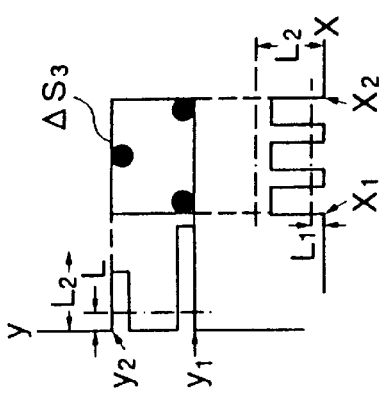
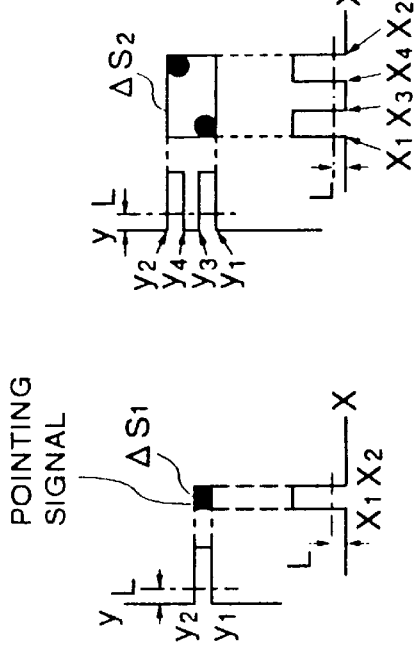
FIG.4A (a) 1-DOT TYPE
FIG.4B (b) 2-DOT TYPE
FIG.4C (c) 3-DOT TYPE
FIG.4D (d) CROSS TYPE

1-DOT TYPE   2-DOT TYPE   4-DOT TYPE   5-DOT TYPE

FIG.15

| PROCESS | INPUT COMMAND |
|---|---|
| DISPLAY SYSTEM DIAGRAM | (SYS_DIA  SYSTEM DIAGRAM NAME  POINTER NUMBER) |
| DISPLAY TREND CHART | (TREND  TREND CHART NAME  POINTER NUMBER) |
| DELETE WINDOW | (DEL  WINDOW NAME  POINTER NUMBER) |
| MOVE WINDOW | (MOVE  WINDOW NAME  MOVE-TO COORDINATE  POINTER NUMBER) |
| POP WINDOW | (POP  WINDOW NAME  POINTER NUMBER) |
| PUSH WINDOW | (PUSH  WINDOW NAME  POINTER NUMBER) |

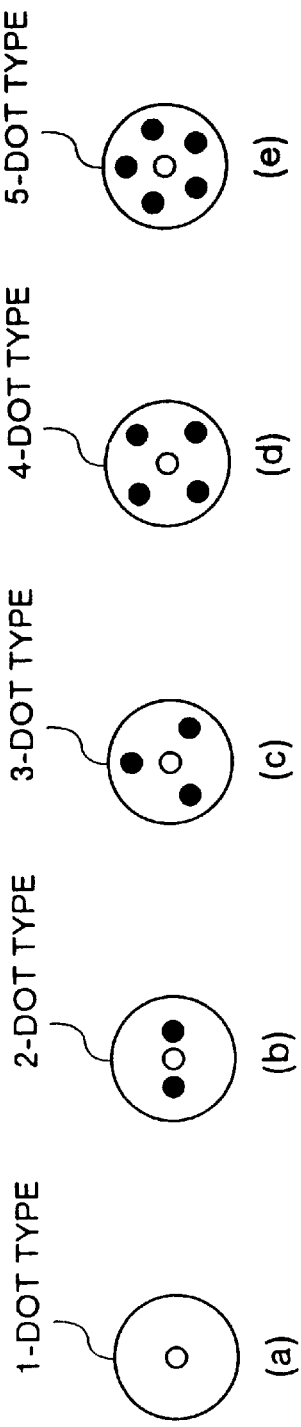
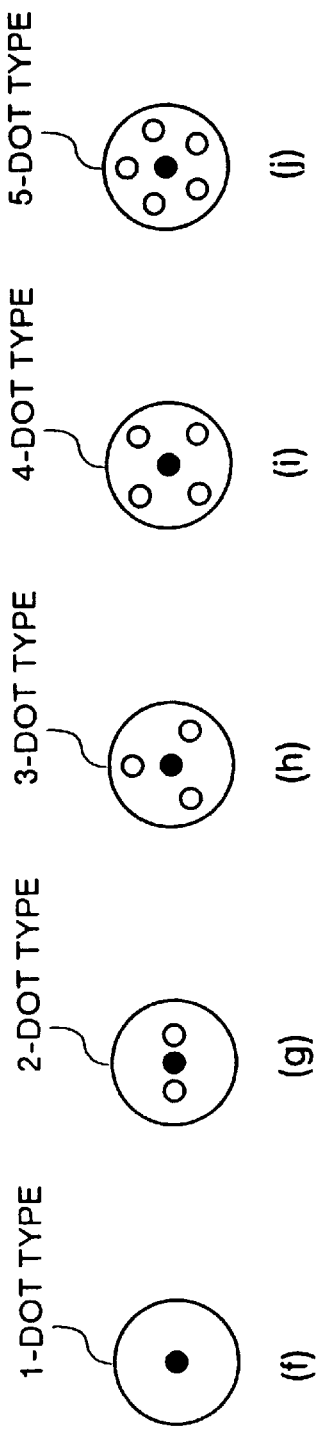

⟨WATER SUPPLY SYSTEM⟩

| ALARM NAME | TIME OF OCCURRENCE |
| --- | --- |
| 1. MDRFP-A TRIP | 17 : 35 : 01 |
| 2. MDRFP-A SUCTION FLOW RATE LOW | 17 : 35 : 03 |

16A1~16AN ⋯ AUDIO INPUT UNITS
27A1~27AN ⋯ IDENTIFICATION SYMBOLS

| COORDINATE OF POINTING DISPLAY POSITION OF MARKER || COORDINATE OF POSITION OF IMAGE OF MARKER IN IMAGE ON DISPLAY SCREEN ||
|---|---|---|---|
| X | Y | x | y |
| 0 | 800 | 5 | 775 |
| 50 | 800 | 23 | 781 |
| 100 | 800 | 51 | 787 |
| : | : | : | : |

[1] WATER SUPPLY SYSTEM DIAGRAM

| START POINT OF POINTING AREA | | SIZE OF POINTING AREA | | OUTPUT CHARACTER STRING |
|---|---|---|---|---|
| Xr COOR-DINATE | Yr COOR-DINATE | WIDTH | HEIGHT | |
| 500 | 325 | 10 | 10 | CONDENSATING PUMP A |
| 500 | 300 | 10 | 10 | CONDENSATING PUMP B |
| 10 | 750 | 50 | 5 | NUCLEAR REACTOR WATER LEVEL |
| 10 | 700 | 500 | 5 | NUCLEAR REACTOR PRESSURE |
| : | : | : | : | : |

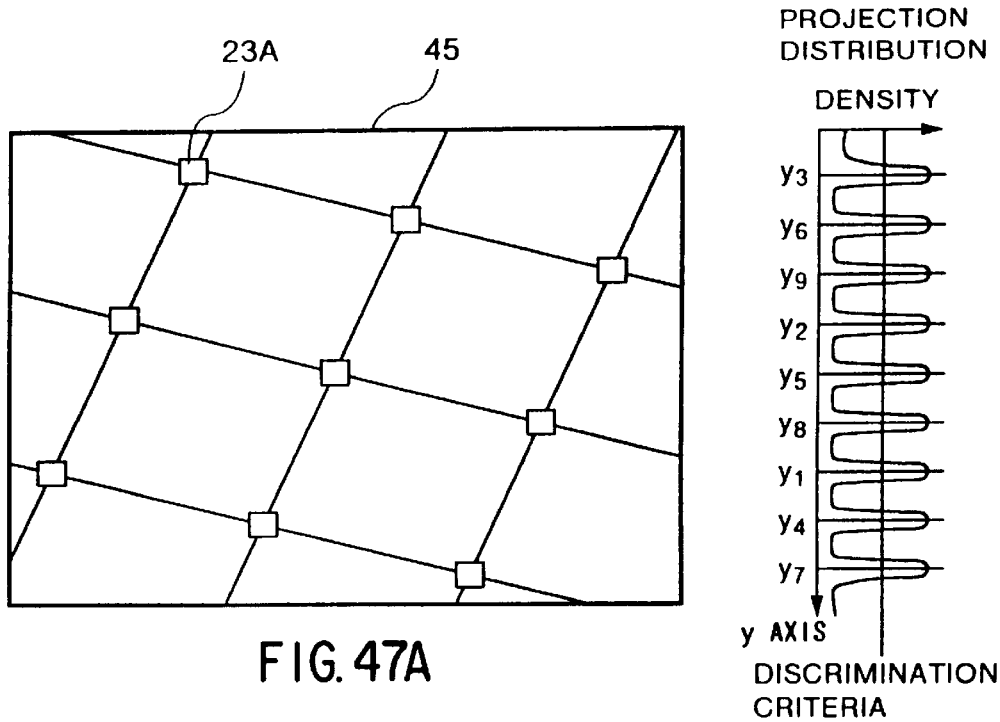
FIG. 47A
FIG. 47B
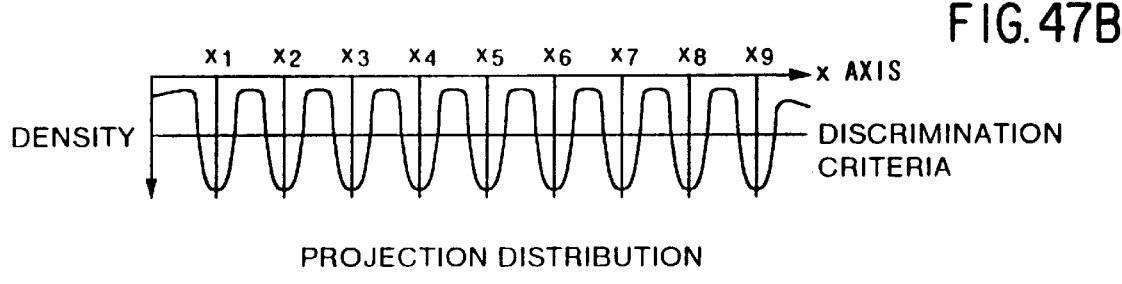
FIG. 47C

FIG.50

| $x_i$ \ $y_i$ | i = 1 | 2 | ... | I |
|---|---|---|---|---|
| j = 1 | (10,20) | (51,20) | ... | (501,20) |
| 2 | (11,42) | (52,45) | ... | (502,43) |
| 3 | (12,73) | (54,77) | ... | (503,75) |
| 4 | (12,100) | (55,108) | ... | (505,98) |
| ⋮ | ⋮ | ⋮ | ... | ⋮ |
| J | (10,490) | (50,491) | ... | (501,493) |

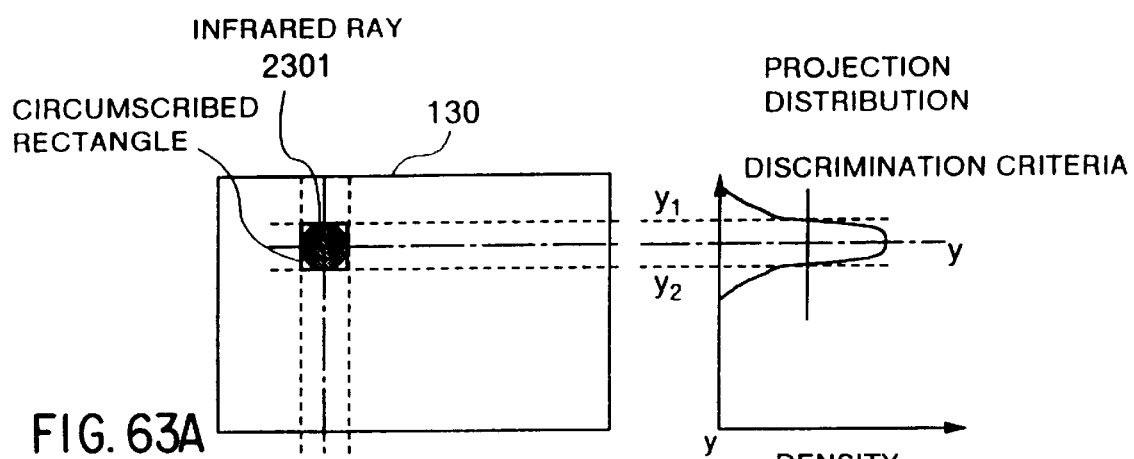
FIG. 63A
FIG. 63B
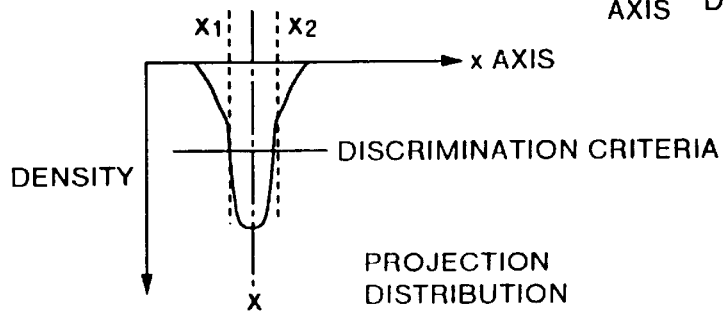
FIG. 63C

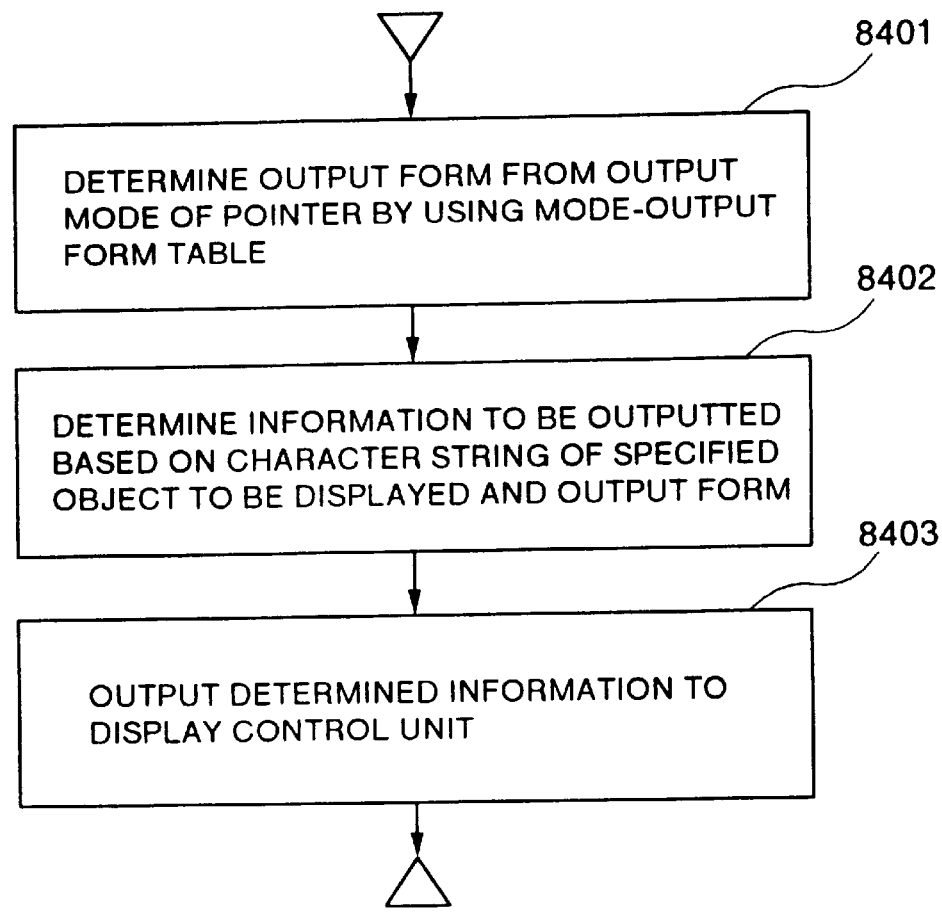

FIG.66A

| POINTED OBJECT | OUTPUT FORM | OUTPUT INFORMATION |
|---|---|---|
| TURBINE | SYSTEM DIAGRAM | TURBINE SYSTEM DIAGRAM |
| | TREND CHART | TURBINE ROTATING SPEED TURBINE CHART |
| | | TURBINE SHAFT VIBRATION AMPLITUDE TREND CHART |
| | ITV IMAGE | ITV CAMERA #21 IMAGE |
| ⋮ | ⋮ | ⋮ |

FIG.66B

| POINTED OBJECT | INFORMATION ITEM | OUTPUT INFORMATION |
|---|---|---|
| TURBINE | ROTATING SPEED | TURBINE ROTATING SPEED TREND CHART |
| | SHAFT VIBRATION | TURBINE SHAFT VIBRATION AMPLITUDE TREND CHART |
| | ⋮ | ⋮ |
| GENERATOR | ROTATING SPEED | GENERATOR ROTATING SPEED TREND CHART |
| | ⋮ | ⋮ |

FIG.66C

| POINTED OBJECT | INFORMATION ITEM | OUTPUT INFORMATION |
|---|---|---|
| TURBINE | FOR OPERATOR | TURBINE START PROCEDURE |
| | FOR MAINTENANCE | TURBINE MAINTENANCE PROCEDURE |
| | FOR MANAGER | TURBINE ROTATING SPEED TREND CHART |
| ⋮ | ⋮ | ⋮ |

| MODE No. | OUTPUT DEVICE |
|---|---|
| 1 | LARGE SCREEN DISPLAY DEVICE |
| 2 | CRT #1 |
| 3 | CRT #2 |

INFORMATION PRESENTATION APPARATUS AND INFORMATION DISPLAY APPARATUS

This is a continuation of U.S. patent application Ser. No. 08/484,814, filed Jun. 7, 1995 which is a division of U.S. patent application Ser. No. 08/301,141, filed Sep. 6, 1994, now U.S. Pat. No. 5,712,658, the entirety of which is incorporated by reference herein.

BACKGROUND OF THE INVENTION

The present invention relates to an information presentation apparatus and an information display apparatus, and more particularly to information presentation apparatus and display apparatus suitable for use in a system having a large screen display apparatus and a small screen display apparatus.

Recently, the information presentation using a display apparatus with a large display screen (including a mimic display apparatus) has been practiced or planned in the operation control in a power generation plant or a chemical plant, , the information presentation in a financial organization or a securities organization, and the presentation in a conference. It has been desired to be able to remotely designate information to be displayed on a large screen display apparatus and provide information to the designated object to be displayed.

As technologies to cope with such a demand, a pointing device apparatus and an input method disclosed in JP-A-3-179517 and a presentation apparatus disclosed in JP-A-4-37922 have been proposed.

In JP-A-3-179517, an infrared ray projector is used to remotely point a display screen of a large screen display apparatus, the pointing point is detected based on an output signal from a monitor camera which monitors the display screen, and a marker indicating the pointing of that point is displayed on the large screen display apparatus. Further, an entered command is executed by using separately provided command execution means for the pointed object to be displayed.

In JP-A-4-37922, a desired area on an image projected on a screen or wall is pointed by a pointing bar with a light emitter, the pointing area is detected based on an output signal of a video camera which monitors the screen and the image information is changed.

JP-A-4-123122 discloses an input apparatus having a sensor, an electronic equipment and a display device. In this input apparatus, as shown in 4, a piano keyboard, for example, is displayed on the display device by using a floppy disk which stores game software. A user who wants to play a piano attaches a pointer on each of his/her fingers and moves his/her fingers in accordance with the key positions. Each pointer outputs a light of different wavelength. The sensor senses each of the light emitting positions of the lights of different wavelengths and displays it as a cursor on the display screen of the display device. The cursor is displayed on the keyboard as the finger of the player moves so that a sound corresponding to the key is generated. Such processing is effected by a computer. For example, when three fingers are moved to display cursors simultaneously at keys do, mi and so, harmonic sound of do, mi and so is generated.

In the techniques disclosed in JP-A-3-17951 and JP-A-4-37922, a single pointer (infrared ray projector or pointing bar) is used. When a plurality of such pointers are used, it is not possible to identify which pointer points which area on the display screen. Accordingly, it is not possible to use a plurality of pointers to cause the pointing area or object to discriminately execute the command.

JP-A-4-123122 solves the above problem by using a plurality of pointers which output different pointing signals (different wavelengths). Namely, a pointer which points a key is detected by detecting the wavelength of the light. A sound of the key pointed by the discriminated pointer is outputted. However, since the light outputted from the pointer is directly detected, the key pointed by the pointer cannot be precisely designated by the keyboard displayed on the display device. As a result, the information requested by the pointing by the pointer cannot be precisely provided in a simple manner.

SUMMARY OF THE INVENTION

It is a first object of the present invention to provide an information presentation apparatus capable of presenting designated information even when a plurality of pointers are used.

It is a second object of the present invention to provide an information presentation apparatus which improves user operability in acquiring information.

It is a third object of the present invention to provide an information presentation apparatus which can precisely present information relating to an object to be displayed pointed by each pointer even when a plurality of pointers are used.

It is a fourth object of the present invention to provide an information display apparatus which improves user operability in acquiring information.

It is a fifth object of the present invention to provide an information display apparatus which can readily generate position calibration information which reflects a distortion due to an install position of image pickup means and an aberration of a lens system of the image pickup means.

It is a sixth object of the present invention to provide an information display apparatus which can reduce the affect of the distortion due to the install position of the image pickup means and the aberration of the lens system of the image pickup means to precisely determine the pointing point.

The first object is achieved by providing a display device, a plurality of pointers having different pointing signals from each other for pointing a display screen of said display device by the pointing signal, identification means for identifying said pointer, object specifying means for specifying an object to be displayed displayed on said display screen, and output means for outputting the identification information of the pointer and the information derived based on the specified object to be displayed.

The second object is achieved by providing display devices, a plurality of pointers having different pointing signals from each other for pointing a display screen of said display device by the pointing signa, image pickup means for picking up an image of said display screen to output an image signal, identification means for identifying the pointer which points said display screen, object specifying means for specifying an object to be displayed displayed on said display screen, display information selection means for selecting display information based on the information of the specified object to be displayed, and output means for generating the selected display information and outputting the display information to the display device corresponding the identified pointer.

The third object is achieved by providing a display device, means for detecting a pointing signal arriving onto a display screen of said display device, means for identifying a pointer which outputted the pointing signal based on the pointing signal detected by said detection means, object specifying means for specifying an object to be displayed displayed on said display screen, and output means for outputting the identification information for the pointer and the information derived based on the specified object to be displayed.

The pointer which outputs the pointing signal is identified based on the pointing signal arrived on the display screen of the display device and the object to be displayed displayed on the display screen, pointed by the pointing signal is specified. Accordingly, the identification of the pointers is readily made and the pointed object to be displayed can be precisely specified. Accordingly, the information on the object to be displayed, pointed for by each pointer can be readily and positively provided.

The fourth object is achieved by providing a display device, a plurality of pointers having different pointing signals from each other for pointing a display screen of said display device by the pointing signal, identification means for identifying said pointer, object specifying means for specifying an object to be displayed displayed on said display screen, and output means for outputting the identification information of the pointer and the information derived based on the specified object to be displayed.

In accordance with this feature, since the display device which displays the information is specified by the pointer, the information may be displayed on the display device corresponding to the pointer based on the identification information on the pointer and the user operability to acquire the information is improved.

The fifth object is achieved by generating display information of a mark to be displayed at a specified position in an area in which the image of said display screen is displayed and outputting the display information to said display device, determining the position of the image of the mark in the image of the area picked up by said image pickup means, and generating position calibration information by using the information on the plurality of pointing points and the positions of the corresponding mark images.

Since the position calibration information is generated by using the information on the pointing points in the area in which the image of the display screen of the display device is displayed and the position of the images of marks in the image of the area picked up by the image pickup means, the position calibration information reflecting the distortion of the image in the area due to the installation position of the image pickup means and the aberration of the lens of the image pickup means can be readily generated. Since the display information of the mark is displayed in the area in which the image of the display screen of the display device is displayed, any position in the area may be specified as the display position of the display information of the mark and the generation of the position calibration information reflecting the distortion of the image in the area is facilitated.

The sixth object is achieved by, in addition to the above features, correcting the position of the image of the pointing point by the pointing signal in the image of the area picked up by the image pickup means by using the position calibration information when the pointing signal outputted from the pointing means points within the area to determine the position of the pointing point in the area.

Since the position of the image of the pointing point by the pointing signal in the image of the area is corrected by using the position calibration information when the pointing signal outputted from the pointing means points within the area, the position of the pointing point in the area is corrected by reflecting the distortion of the image of the area due to the installation position of the image pickup means and the aberration of the leans of the image pickup means. Accordingly, the position of the pointing point in the area determined by the correction is less affected by the distortion due to the installation position of the image pickup means and the aberration of the lens and the precision is improved.

BRIEF DESCRIPTION OF THE DRAWINGS

FIG. 15 shows a display screen switch command, FIGS. 19A–19J show configurations of light exit planes of the pointer of FIG. 18, FIG. 43 illustrates a process executed by an object identification unit of FIG. 36, FIG. 50 illustrates configuration data prepared by the pointed position calibration unit of FIG. 49, FIG. 64 illustrates a process of a command recognition unit of FIG. 59, FIG. 65 illustrates a content of a pointer output mode versus output format table, FIGS. 66A–66C illustrate contents of an output information management table.

DETAILED DESCRIPTION

Figure 1:
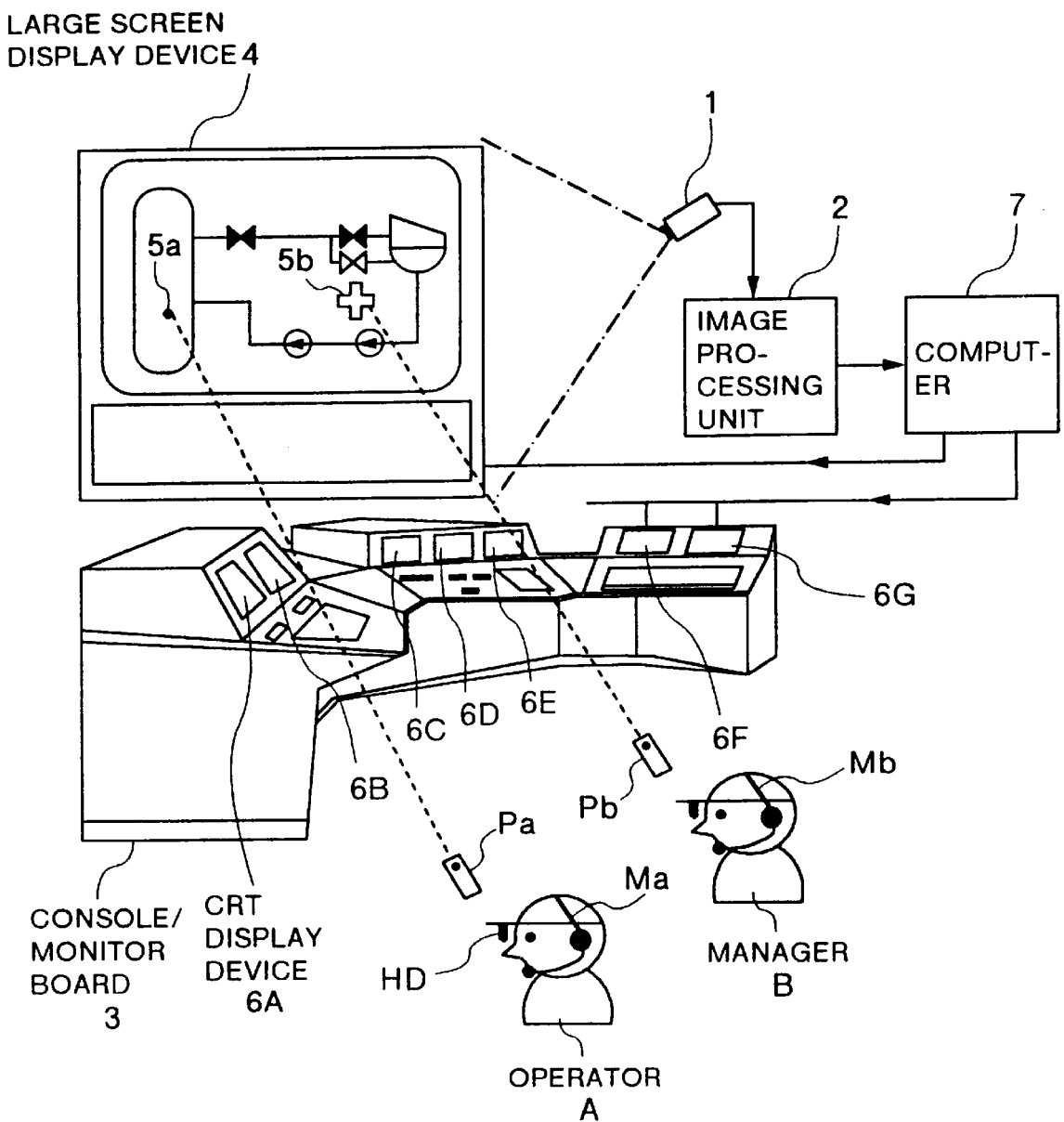
FIG. 1 shows a configuration of a console/monitor unit in accordance with one embodiment of the present invention.
Figure 2:
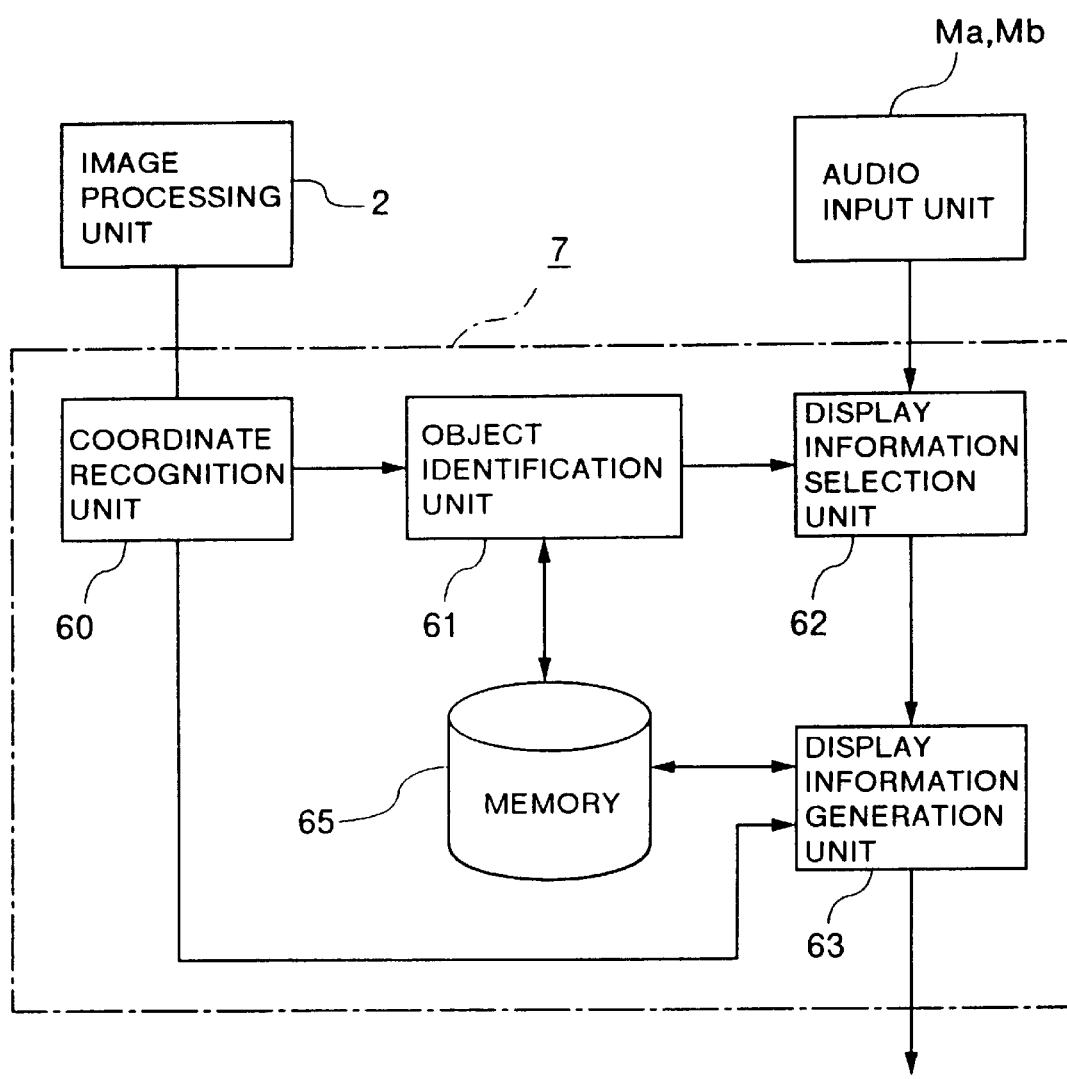
FIG. 2 shows a detailed configuration illustrating functions in a computer of FIG. 1.

Referring to FIGS. 1 and 2, a console/monitor unit in accordance with a preferred embodiment of the present invention is explained.

The present embodiment comprises a monitoring camera 1, an image processing unit 2, a computer 7, a large screen display device 4, CRT display devices 6A–6G and pointers Pa and Pb. The CRT display devices 6A–6G are provided on a console/monitor board 3 which has a operation and a function required for operators (normally a plurality of operators) A to monitor an operation of a plant (not shown). Operation information necessary for each of the operators A are displayed on the CRT display devices 6A–6G. The large screen display device 4 is arranged behind the console/monitor board 3 and has a larger display area than the display screen of the CRT display devices 6A–6G.

The computer 7 executes processes of a coordinate recognition unit 60, an object identification unit 61, a display information discrimination unit 62 and a display information generation unit 63 shown in FIG. 2.

In this configuration, the operator A can grasp display information of the CRT display devices 6A–6G provided on the console/monitor board 3 as well as information of the entire plant displayed on the large scale display device 4. A person B who is responsible to manage the entire plant (hereinafter referred to as a manager) can grasp the information displayed on the large screen display device 4. Thus, the grasping of the information, that is, the monitoring of the plant is enhanced.

The operators A use the pointer Pa and the manager B uses the pointer Pb. Through a remote control from the pointer Pb, the modification of the information displayed on the large screen display device 4 and the display of more detailed information on a portion of the information displayed on the large screen display device 4 onto a portion of the large screen display device 4 are effected. Through a remote control from the pointer Pa, the display of more detailed information on part of the information displayed on the large screen display device 4 onto one of the CRT display devices 6A–6G and a portable display device HD is effected. This is enabled by associating the respective pointers with the display devices 4, 6A–6G and HD.

In order to monitor which portions of the large screen display device 4 are pointed by pointing signals outputted from the pointers Pa and Pb, the monitor camera 1 and the image processing apparatus 2 are provided. In order to identify which pointing signal of the pointer points the large screen display device 4, the pointing signals or the exit lights outputted from the pointers Pa and Pb have different shapes. In FIG. 1, the pointer Pa emits a dot shaped light as the pointing signal, and the pointer Pb emits a cross shaped light as the pointing signal. Markers 5a and 5b corresponding to the shapes of the lights emitted to the positions pointed by the pointers Pa and Pb are displayed on the display screen of the large scale display device 4 as will be explained later. Thus, the operator A and the manager B can recognize the pointed positions of the pointers by watching the display screen of the large screen display device 4. The lights emitted from the pointers Pa and Pb are infrared laser beams.

An operation of the console/monitor unit of the present embodiment when the manager B emits the cross shaped infrared laser beam which is the pointing signal from the pointer Pb to point a point on the display screen of the large screen display device 4 is now explained.

In the console/monitor unit of the present embodiment, the turn-off of the infrared laser beam outputted from the pointer is regarded as an input of the pointing signal. The monitor camera (infrared ray camera) 1 picks up the display screen of the large screen display device 4. The monitor camera 1 comprises means for detecting the pointing signal arrived to the display screen of the large screen display device 4. The infrared video signal outputted from the monitor camera 1 contains the cross shaped infrared laser beam image which is the pointing signal outputted from the pointer Pb in the large screen display device 4 and it is supplied to the image processing unit 2. The infrared laser is used because (1) the coordinate of the pointed point by the pointing signal from the pointer, recognized by the image processing unit 2 and the computer 7 may differ from an actual pointed coordinate due to a recognition error (that is, an input precision of the pointing signal is improved by indicating the point recognized by the console/monitor unit by a cursor), and (2) by the use of the pointers Pa and Pb which output the infrared rays and the monitor camera 1 which is the infrared ray camera, no visible light is included in the image supplied to the image processing unit 2 and the processing in the image processing unit 2 can be effected in a simple manner at a high speed.

Figure 3:
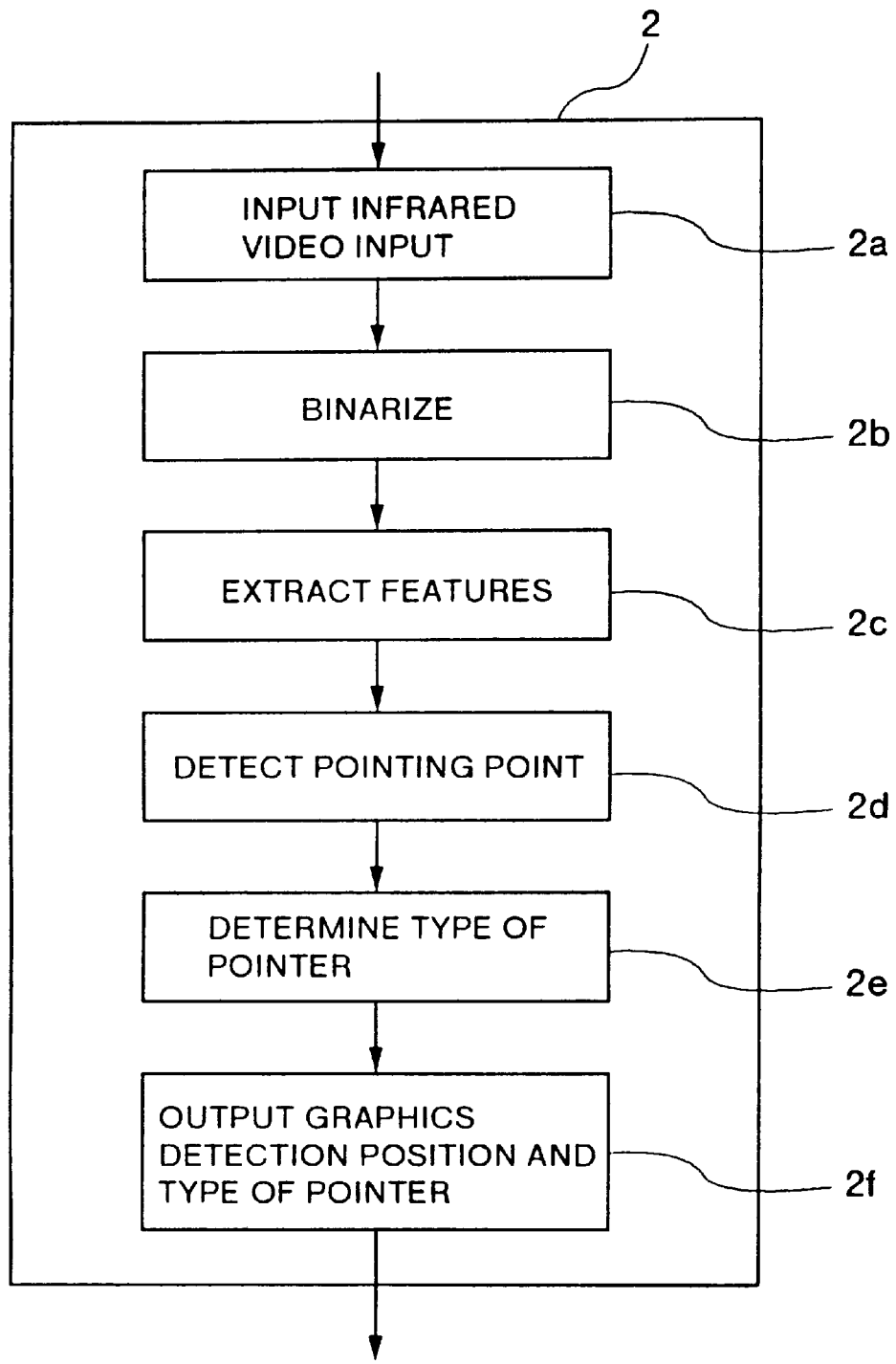
FIG. 3 illustrates a process executed by an image processing apparatus of FIG. 1, FIGS. 4A, 4B, 4C and 4D show specific contents of processes 2c–2e of FIG. 3, FIG. 5A, 5B, 5C and 5D show light exit planes of pointers.
Figures 5A, 5B, 5C, 5D:
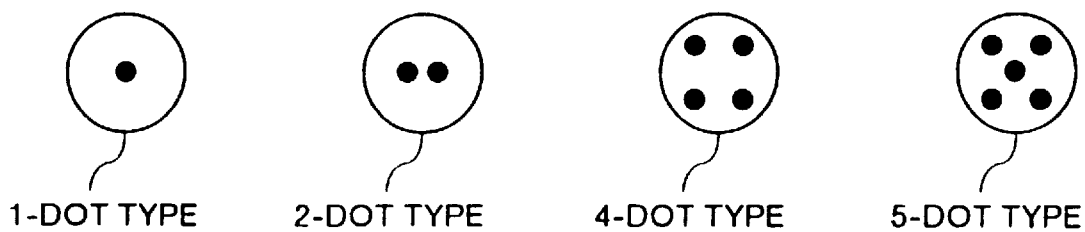

The image processing unit 2 executes a process shown in FIG. 3. The infrared video signal is supplied (step 2a). The video signal is binarized (step 2b). Through the binarization, noises included in the video signal is eliminated. Then, features of the video signal is extracted from the binary image (step 2c). In this step, projection distributions of the binary image to the x axis and y axis are measured to determine a coordinate of a point at which a density of the binary image exceeds a reference L. For the pointer Pb, a projection distribution as shown in FIG. 4D is derived and the coordinates of the points at which the reference L is exceeded are $x_1$, $x_2$, $y_1$ and $Y_2$. Those coordinates $x_1$, $x_2$, $y_1$ and $y_2$ represent the features of the binary image. In a step 2d, the positions pointed by the pointers on the display screen of the large screen display device 4 (the arrival points of the pointing signals from the pointers on the display screen of the large screen display device 4) are determined. Namely, a coordinate (X, Y) of a center point of the binary image is determined based on the coordinates $x_1$, $x_2$, $y_1$ and $y_2$ ($X=(x_1+x_2)/2$, $Y=(y_1+y_2)/2$). The coordinate (X, Y) of the center point is the pointed position by the pointer. Then, a type of the pointer is discriminated (step 2e). The type of the pointer is determined based on a size of an area $\Delta S$ ($=(x_2-x_1)(y_2-y_1)$) of a circumscribed quadrilateral determined based on the coordinates $x_1$, $x_2$, $y_1$ and $y_2$. For the area $\Delta S_4$ of FIG. 4D, it is determined as the pointer Pb which outputs the cross shaped pointing signal. The information on the pointing point by the pointer and the type of the pointer is outputted to the computer 7 (step 2f).

The information on the pointing point by the pointer and the type of the pointer is inputted to the computer 7. The coordinate recognition unit 60 corrects the input coordinate (X, Y) by using a coordinate table stored in a memory 65 to determine a coordinate ($X_i$, $Y_i$) of an actual pointing point on the display screen of the large screen display device 4 and outputs it. Through the use of the coordinate table, an error of the pointing point caused by the distortion of the camera image and the affect by the camera position is corrected. The coordinate ($X_i$, $Y_i$) and the type of the pointer are outputted to the display information generation unit 63 so that the marker of the pointer (the cross shaped marker 5b for the pointer Pb) corresponding to the type information on the pointer is displayed at the coordinate ($X_i$, $Y_i$) on the display screen of the large screen display device 4. Since the pointing signals outputted from the pointers Pa and Pb are infrared rays, the manager and the operators cannot identify the position which he/she points to. In the present embodiment, however, since the markers corresponding to the pointers are displayed as described above, the position he/she pointed to can be readily recognized. The object identification unit 61 retrieves data of the display information currently displayed on the large screen display device 4 and designates the object displayed at the position of the coordinate ($X_i$, $Y_i$) of the pointed position. The identification of the object is effected by steps 50, 53 and 54 shown in FIG.

Figure 11:
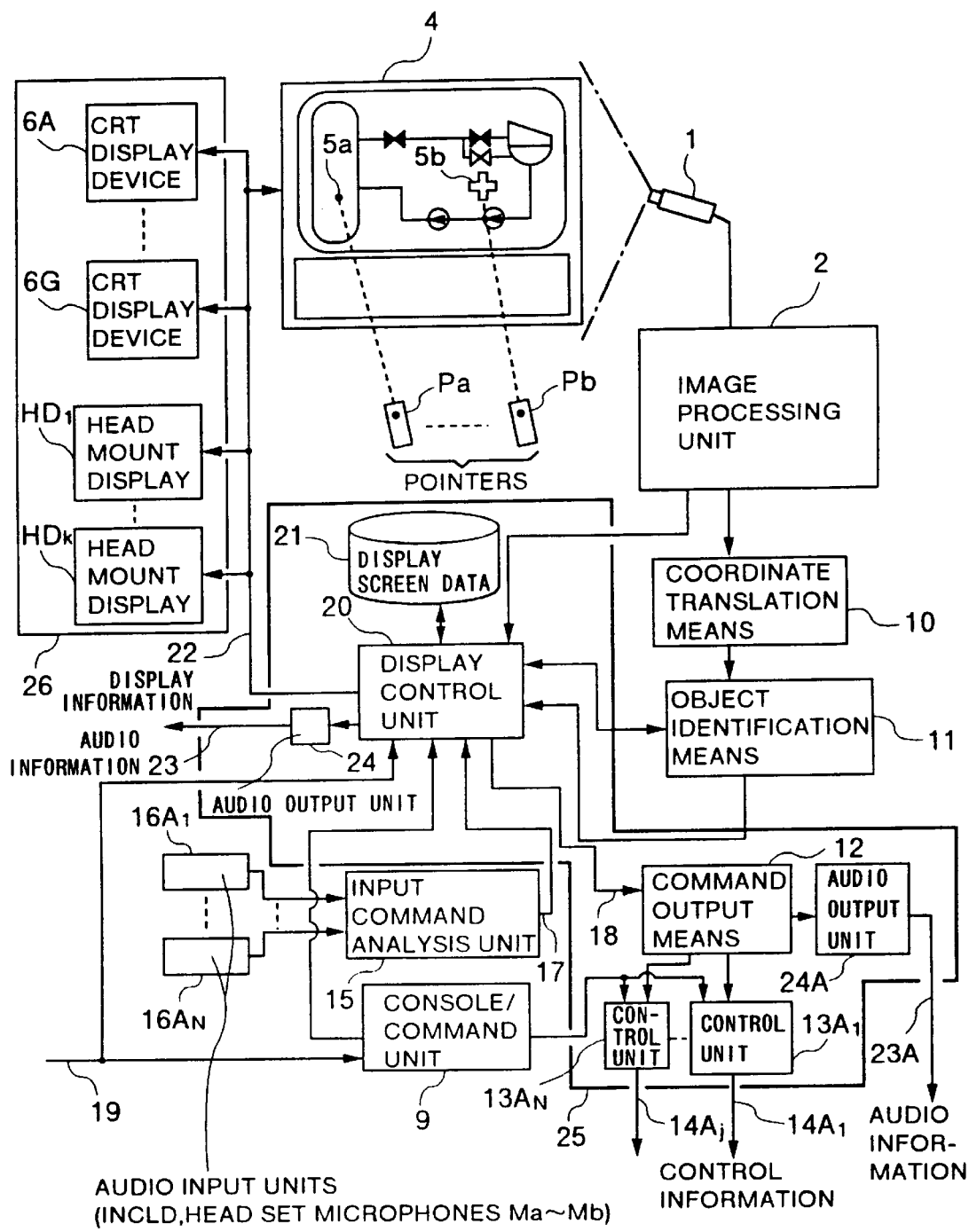
FIG. 11 shows a configuration of a console/monitor unit in accordance with other embodiment of the present invention.
Figure 13:
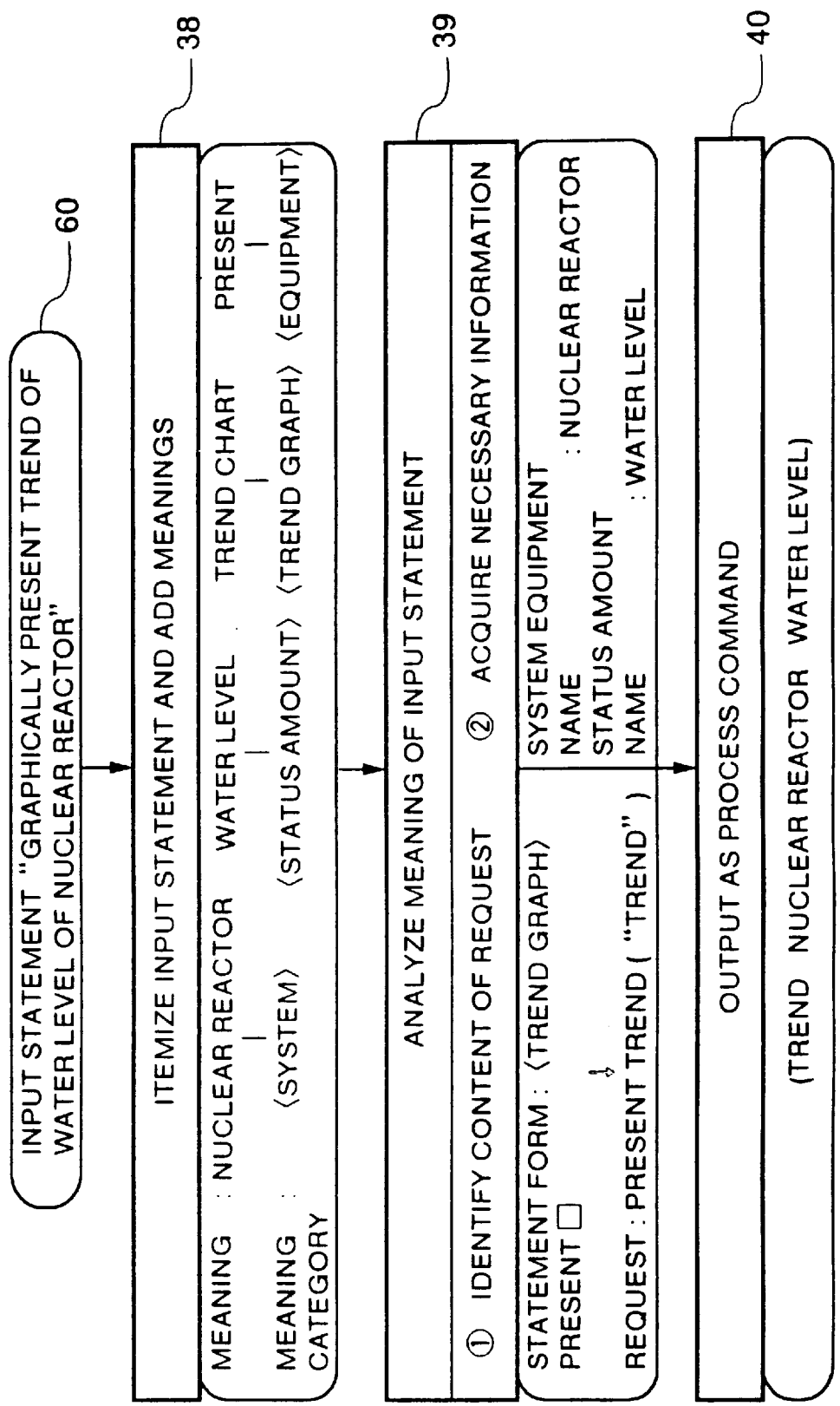
FIG. 13 illustrates a content of process of input statement decode executed by an input statement decode unit of the display control apparatus of FIG. 11.
Figure 14:
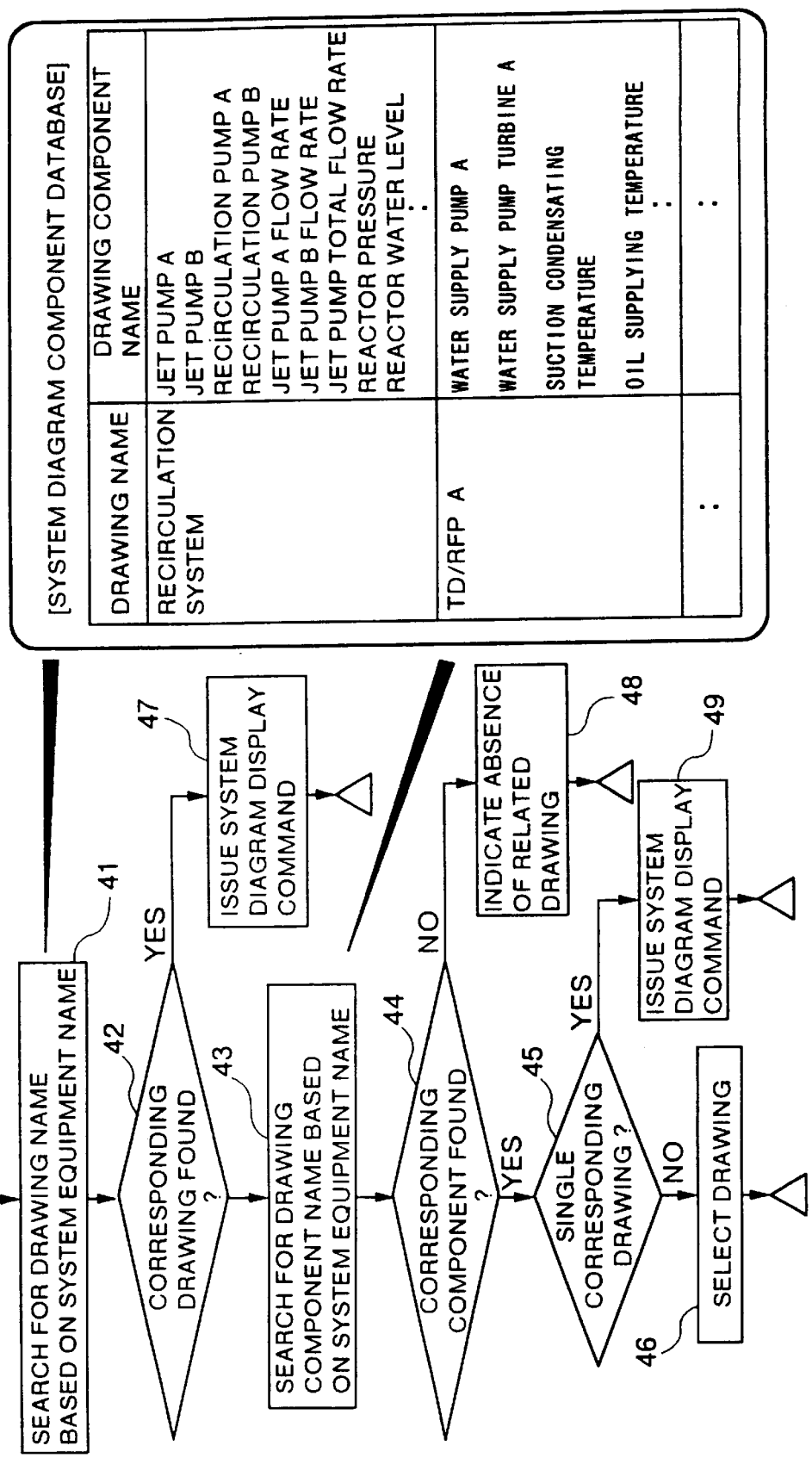
FIG. 14 illustrates a content of process of display information generation executed by a display information generation unit of the display control apparatus of FIG. 11.

12 to be described. Since the display by a multi-window is not effected, steps 51 and 52 are skipped. In the step 53, the object to be displayed is identified by using the coordinate ($X_i$, $Y_i$) of the input pointing point. The display information selection unit 62 combines the information of the identified object and the audio information of the manager B inputted from the head set microphone Mb (or the head set microphone Ma for the operator A) and selects the information to be displayed based on the combined information. A command signal relating to the information to be displayed is outputted to the display information selection unit 62 which determines the information to be displayed based on the identified object information and the audio information of the manager B (or the operator A) by the process described in JP-A-3-179517, page 4, upper left column, line 15 to page 6, lower left column, line 3 (FIGS. 1 and 5–7) and page 8, upper left column, line 5 to lower left column, line 19 (FIGS. 11, 13 and 14).

The display information generation unit 63 generates display information corresponding to the display information to be displayed selected by the display information selection unit 62 by using the information in the memory 65. In generating the display information, the type information of the pointer is taken into account. The type information of the pointer is inputted to the display information generation unit 63 through the coordinate recognition unit 60, the object identification unit 61 and the display information selection unit 62. The display information generation unit 63 generates the display information relating to the object pointed by the pointer Pb, for example, based on the data stored in the memory in association with the type information of the pointer. The generated information is outputted to the display device determined by the type of the pointer and displayed thereon. The display information relating to the object pointed by the pointer Pb is displayed on the large screen display device 4.

When the operator A points the object displayed on the large screen display device 4 by the pointing signal (one dot) outputted from the pointer Pa, it is processed by the image processing unit 2 and the computer 7 as it is for the object pointed by the pointer Pb. In steps 2d and 2e of the image processing unit 2, the coordinate (X, Y) of the center position is determined by using the coordinates $x_1$, $x_2$, $y_1$ and $y_2$ of FIG. 4A determined in the step 2c, and the type of the pointer (whether the pointer Pa or Pb) is determined based on the area $\Delta S_1$. The coordinate recognition unit 60 corrects the position of the coordinate (X, Y) for the pointing signal outputted from the pointer Pa to derive the coordinate ($X_i$, $Y_i$). The display information generation unit 63 displays the one-dot marker 5a on the large screen display device 4 by using the coordinate. The object identification unit 61 and the display information selection unit 62 perform the same process as that for pointer Pb. The display information generation unit 63 generates the display information relating to the object pointed by the pointer Pa based on the data stored in the memory 65 in association with the type information of the pointer. The prepared information is displayed on the CRT display device 6A, for example, which corresponds to the pointer Pa.

In accordance with the present embodiment, since the pointers which point the display screen of the large screen display device 4 can be identified when the display screen of the large screen display device 4 is pointed by a plurality of persons, the corresponding display information my be generated and displayed on the display device. Even when a plurality of persons simultaneously point the display screen of the large screen display device 4, the requested information are properly generated and displayed.

Since the display device to display the information is designated for each pointer, the information relating to the object pointed by the pointer Pb by the manager B (the information to be watched by all attendants) is displayed on the large screen display device 4 and the information relating to the object pointed by the pointer Pa by the operator A (the information to be watched by the operator A alone) is displayed on the CRT display device 6A. Thus, since the display device to display the information is designated for each type of the pointer, the user operability of the information by the operator a and the manager B is improved. The operator A can access to the information by a touch operation to the CRT display device 6A. When the operator A points the large screen display device 4 by the pointer Pa, the information relating to the information displayed on the large screen display device 4 is displayed on the CRT display device 6A which the operator A monitors. This is attained by the identification of the pointer.

Through the use of a portable display device such as a head mount display HD ("Newton", vol.1.11, No.12, pages 104–107, 1991 Fall, KYOIKU-SHA), the operator A can point the large screen display device 4 by the pointer Pa while he/she moves to display personal information required by the operator A on the head mount display HD.

The operator A and the manager B remotely point the display screen by using the pointers so that they may point the display screen of the large screen display device 4 without regard to the positions of the operator A and the manager B. Further, the detection of the pointed position and the discrimination of the type of the pointer can be exactly effected without regard to the positions of the operator A and the manager B.

In accordance with the present embodiment, a plurality of pointers which output different pointing signals are identified and the information relating to the object to be displayed pointed by the identified pointer is properly generated and displayed. As a result, the plurality of users may use separate pointers which output different pointing signals to acquire the information they require. Even when the plurality of users simultaneously point the separate objects displayed on the display screen of the large screen display device 4 by the separate pointers, the requires information are properly displayed.

In the present embodiment, the pointing signal arrived to the display screen of the large screen display device 4 is detected by the monitor camera 1, and the pointer which outputs the pointing signal is identified based on the arrived pointing signal detected, and the pointed object to be displayed in the display screen can be precisely identified. Accordingly, in the present embodiment, the information relating to the object to be displayed pointed by the pointer can be readily provided for each pointer.

In the present embodiment, a plurality of attendants can point the objects to be displayed without restriction of the operation site, and the information for each attendant and common information can be outputted to the different display devices or common display device. Thus, it is effectively applied to the presentation of information in a central control room of a plant operated by a plurality of operators, the presentation of information in a financial organization and a securities organization, and the presentation in a conference, and the work efficiency and the reliability are further enhanced. Thus, it has a high industrial value.

Further, since the information of the object to be displayed pointed by the pointer and the audio information are combined to determine the information to be displayed, the input information by the pointer and the audio input means are not limited and they may be freely combined for use. Accordingly, a burden to the operator for the input of the information by using the pointer and the audio input means can be reduced.

When a 2-dot type or 3-dot type pointer (which emits an infrared laser beam) is used, features as shown in FIGS. 4B and 4C can be derived in a step 2c by using the infrared video signal outputted from the monitor camera 1. When a plurality of peaks appear in the projection distribution, maximums and minimums in the x axis and the y axis are used to calculate the center coordinate and the area $\Delta S$ of the circumscribed quadrilateral. For example, in the 2-dot type pointer, $x_1$ and $x_2$ are determined for the x axis projection distribution and $y_1$ and $y_2$ are determined for the y axis projection distribution to determine the center coordinate and the area of the circumscribed quadrilateral. When the center coordinate is not determined, minimums of the x axis and y axis projection distributions, for example, the coordinate $(x_1, y_1)$ of FIG. 4B may be determined.

The discrimination of the pointer used to point the position is effected based on data such as the number of high luminance points in the binary image or the area of the circumscribed quadrilateral of the high luminance area. The geometry of the pointing signal by the pointer may be stored in a memory (not shown) in the image processing unit 2 and the identical shape may be detected by a template matching method. When the dot type pointer shown in FIGS. 4A–4C is used, the number of high luminance points are determined to discriminate the pointer, and the determination is made based on the maximum of the number of peaks in the x axis or y axis binarized projection distribution. For example, in the 3-dot type pointer shown in FIG. 4C, the number of peaks in the x axis is maximum, three so that it is determined as the 3-dot type. In 4-dot type and 5-dot type pointers shown in FIGS. 5A, 5B, 5C and SD, the maximum of the number of peaks of the x axis and y axis projection distributions may not corresponds to the number of light sources depending on the angle of the pointer. For such pointer, the features of the binary image is extracted by a reference $L_2$ which is higher than the reference $L_1$. That is, the number of peaks no lower than $L_1$ and the number of peaks no lower than $L_2$ are summed and the larger one of the x axis and y axis sums are determined to discriminate the pointer by that number. For example, in the y axis of FIG. 4C, the number of peaks is two and the number of peaks no lower than $L_1$ is two and the number of peaks no lower than $L_2$ is one, resulting in the total of three. For the x axis, the number of peaks no lower than $L_1$ is three and the number of peaks no lower than $L_2$ is zero, resulting in the total of three. Accordingly, it is determined that the 3-dot pointer is used for pointing.

Figure 6:
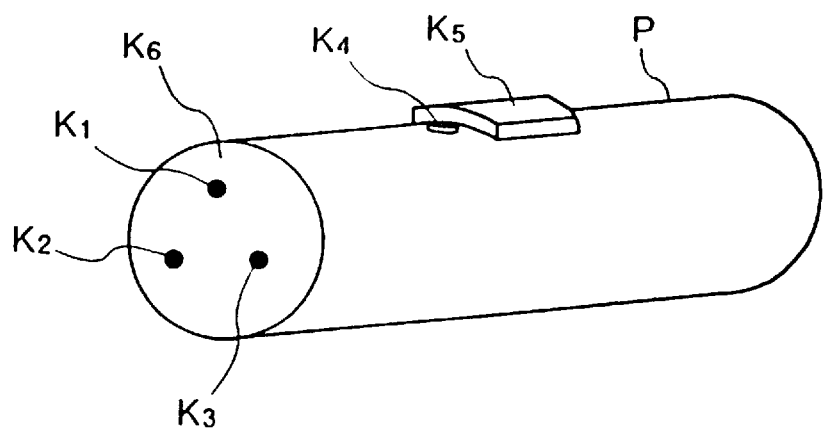
FIG. 6 shows a perspective view of a pointer.
Figure 7:
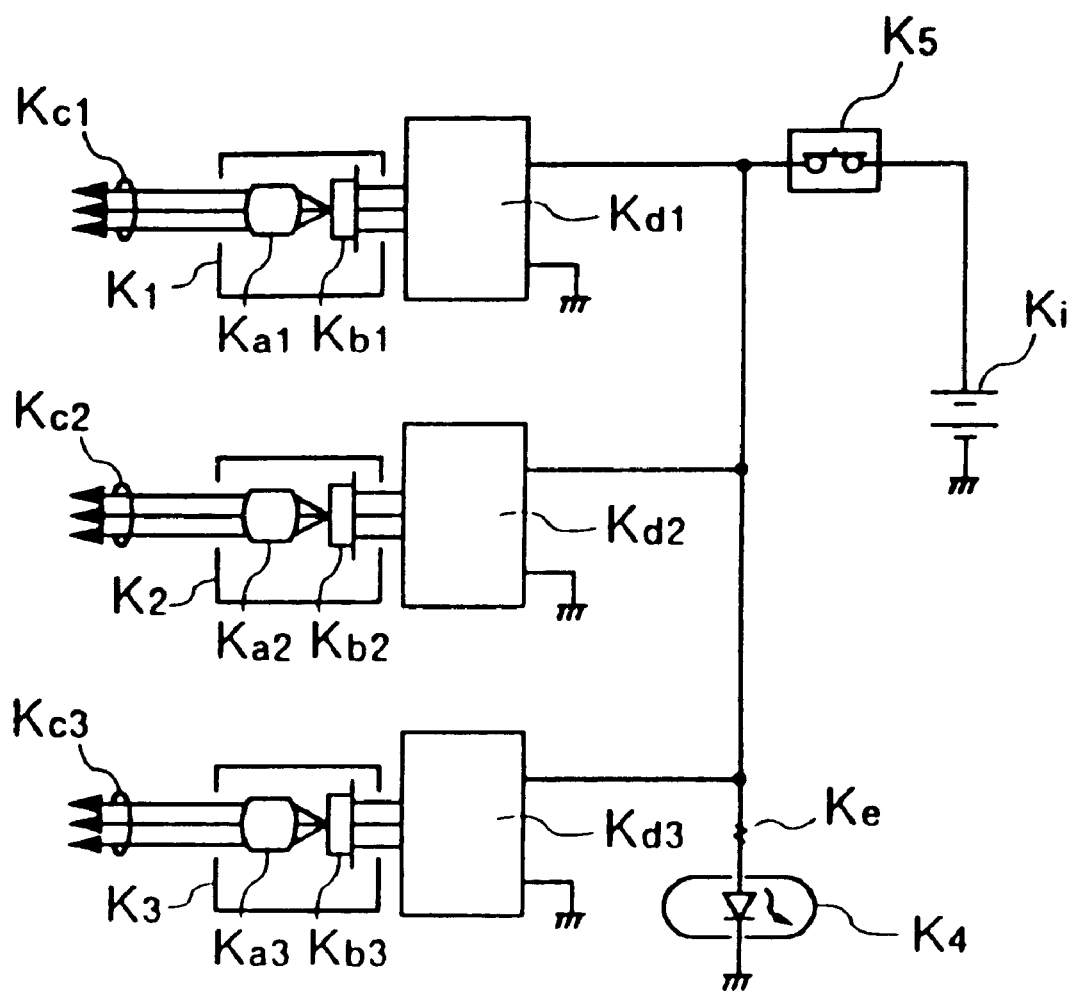
FIG. 7 shows a laser beam generation circuit for the pointer P of FIG. 6.
Figure 8:
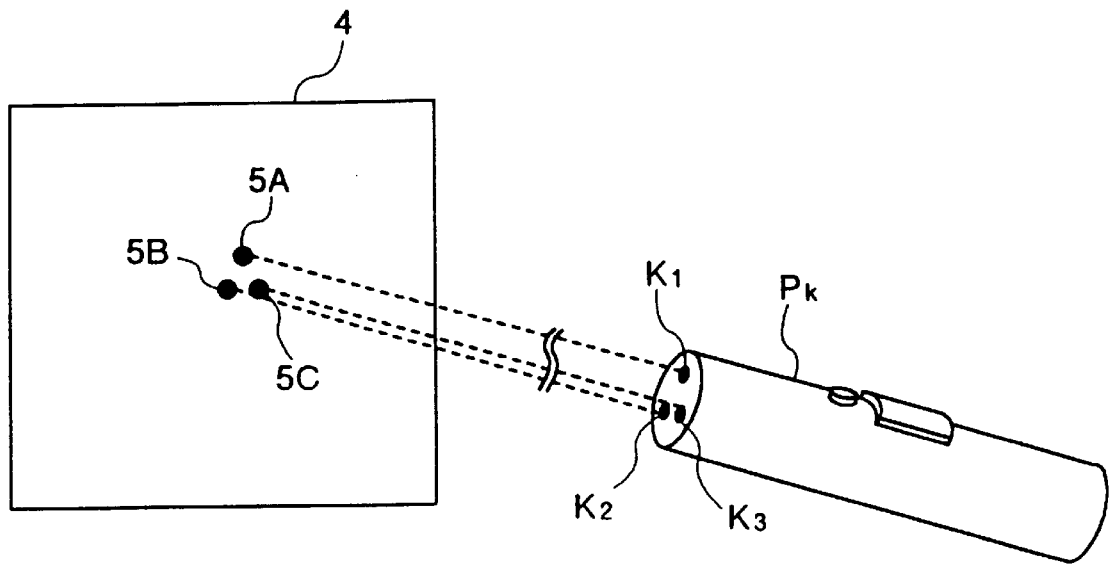
FIG. 8 shows a pointing signal outputted from the pointer P of FIG. 6.

A construction of the pointer is now explained. FIGS. 6 and 7 shows a pointer P with three dots. Kj denotes a DC power supply and Ke denotes a current limiting protection resistor. When a switch $K_5$ is turned on, a voltage is applied to a drive circuit $Kd_1$, $Kd_2$ and $Kd_3$ and a light emitting diode $K_4$. As a result, infrared laser beams are emitted from semiconductor lasers $Kb_1$, $Kb_2$ and $Kb_3$, respectively. Those infrared laser beams are collimated by collimator lenses $La_1$, $Ka_2$ and $Ka_3$ to produce collimated beams $Kc_1$, $Kc_2$ and $Kc_3$. Thus, non divergent infrared laser beams are outputted as exit lights from the light sources $K_1$, $K_2$ and $K_3$ of an exit plane $K_6$. As a result, the infrared laser beam (pointing signal) outputted from the pointer P points the display screen of the large screen display device 4 as shown in FIG. 8.

Through the function of the coordinate recognition unit 60 and the display information generation unit 63, a marker having the three points 5A, 5B and 5C is displayed on the display screen of the large screen display device 4. When the switch $K_5$ is turned off, the emission of the laser beam from the pointer P is stopped. The light emitting diode $K_4$ indicate that the lights are outputted from the light sources $K_1$, $K_2$ and $K_3$. It is particularly effective when a non-visible light (for example, an infrared ray) is outputted from the light source.

Figure 9:
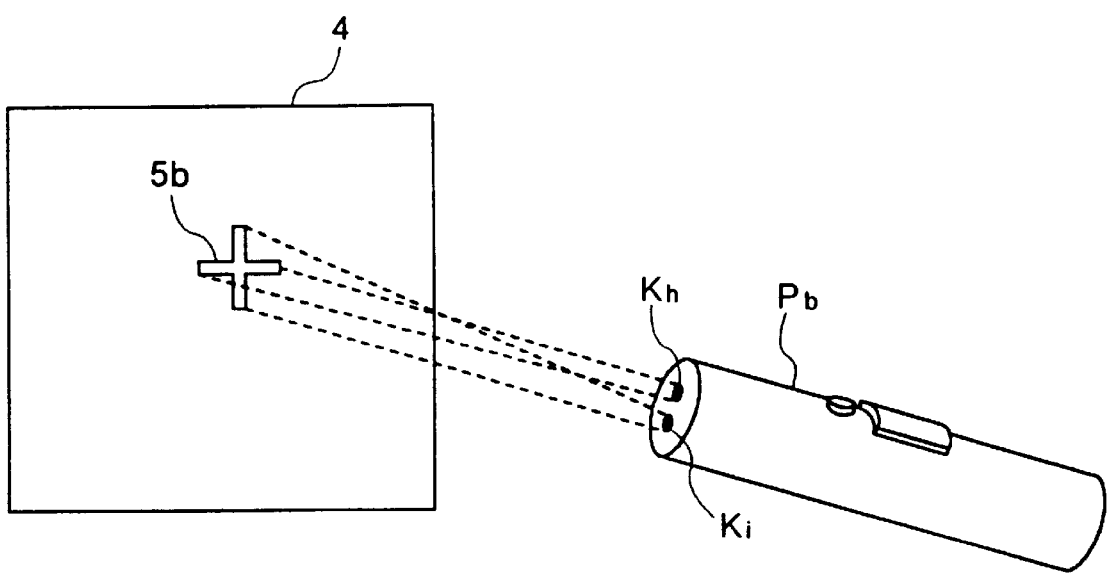
FIG. 9 shows a perspective view of a pointer Pb of FIG. 1.
Figure 10:
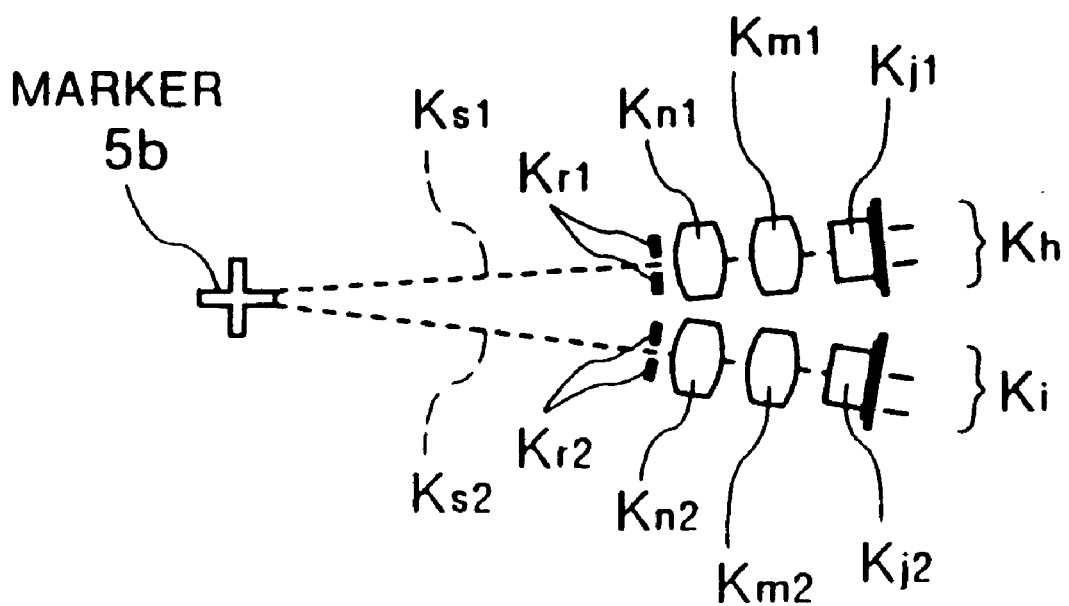
FIG. 10 shows a configuration of a light source for outputting a cross-shaped pointing signal of the pointer of FIG. 9.

A construction of the pointer Pb used in the embodiment of FIG. 1 is shown in FIGS. 9 and 10. The pointer Pb comprises two light sources Kh and Ki. The light source Kh comprises a semiconductor laser $Kj_1$, a focusing lens $Km_1$, a collimator lens $Kn_1$ and a slit $Kr_1$. The light source Ki also comprises a semiconductor laser $Kj_2$, a focusing lens $Km_2$, a collimator lens $Kn_2$ and a slit $Kr_2$. An infrared laser beam along a horizontal axis of the marker 5b is referred to as an X axis output light and an infrared laser- beam along a vertical axis is referred to as a Y axis output light. The infrared laser beam exited from the slit $Kr_1$, is the X axis output light $Ks_1$, and the infrared laser beam exited from the slit $Kr_2$ is the Y axis output light $Ks_2$. The X axis output light $Ks_1$, and the Y axis output light $Ks_2$ are bar shaped exit lights and focused to be cross shaped on the display screen of the large screen display device 4. To this end, the focusing lenses $Km_1$ and $Km_2$ are provided between the semiconductor laser and the collimator lens. Even if the distance between the pointer Pb and the large screen display device 4 changes, the X axis output light $Ks_1$ and the Y axis output light $Ks_2$ do not intersect at the center point but intersect at off-center points. In this manner, the cross shaped pointing signal is produced. The slits $Kr_1$, and $Kr_2$ are provided to intercept the diverging light to make the width of the vertical portion constant along the axial direction so that the X axis output light $Ks_1$, and the Y axis output axis $Ks_2$ are made more bar like.

By combining a plurality of bar shaped infrared laser beams, pointers for outputting pointing signals of parallel bars, single bar or T shape can be produced.

Referring to FIG. 11, a console/monitor device in accordance with other embodiment of the present invention is explained. The like elements to those of the previous embodiment are designated by the like numerals. The present embodiment comprises pointers Pa and Pb, a monitor camera 1, an image processing unit 2, coordinate translation means 10, object identification means 11, audio input devices $16A_1$–$16A_N$ (the head set microphones Ma and Mb of FIG. 1), a command decode unit 15, a console/command unit 9, information generation means 25, a first display device 26 and a large screen display device 4 which is a second display device. The information generation means 25 comprises command output means 12, control units $13A_1$–$13A_j$, a display control unit 20, a memory 21 and audio output units 24 and 24A. The first display device 26 comprises CRT display devices 6A–6G and head mount displays $HD_1$–$HD_k$.

The pointer Pa outputs by the operation by the operator A and the pointer Pb outputs by the operation by the manager B the pointing signals similar to those of the embodiment of FIG. 1 to the display screen of the large screen display device 4. The image processing unit 2 receives the video signal of the display screen of the large screen display device 4 picked up by the monitor camera 1 and executes the steps 2a–2f shown in FIG. 3.

Through the binarization in the step 2b, noises contained in the video signal are excluded. In the step 2d, the center coordinate of the binary image is determined as the pointed position by the pointer in order to prevent a shift between the pointed position and the position of the pointing signal detected on the display screen of the large screen display device 4 even when the shape of the pointing signal focused on the large screen display device 4 is deformed by the change of the position pointed by the pointer. However, when the pointed position on the display screen shifts, the operator (or manager) may repoints by the pointer to eliminate the shift. In this case, the center coordinate of the binary image need not be determined but the coordinate of the specified position of the pointing signal is determined. The image processing unit 2 outputs the type of pointer and the coordinate (X, Y) of the pointing point of the pointer to the coordinate translation means 10.

The coordinate translation means 10 executes the same process as that of the coordinate recognition unit 60 of FIG. 2 to correct the input coordinate (X, Y) and determines the coordinate $(X_i, Y_i)$ of the actual pointed position on the display screen of the large screen display device 4 and outputs it. The correction is made by using the coordinate table. For example, infrared light sources are embedded at four corners of the large screen display device 4 and they are activated so that the correspondence of the coordinate is attained. Since they are infrared rays, they are invisible to the user. The large screen display device 4 itself may outputs information of a particular pattern (for example, only the four corners of the screen are white and others are black) and the sensitivity of the monitor camera 1 is increased only when such information is outputted so that the particular pattern is recognized and the information on the coordinate translation is generated.

The object identification means 11 identified the object to be displayed on the display screen pointed by the operator based on the coordinate $(X_i, Y_i)$ in the large screen display device 4 determined by the coordinate translation means 10. The identification is effected by a process shown in FIG. 12. The coordinate $(X_i, Y_i)$ of the pointed position in the large screen display device 4 before the turn-off of the infrared laser beam outputted from the pointer is read (step 50). Based on the coordinate, the pointed window is determined (step 51). Then, a relative coordinate $(X_w, Y_w)$ in the window is calculated (step 52). The object to be displayed at the relative coordinate $(X_w, Y_w)$, that is, the pointed object is determined based on the data corresponding to the pointed area and character string displayed in the window (step 53). The data corresponding to the pointed area and character string is provided for each drawing in the display screen data stored in the memory 21. The content thereof is the data relating to the range of the pointed area and the output character string. When the object to be displayed pointed by the pointer is determined, the character string corresponding to the object to be displayed is outputted. The information on the character string corresponding to the object to be displayed is outputted to the display control unit 20 and stored in the memory 21. The transfer of the information between the memory 21 and the object identification means 11 is effected by the display control unit 20.

Since the exit lights of the pointers Pa and Pb are infrared rays, the operator cannot identify the point on the display screen which he/she pointed. Thus, the display control unit 20 reads the relative coordinate $(X_w, Y_w)$ determined by the object identification means 11 and the type information of the pointer derived in the step 2e of the image processing unit 2, and displays the marker corresponding to the pointer which outputs the pointing signal at the coordinate $(X_w, Y_w)$ on the large screen display device 4 by using the information of the marker associated with the type of the pointer. As a result, the marker corresponding to the pointer is displayed at the point pointed by the pointer. The display control unit 20 may not read the relative coordinate $(X_w, Y_w)$ from the object identification means 11 but may read a character string which identifies the object. In this case, the marker may be displayed at the coordinate on the large screen display device 4 by determining which coordinate the object identified by the character string is located. In this case, since the object to be displayed is identified, the object displayed on the large screen display device 4 may be blinked or the color of the object may be changed to indicate the pointing point. In this case, the blinking period or the display color may be associated with the pointing signal.

The input by the operator A may be effected by the audio information or the command by the pointer Pa. The audio information is supplied to the input command decode unit 15 through the audio input device $16A_1$–$16A_N$ where it is decoded, and supplied to the display control unit 20 as the audio recognition information 17. The character string information corresponding to the object to be displayed identified by the object identification means 11 is also supplied to the display control unit 20, which processes the input information as natural language words and stores it in the memory 21 and displays it on the large screen display device 4. For example, it is displayed in a frame at the bottom of the large screen display device 4 as shown in FIG. 11. The operator may monitor the input information recognized by the console/monitor unit of the present embodiment by watching the information displayed in the frame.

When the input of the audio information by the operator is completed, the display control unit 20 consolidates the audio information and the character string information stored in the memory 21 into words to compose a sentence, and analyzes the sentence, that is, analyzes the input statement. The display control unit 20 includes an input statement analysis unit (not shown).

The input statement analysis effected by the input statement analysis unit is effected by the process (explained in the embodiment of FIG. 1) disclosed in JPA-3-179517. In FIG. 13, an outline thereof is shown for an input statement "Graphically present trend of water level of nuclear reactor". Of the input statement inputted in a step 60, "nuclear reactor" is the character string information of the object to be displayed which is at the position pointed by the pointer, and "Graphically present trend of water level" is the audio input information. The input statement is first itemized by referring the grammar and the dictionary and the meanings and the meaning categories are added (step 38). The meaning categories means the categories of the meanings of the words used in the field of the object. In FIG. 13, "system" and "status amount" correspond thereto. Then, the meaning of the input statement is analyzed by using the above result (step 39).

The meaning analysis is effected in two steps ① and ② as shown in FIG. 13. First, the type of the content of the request is identified ((①)). For the identification, a standard statement form is provided for each type of request. It is described in a form of rule by using the meaning or the meaning category. The statement form and the meaning or the meaning category of the input statement are compared to identify the type of request. In the illustrated example, "<trend_graph>□present" match so that it is identified that the type of request is the trend presentation request "trend", where the symbol "< >" indicates that the meaning category is used for the matching and "□" indicates that any number of words may be included.

Then, the information required to execute the request is acquired (②). Necessary information and the acquiring methodology are prepared as flame type knowledge. The information is acquired by using the knowledge. In the example of FIG. 13, the necessary information, the name of the system equipment and the name of status amount are acquired from the input statement. If the necessary information is not contained in the input statement, the information is acquired from the plant related knowledge, the use of the interactive history or the inquiry to the operator. When the analysis of the meaning is completed, it is outputted as a process command (step 40). The content of the information to be displayed is outputted as the process command. Such an input statement analysis unit corresponds to the display information selection unit in the embodiment of FIG. 1.

The display control unit 20 includes a display information generation unit (not shown). The display information generation unit generates the display information based on the data of the information to be displayed derived from the input statement analysis unit and outputs the display information to the display device corresponding to the type of pointer specified by the image processing unit 2. The display information is generated by using the information (necessary for preparing the display information) corresponding to the type of pointer read from the memory 21. FIG. 14 shows an example of a process in the display information generation unit, for the generation of the display information of a system diagram. For the command of the generation of the display information of the system diagram, the name of system equipment is acquired by the process of the input statement analysis unit as the necessary information. A corresponding display chart is determined based on the name of system equipment. First, based on the given name of the system equipment, a system diagram component database constructed in a partial storage area in the memory 21 is searched (step 41). The database provides the name of drawing and the names of components such as equipments included in the drawing. The name of drawing and the name of system equipments are compared (step 42), and if they match, a display command for that system diagram is outputted (step 47). This process corresponds to a case where the operator remembers the name of drawing and inputs it as it is. If the matching drawing is not retrieved in the search step 42, the names of components of the drawing stored in the database are searched based on the input name of system equipment (step 43). If the matching component name is not retrieved (step 44), the absence of the related drawing is outputted (step 48) to request the reentry to the operator. On the other hand, if the component name is retrieved and there is only one drawing name which includes that component (step 45), a display command for that system diagram is issued (step 49). On the other hand, if there are two or more drawing names, selection of the drawings is made.

Figure 20:
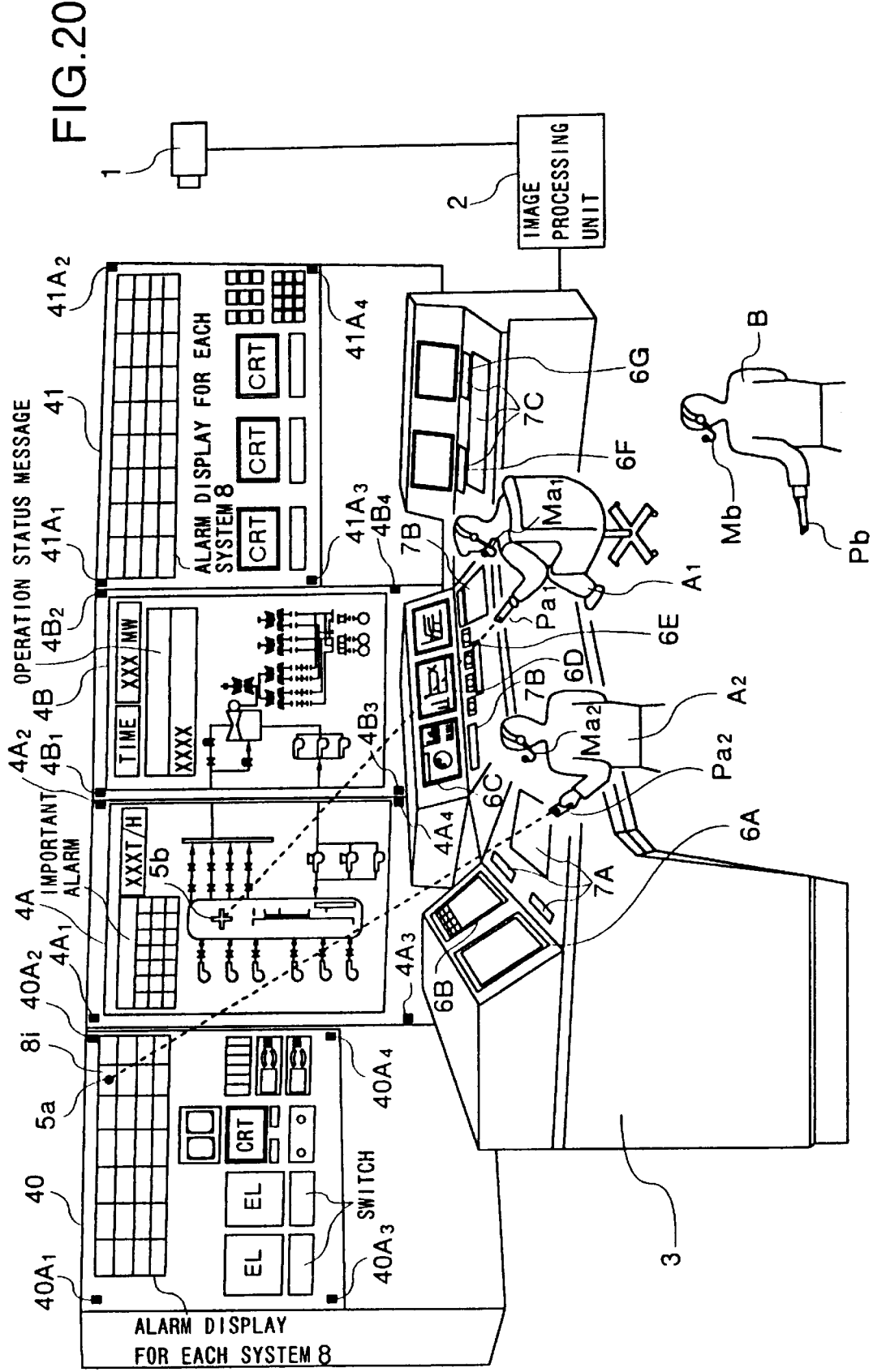
FIG. 20 shows a configuration of a console/monitor unit in accordance with other embodiment of the present invention.

The presentation command of the information selected in the above step is also supplied to the audio output unit 24 which outputs the audio information 23, and it is also used to control the displays of images on the large screen display device 3, the CRT display devices 6A–6G and the head mount displays $HD_1$–$HD_K$. FIG. 20 shows the types of image display switch commands stored in the memory 21. The display of the image is switched in accordance with the process command. The particular display on the display device to be switched is determined based on the type information of the pointer derived from the image processing unit 2. namely, the display devices are allocated in accordance with the type of the pointer (pointer Pa or Pb) and the display device is selected in accordance with the type of pointer used to point the display screen of the large screen display device 4. Thus, the display information 26 generated by the display information generation unit of the display control unit 20 may be displayed on the display device selected in accordance with the pointer.

In the process items of FIG. 15, "Display system diagram" means to display the system diagram, "Display trend chart" means to display the trend chart, and "Delete window" means to delete the window. "Move window" means to move the displaying window, "pop window" means to display the displaying window on a top plane of the display screen, and "Push window" means to display the displaying window on a bottom plane of the display screen.

Figure 16:
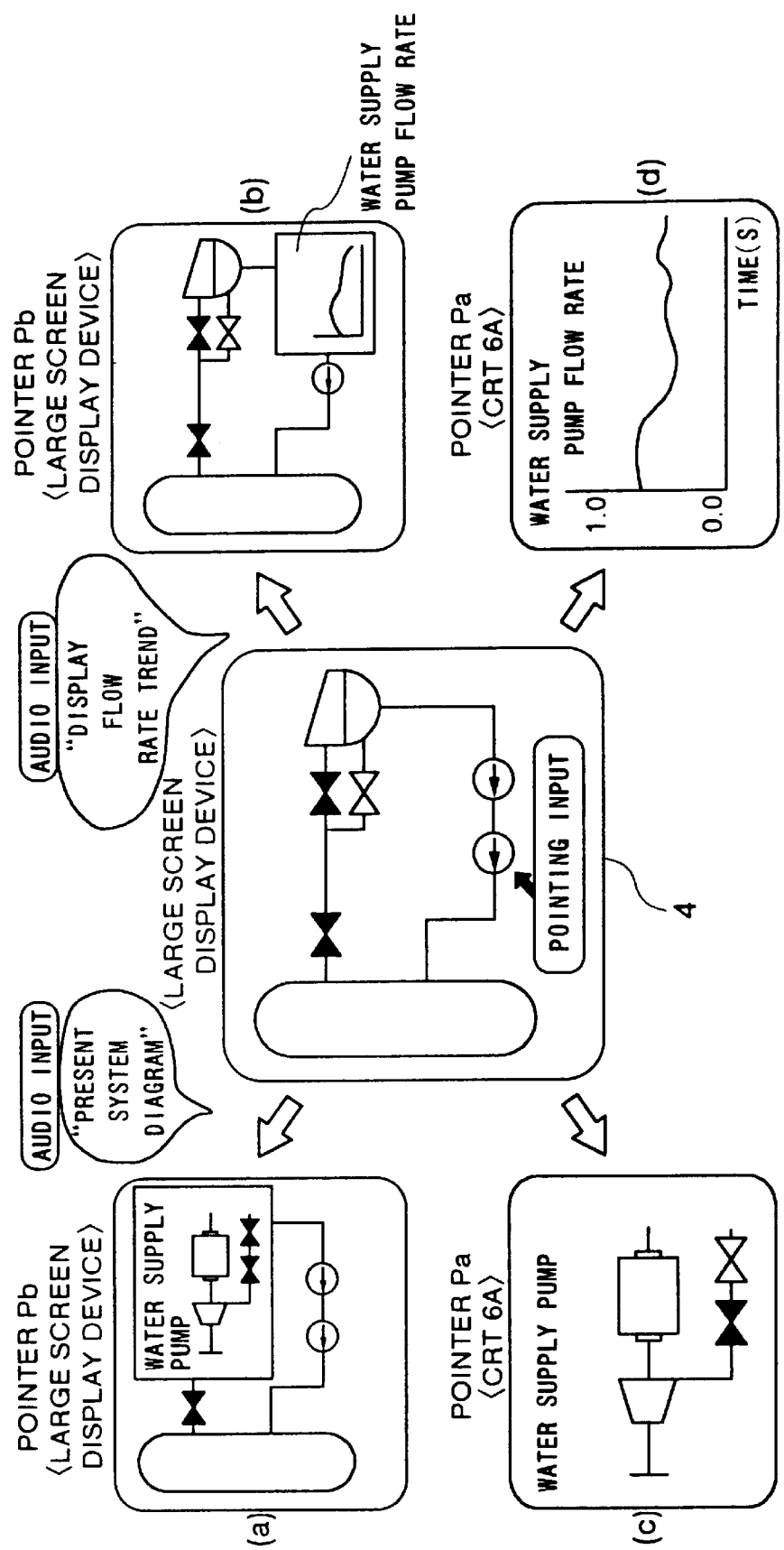
FIG. 16 shows display of information relating to a pointed object

FIG. 16 illustrates a concept of the operation relating to the display in the present embodiment when the CRT display device 6A–6G and the large screen display device 4 are used. For example, in the large screen display device 4 shown at the center of FIG. 16, when the operator A points a water supply pump of the overall system diagram of the plant displayed on the large screen display device 4 by a pointing signal outputted from the pointer Pa and also inputs "Graphically present system diagram" by audio input, a system diagram around the water supply pump is displayed on the CRT display device 6A as shown in FIG. 16C. When the operator A points the same point by the pointing signal of the pointer Pa and also inputs "Display flow rate trend" by audio input, a trend chart of the water supply pump flow rate is displayed on the CRT display device 6A as shown in FIG. 6D. When the manager B points the water pump of the overall system diagram of the plant displayed on the large screen display device 4 by the pointing signal outputted from the pointer Pb and also inputs "Graphically present system diagram" by audio input, a system diagram around the water supply pump is displayed on the large screen display device 4 as shown in FIG. 16A. When the manager B points the same point by the pointing signal of the pointer Pb and inputs "display flow rate trend" by audio input, a trend chart of the water supply pump flow rate is displayed on the large screen display device 4 as shown in FIG. 16B. Such display is attained because the pointing signal of the pointer Pb is of cross shape and the pointing signal of the pointer Pa is of dot shape. When the pointing signal is identified, the information is outputted to the display device corresponding to the identified pointer as it is in the embodiment of FIG. 1.

The present embodiment attains the same effects as those of the embodiment of FIG. 1.

The object to be displayed pointed by the pointer Pa or Pb and identified by the image processing unit 2 and the display information 26 generated based on the audio input information may be displayed on the display device determined in accordance with the pointing signal outputted from the pointer Pa or Pb. thus, the information required by each of the operators and the information which must be grasped by all operators (including the manager) can be remotely pointed and the restriction to the place to acquire the information is eliminated so that the information can be presented with high man-machine operability. In pointing the object to be displayed, the pointing may be made by a plurality of pointers. Thus, there is no need to shift the timing of use among the users and the availability is enhanced.

In the present embodiment, the display information 26 is displayed on the first display apparatus 26 and the large screen display device 4 and also the control information $14A_1$–$14A_j$ for controlling the object to be controlled in the plant can be outputted.

The command output means 12 receives the operation command information 18 outputted from the display control unit 20, determines which one of the control units $13A_1$–$13A_j$ the control command signal is to be outputted to, and outputs the control command signal to the corresponding control unit. The operation command information 18 is generated in the following manner. One of the equipments in the system diagram displayed on the large screen display device 4 is pointed by the pointer Pa. When the display control unit 20 receives the output signal indicating the control command from the console/command unit 9 by the operation by the operator A, it consolidates the object to be displayed (pointed equipment) identified by the image processing unit 2 and the audio information of the operator A and outputs it as the operation command information 18.

The control units $13A_1$–$13A_j$ perform the control operation based on the control command signal outputted from the command output means 12 and the output signal from the console/command unit 9 and outputs the operation information $14A_1$–$14A_j$ to the corresponding objects to be controlled. For example, it is assumed that the display control unit 20 outputs an operation command information "Motor A, 1000 rpm" and the command output means 12 receives it. The command output means 12 performs the same input statement analysis and the meaning analysis to the input information as those of the display control unit 20 to determine the control unit (for example, control unit $13A_1$) which controls the motor A and outputs a setting signal corresponding to 1000 rpm which is a target rotation speed to the control unit $13A_1$. The control unit $13A_1$ reads the signal outputted from the console/command unit 9 for the setting signal (the signal indicating the rotation speed of the motor A which is a feedback signal 19 from the plant) and outputs the control information (control signal) so that the setting signal and the signal indicating the rotation speed of the motor A match.

The command output means 12 determines if the type information of the pointer outputted from the display control unit 20 corresponds to the control information outputted from the control unit, and if they do not correspond, it does not execute the operation command information 18. Thus, since the range of the control function is restricted for the pointer which outputs the pointing signal to the large screen display device 4, the reliability of the operation of the plant is enhanced.

Figure 17:
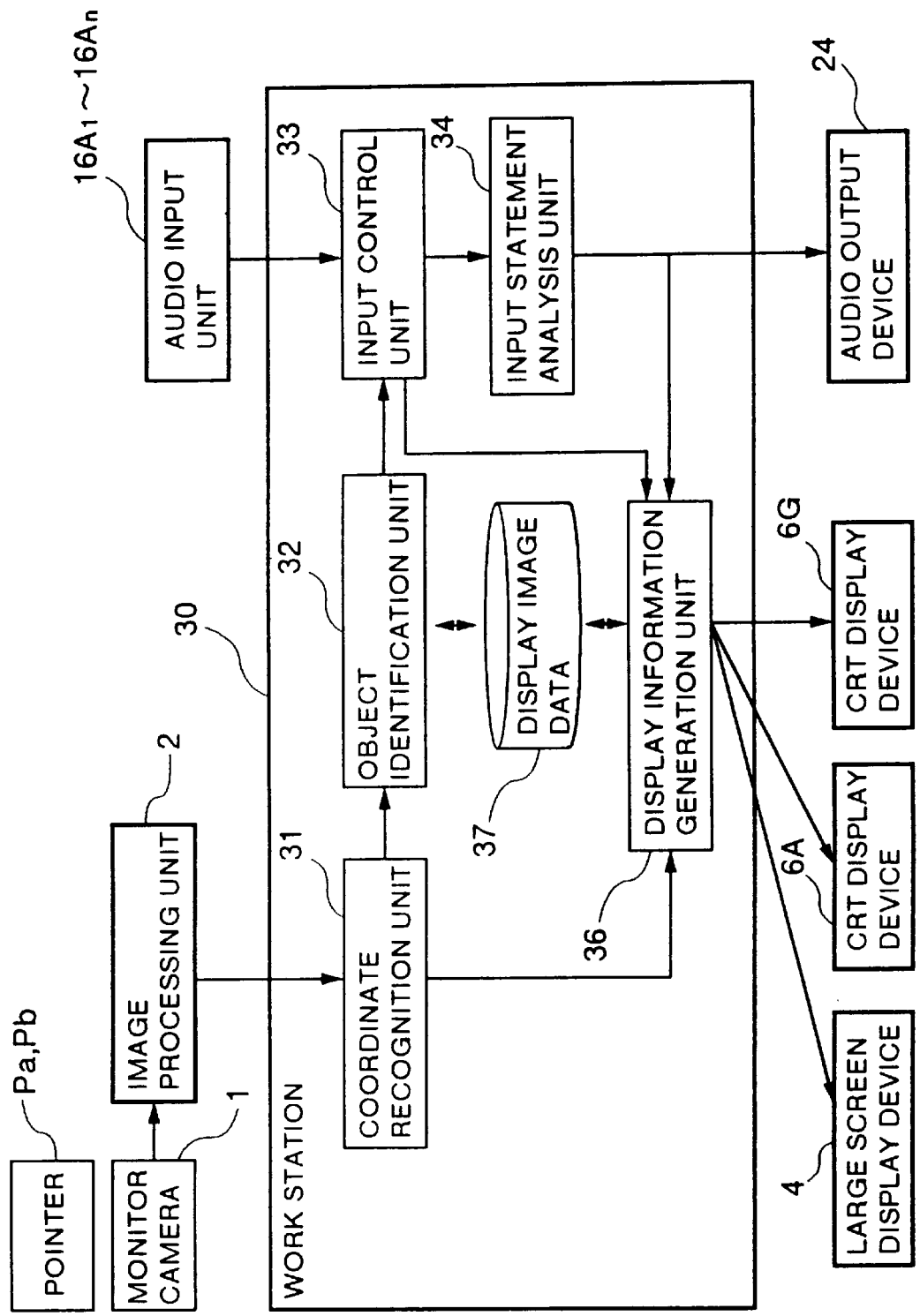
FIG. 17 shows a configuration of a work station having functions of coordinate translation means, object identification means, input command decode means and display control means, FIG. 18 show a perspective view of other embodiment of the pointer.

In the embodiment of FIG. 11, the coordinate translation means 10, the object identification means 11, the display control unit 20, the memory 21 and the input command analysis unit 15 may be implemented by a work station. FIG. 17 shows a configuration of the display information generation function implemented by the work station. The work station 30 comprises a coordinate recognition unit 31, an object identification unit 32, an input control unit 33, an input statement analysis unit 34, a display information generation unit 36 and a memory 37 which stores the display screen data.

The coordinate recognition unit 31 has the same function as the coordinate recognition unit 60 and determines the coordinate $(X_i, Y_i)$ of the actual pointing point on the display screen of the large screen display device 4. The object identification unit 32 determines the coordinate $(X_i, Y_i)$ by the process shown in FIG. 12, determines the object to be displayed pointed by the pointer, and outputs the character string information corresponding to the object to be displayed. The input control unit 33 combines the character string information and the audio information inputted from the audio input device to compose a natural language sentence and outputs it to the input statement analysis unit 34. The input statement analysis unit 34 performs the process as disclosed in JP-A-3-179517 page 4, top left column, line 15 to page 6, bottom left column, line 3 and page 8, top left column, line 5 to bottom left column, line 19, for example, the process shown in FIG. 13, as it does in the embodiment of FIG. 1. The input control unit 33 and the input statement analysis unit 34 form the display information selection unit of the embodiments of FIGS. 1 and 11. The display information generation unit 36 has the same function as that of the display information generation unit in the embodiments of FIGS. 1 and 11. By this configuration, the function may be implemented by software.

In the above description, the outputs from the pointers are infrared rays although they may visible rays. For example, in the pointers of the type shown in FIGS. 5, 6 and 9, red light, blue light and green light may be separately outputted or the red, blue and green light may be outputted in combination. Thus, even when pointers which output pointing signals of the same shape are used, the types of pointing signals, that is, the types of pointers may be increased by merely changing the colors of the exit lights.

To this end, the monitor camera 1 should be of color type, and the image processing unit 2 should have a frame memory for each of the red (R), green (G) and blue (B) colors. Further, the image processing unit 2 determines the projection distributions for R. G and B for the video information read from the frame memories to determine the coordinate of the pointing point and determine the type of pointer. For example, result of the projection distribution after the binarization process appears only in the process for the R frame memory data for the pointing signal by red, and appears only in the process for the G frame memory data for the pointing signal by green. Accordingly, The colors of the pointing signals of the same shape can be discriminated by checking the result for the frame memory data. Thus, the pointer may be discriminated based on this information.

Where the exit light of the pointer is infrared ray, the pointers may be discriminated by changing the wavelength of the exit light from pointer to pointer. Where it is visible ray, the colors may be changed. The wavelengths of the infrared rays emitted from a plurality of pointers may be changed and a plurality of monitor cameras having infrared ray filters corresponding to the infrared ray to be monitored may be provided so that each monitor camera detects only the infrared ray (pointing signal) which is the exit light of the pointer of the corresponding wavelength. Even when the pointing signals outputted from the respective pointers point the same point, the image processing unit can discriminatatively detect the pointing signals from the respective pointers.

Figure 18:
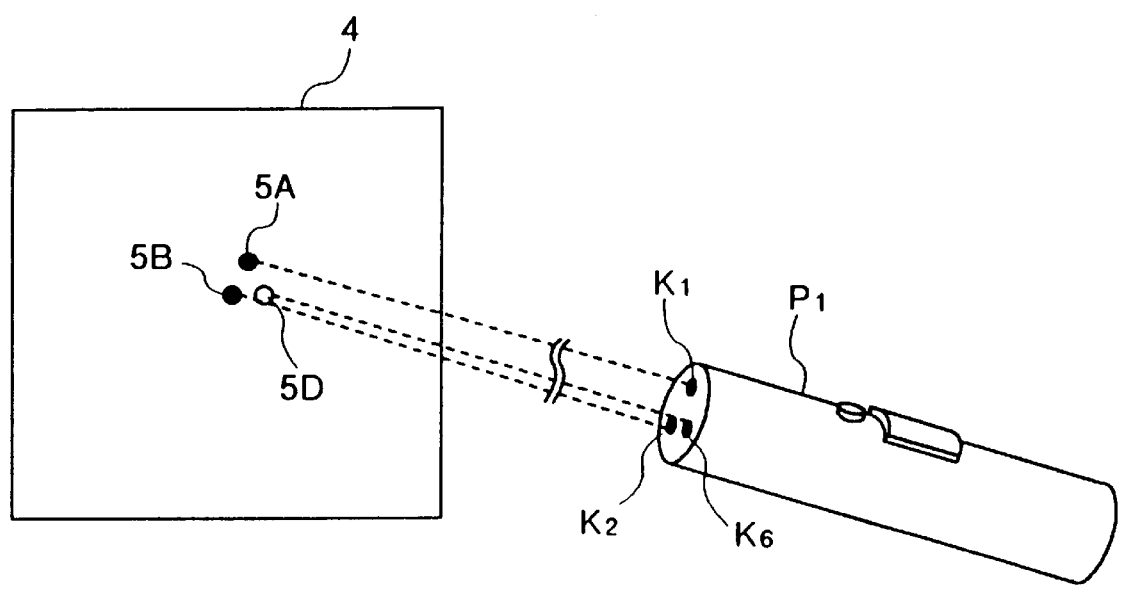

FIG. 18 shows a pointer which can emit both infrared ray and visible ray. Two points 5A and 5b on the display screen of the large screen display device 4 are of infrared ray and a point 5D is of visible ray. The visible ray indicates the point pointed by the pointer $P_1$. $K_6$ denotes a visible ray light source which may be a semiconductor laser which emits a visible ray as it is in FIG. 7.

The pointer $P_1$ is effective when it is used with a display device which cannot display a marker. For example, the mimic display device displays a system diagram in mosaic on a panel, turns on a color lamp to indicate the status, and embeds a meter in the mosaic to indicate the status amount at that point. In such a display device, it is not possible to display a marker on the display screen. When the meter is pointed by the pointer to output to the CRT display device the related detailed information or other related information, it is necessary to check if the pointed position is at the intended position or not. In such a case, the pointer $P_1$ may be used so that the user can watch the visible light to facilitate the pointing.

Further, the pointed object may be presented by the audio information so that whether the pointing point is the object which the user intends or not can be confirmed and the pointing is attained more certainly. In this case, the identification of the pointed object may be presented by the audio information 23 from the audio output unit 24 by converting the result derived from the object identification means 11.

Examples of displaying the information by using the mimic display device are plant monitoring in a central monitor room in a nuclear power generation station, a stem power plant, a steel plant or a chemical plant, monitoring of a power system indicating a power distribution path, a voltage and a current, monitoring of train operation status in railway service and presentation of stock information in financial and securities organizations.

By using the pointer P1 described above, a switch or a meter on the console/monitor board may be pointed to display the information related thereto.

In this case, it is necessary to determine which points of the mimic display device and the console/monitor board the pointing signal points. The pointed object may be identified by providing infrared light sources at four corners of the mimic display device and the console/monitor board and storing relative distances from those points to the objects.

Pointers as shown in FIGS. 19A–19J may be used. Each of those pointers have visible ray light sources. In each of FIGS. 19A–19E, one light source emitting a red ray is provided and green light sources are arranged therearound. Thus, when a plurality of pointers are used, each user may discriminate the pointer by the green pointing signal and confirm the pointing point by the red pointing signal. In FIGS. 19F–19J, the arrangement is opposite, that is, the pointers are discriminated by the red pointing signal and the pointing point is confirmed by the green pointing signal. In this manner, single light information to point the pointing point and a plurality of light information to discriminate the pointers are used to allow a large number of pointers to be discriminated. The image processing unit may process the lights emitted from all of those light sources as the pointing signal. The present pointer allows the visual checking of the pointing point by the user.

The present pointer is particularly effective when it is used to point the information displayed on the screen and the information displayed on the panel in order to have the pointed position by one user grasped by other users. Such applications may include conference, presentation and discussion.

FIG. 20 shows a configuration of the console/monitor unit having the large screen display device in accordance with other embodiment of the present invention. The present embodiment, while not shown, comprises the image processing unit 2 of FIG. 11, the coordinate translation means 10, the object identification means 11, the audio input units $16A_1$–$16A_N$, the input command analysis unit 15 and the information generation means 25. Numerals 4A and 4b denote the large screen display devices and numerals 40 and 41 denote backup boards (so-called console/monitor boards) relating to the operation of the plant. The backup boards 40 and 41 are provided with alarm display devices 8 for each system at the top thereof. The display device 8 has an alarm tile $8_i$ having an alarm item stamped thereon. When the alarm is to be indicated, a lamp attached to the alarm tile $8_i$ is turned on. Thus, the system relating to the displayed alarm can be identified. A particular one of a plurality of alarm items of the system in which the alarm was issued cannot be identified by the alarm display device 8 alone, and the contents are displayed on the discrete CRT display devices 6A–6G. Each of the backup boards 40 and 41 is further provided with an equipment status indication lamp, a CRT display device, an EL display, a switch and a recorder. Those are on the panel display. Infrared ray light sources $40A_1$–$40A_4$ are used to associate the coordinate of the pointing point of the pointing signal picked up by the monitor camera 1 to the pointed object or the position on the backup board 40 when the board surface of the backup board 40 is pointed by the pointer. Other infrared ray light sources $41A_1$–$41A_4$, $4A_1$–$4A_4$ and $4B_1$–$4B_4$ are used in the same manner.

The information which is necessary for the operators $A_1$ and $A_2$ to monitor the operation of the plant are displayed on the CRT display device 6A–6G provided on the console/monitor board 3. The display data to the CRT display device 6A–6G are generated based on the information from the plant and the result of operation of the operation means 7A–7C by the operators $A_1$ and $A_2$.

On the other hand, since the information displayed on the large screen display devices 4A and 4B are monitored by not only the operators but also the manger B who monitors the plant, the overall configuration of the plant, the important parameter to manage the plant and the status of the important equipments are displayed in the present embodiment, and the messages and the status of the important equipments change in the overall configuration of the plant as the operation proceeds and the values of the important parameters are displayed from time to time. The two large screen display devices 4A and 4B are used to monitor the overall status of the plant.

Specific examples of pointing and display are explained in detail. As an example, a nuclear plant is considered.

It is assumed that the operator Al uses the large screen display device 4A to output the information relating to the operation of the control rod to the CRT display device 6E.

Figure 21:
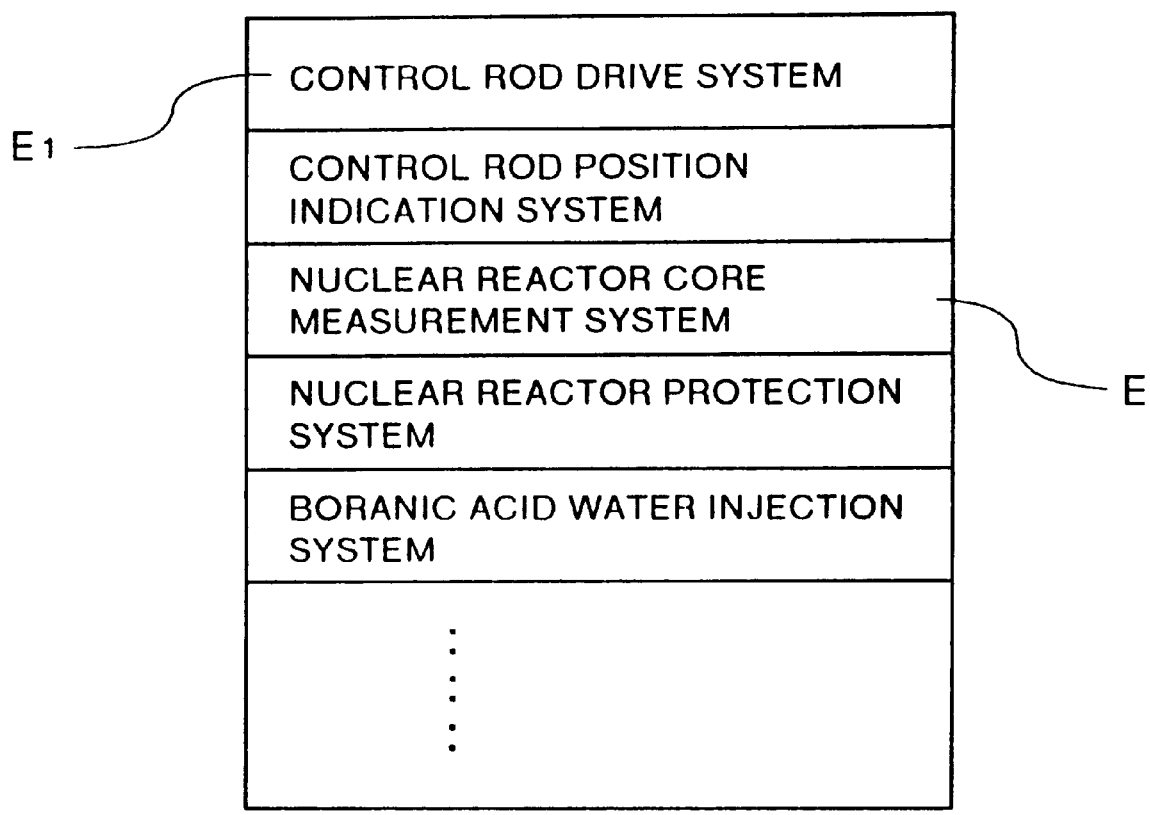
FIG. 21 illustrates information displayed on a display apparatus when a center of a furnace displayed on a large screen display device of FIG. 20 is pointed by a pointer.
Figure 22:
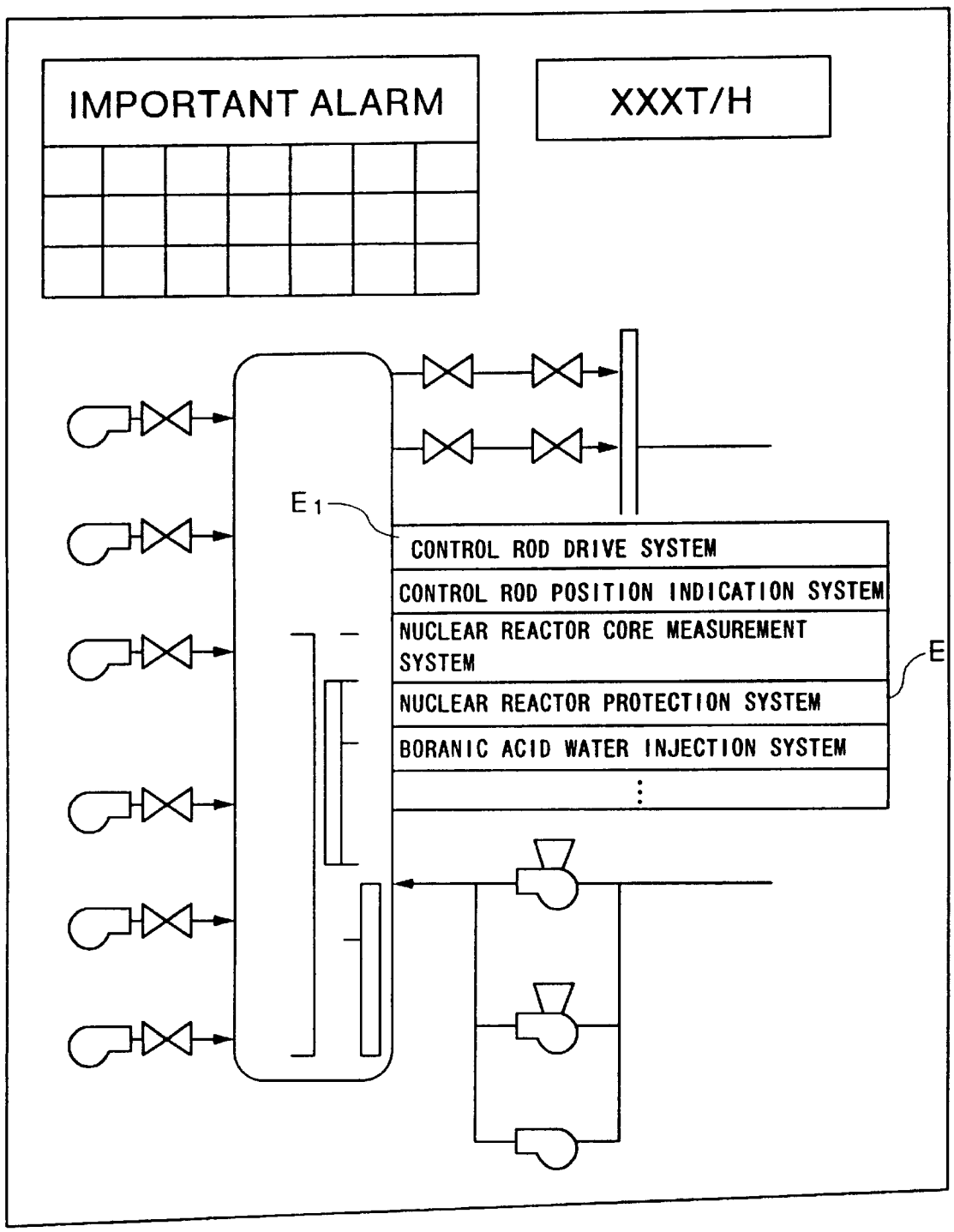
FIG. 22 illustrates a display of new display information of FIG. 20 on the large screen display device.

A reactor center display area (indicated by a pointing signal 5a) is pointed by the pointer Pa. As a result, the image processing unit 2 recognizes the pointed object and the pointer used to point it. As a result, the information shown in FIG. 21 is displayed on the CRT display device 6E in accordance with the type of pointer. The display process is executed by the display control unit 20 of FIG. 11. When the information of FIG. 21 is displayed on the large screen display device 4A, it is preferable to display the new display information E on the presently displayed information as shown in FIG. 22 rather than displaying the new information while erasing the presently displayed information, because the present display method allows the grasp of the outline of the overall information of the plant. The new information E of FIG. 22 may be displayed in place of the presently displayed information on the CRT display device 6E, or it may be overlaid as it is on the large screen display device 4A. If there is blank area on the display screen of the large screen display device 4A and the CRT display device 6E, the new display information E may be displayed therein.

Figure 23A:
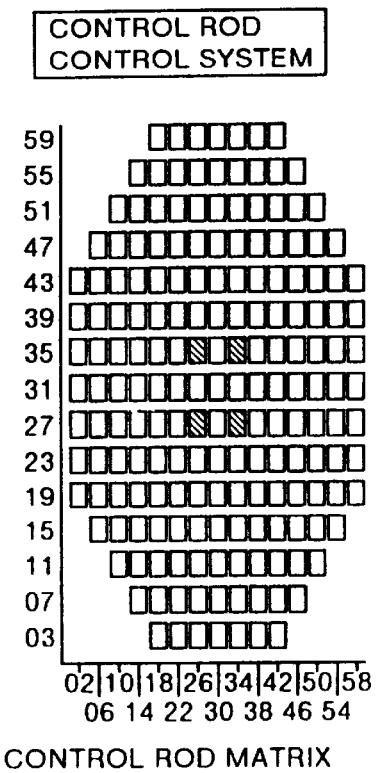
FIGS. 23A and 23B illustrate information displayed on the CRT display device when a control rod drive system $E_1$ of the displayed information shown in FIG. 22 is selected.
Figure 23B:
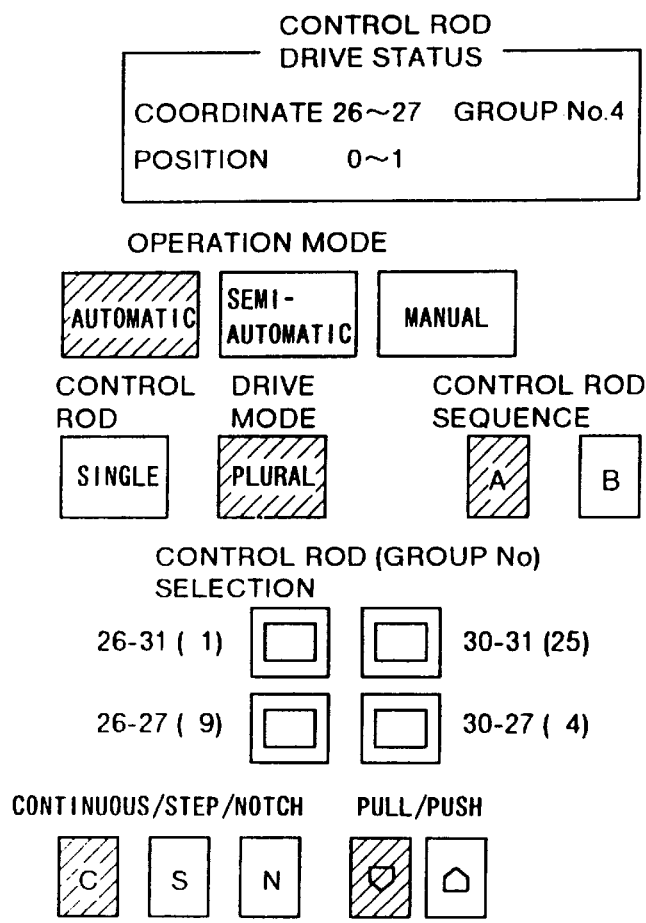

As shown in FIG. 2, when the new display information E is displayed on the large screen display device 4A, a necessary portion of the display information E is pointed by the pointer Pa1 to select the information. In this case, since the information relating to the control rod is required, the control rod drive system E1 of the display information is pointed so that the information relating to the control rod shown in FIGS. 23A and 23B is displayed on the CRT display device 6E. In this case, since the information E shown in FIG. 22 is no longer necessary, the display control unit 20 executes a process to erase the information E displayed on the large screen display device 4A. In displaying the information shown in FIGS. 23A and 23B on the CRT display device 6E, the audio input "Present control rod drive system, operation information" may be inputted through the head set microphone Ma1 instead of pointing the control rod drive system E1 of FIG. 22 by the pointer Pa1. In the example of FIG. 22, the new information is displayed on the large screen display device. Alternatively, whether to display on the large screen display device or the CRT display device may be determined by the type of pointer.

Where the CRT display device is of touch operation type, when the information E of FIG. 21 is displayed on the CRT display device 6E, the display area of the control rod drive system E1 may be touched by a finger to display the information of FIGS. 23A and 23B on the CRT display device 6E. It may also be inputted by the audio input through the head set microphone Ma1. When the image as shown in FIGS. 23A and 23B is displayed on the CRT display device 6E, the operator A1 indicates "operation mode", "rive mode", "sequence type" and "control rod number" through the touch operation. The hatched areas of FIG. 23B show the result of operation by the operator. Shaded portions in the control rod matrix shown left of FIG. 23A show the control rods selected by the operator A1 in association with the control rod addresses (for example, 26–27, 26–35, 34–35). FIGS. 23A–23B show an example of display of a CRT with touch operation. Since the operation and the information derived from the operation (for example, information of the drive status of the control rod) are outputted to the same screen by displaying the operation means, the operator can readily confirm the operation status.

In this case, the information may be displayed on the CRT display device 6E as well as other CRT display devices.

An example where other operator A2 uses a backup board 40 which is a console/monitor board to output new information to the CRT display device 6B. As information, alarm information is outputted to the CRT display device 6B.

Figures 24, 25:
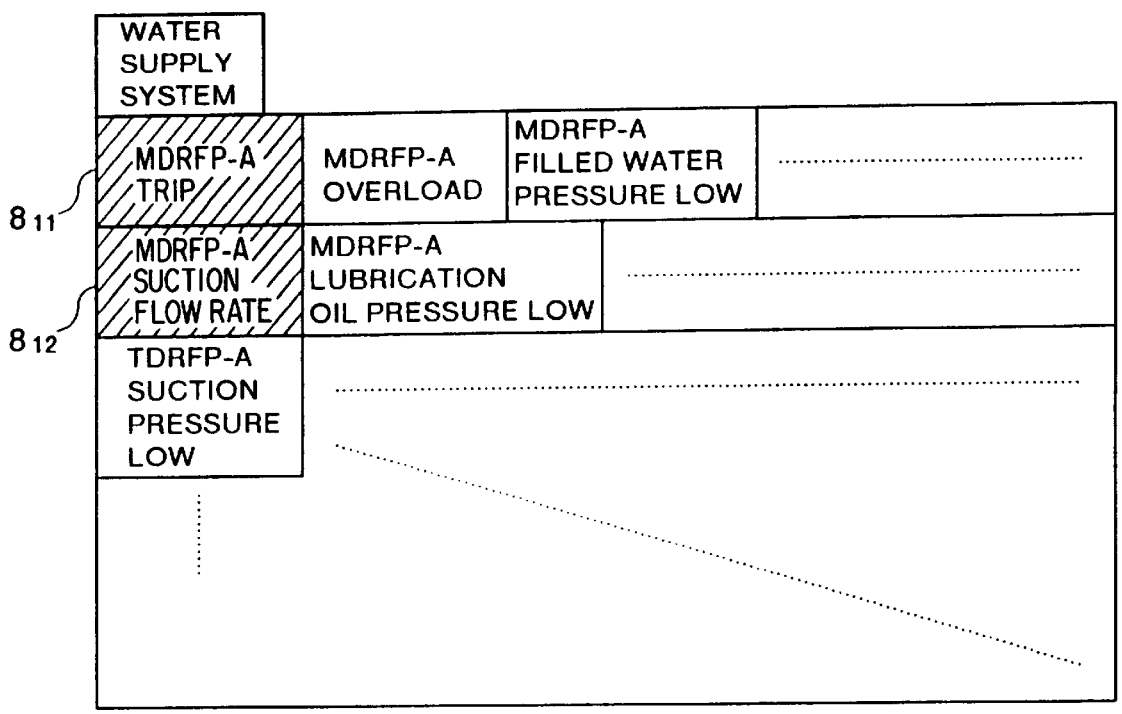
FIG. 24 illustrates a display when an alarm tile $8_i$ of FIG. 20 is pointed by the pointer.
FIG. 25 illustrates other display when the alarm tile $8_i$ is pointed of FIG. 20 is pointed by the pointer.

When a specific system alarm item of the system alarm display device 8 is selected to watch the detail thereof, a corresponding alarm tile $8_i$ is pointed. When the alarm tile $8_i$ is pointed by the pointing signal $5b$, The image processing unit 2 recognizes the pointed position and the type of pointer by the process described above. As a result, the alarm information shown in FIG. 24 or 25 is displayed on the CRT display device 6B. In FIG. 24, the hatched area indicates that the alarm (MDRFP-A drip $8_{i1}$ and MDRFP-A flow-in rate low $8_{i2}$) has occurred, and on the CRT display device 6B, it is displayed in different color to discriminate it from non-alarm area. In FIG. 25, the time of occurrence of the alarm is additionally displayed. In FIGS. 24 and 25, information on channel (water supply channel) is added.

In FIG. 25, alarm information which is displayed by pointing the alarm tile $8_i$ is shown. Of the display information of FIG. 24 displayed on the CRT display device 6B (touch screen type), the hatched area may be touched to output the information of FIG. 25. Thus, the alarm items included in the channel, which ones of them are being alarmed and the times of occurrence thereof may be readily grasped by the user.

In displaying the alarm, detailed alarm information is displayed by recognizing the pointed position without specifying the object to be displayed by the following reason.

In the large screen display device, where the content of the display screen is different from that pointed on the display screen of the display device is pointed, a different object may be pointed. Accordingly, when the display screen of the display screen is pointed, it is necessary to specify the pointed object to be displayed. However, when the object to be displayed is fixed as it is in the console/monitor board, the pointed area and the object to be displayed are in the one-to-one correspondence and the coordinate of the pointed area may be determined without specifying the object to be displayed and the information corresponding to the coordinate may be outputted.

As described above, when the object to be displayed is always fixed like in the panel display device such as a mimic display, it is not necessary to specify the object pointed to be displayed but the pointed area (coordinate) may be determined and the information allotted to the coordinate (corresponding to the pointed object to be displayed) may be outputted to the display device corresponding to the pointer.

In the embodiment of FIG. 20, the pointing to both the large screen display device and the console/monitor board is allowed. In pointing the fixed object to be displayed such as on the console/monitor board, a pointed area may be detected by a console/monitor unit of other embodiment of the present invention shown in FIG. 26 and new information may be generated based on the pointed area. A difference between the present embodiment and the embodiment of FIG. 11 that the object specifying means 11 in FIG. 11 is substituted by a pointed area detection means 180. Since the pointed area detection means 180 uses only the output information of the coordinate translation means 10 as the information of the pointed area, the coordinate translation means 10 may be considered as the pointed area detection means 180. The present embodiment may attain the same effect as that of the embodiment of FIG. 1.

Figure 26:
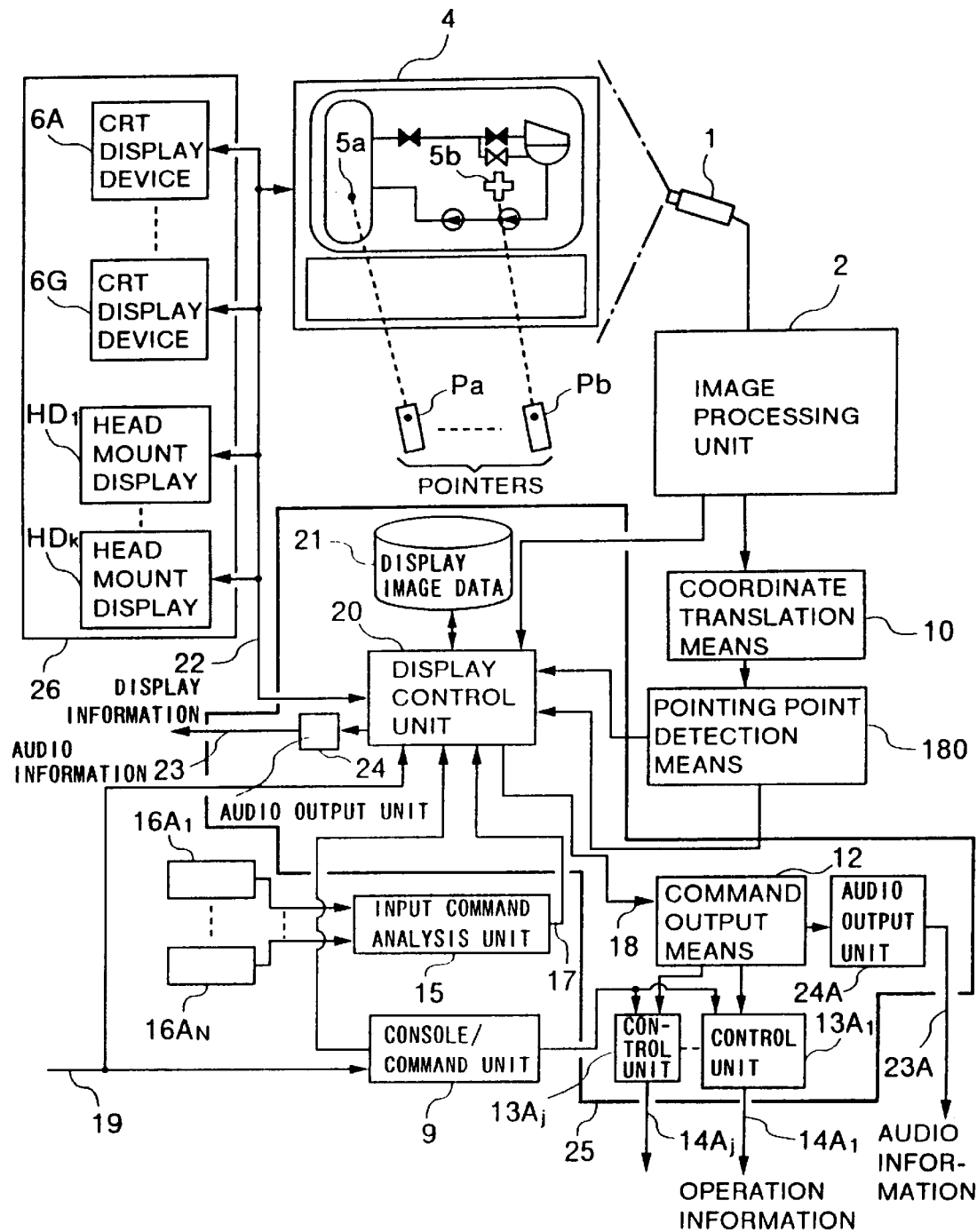
FIG. 26 shows a configuration of a console/monitor unit in accordance with other embodiment of the present invention.
Figure 27:
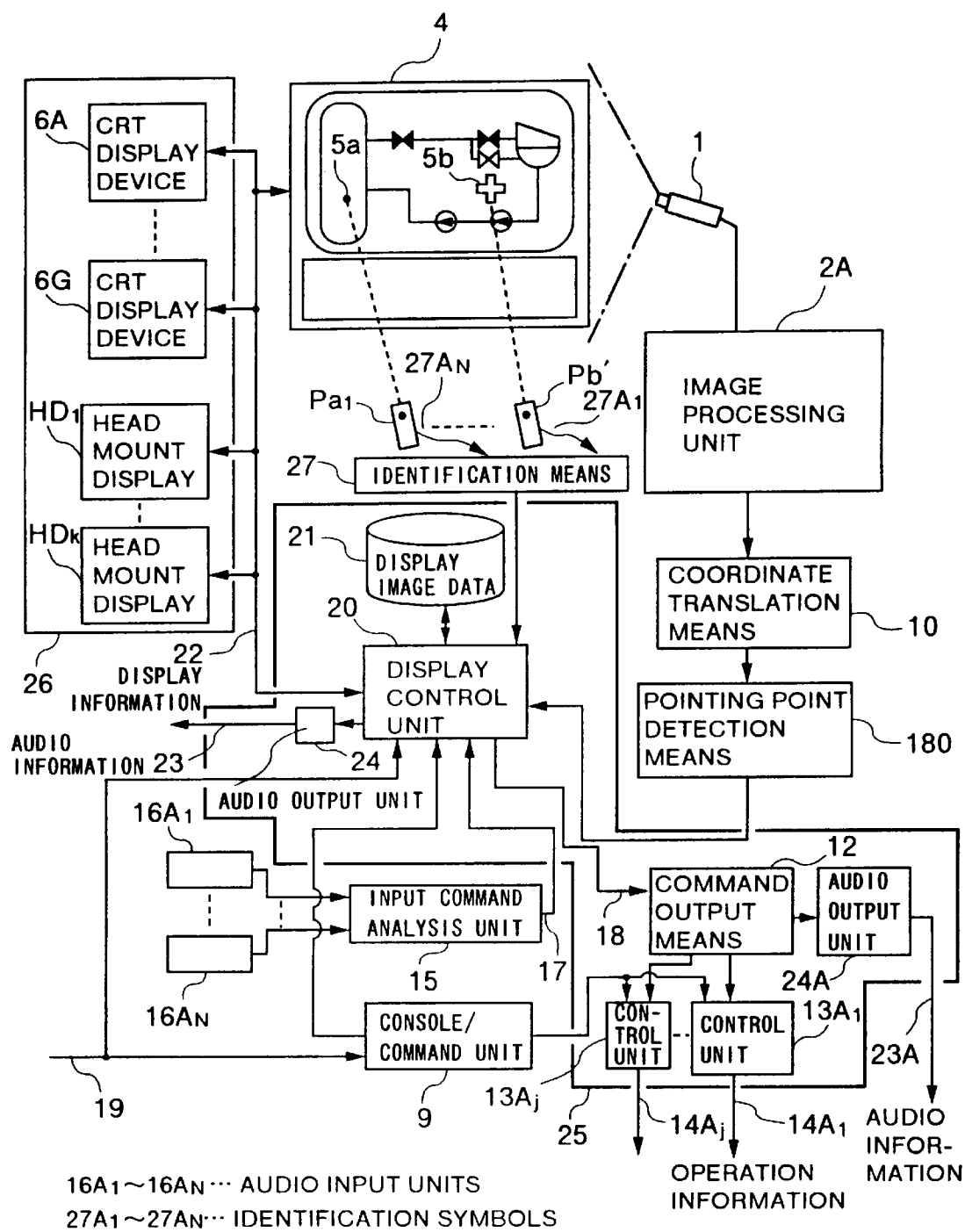
FIG. 27 shows a configuration of a console/monitor unit in accordance with other embodiment of the present invention.

FIG. 27 shows a configuration of a console/monitor unit of other embodiment of the present invention. A difference between the present embodiment and the embodiment of FIG. 26 is that the image processing unit 2A does not execute the process $2e$ of the image processing unit 2 but identification means 27 is provided instead. The identification means 27 receives identification means $27A_1$–$27A_N$ outputted from the pointers $Pa_1$–$Pa_{(N-1)}$ and Pb' and identifies the pointer which outputs the pointing signal based on the input signals. The result of identification is supplied to the display control unit 20. On the other hand, the image processing unit 2A determines the position (coordinate) of the area pointed by the pointer. The resulting position coordinate is corrected by the coordinate translation means 10 and outputted to the display control unit 20 through the pointed area detection means 180.

The present embodiment attains the same effect as that of the embodiment of FIG. 1. Further, in accordance with the present embodiment, since the function of the image processing unit 2 is simpler, the process of the image processing unit may be shortened and the overall response of the console/monitor unit may be enhanced. In addition, since the pointer is identified based on the identification signal and the identification by the image processing is not required, the pointing by the pointers having the same pointing information such as shape or color may be allowed.

The identification signal outputted from the pointer may be a ultrasonic signal, a wireless signal or a wired signal. In order to prevent the restriction of the space for the pointer, the use of the ultrasonic signal or wireless signal is preferable. In order to identify the pointer by this signal, the frequency or the output period of the identification signal may be changed from pointer to pointer.

Other embodiment of the console/monitor unit of the present invention is explained. The present embodiment is provided with object specifying means 11 in place of the pointed area detection means 180 of the embodiment of FIG. 27. Thus, in addition to the effect of the embodiment of FIG. 27, the present embodiment is effective in identifying the pointed object and generating the new information on the object.

Figure 28:
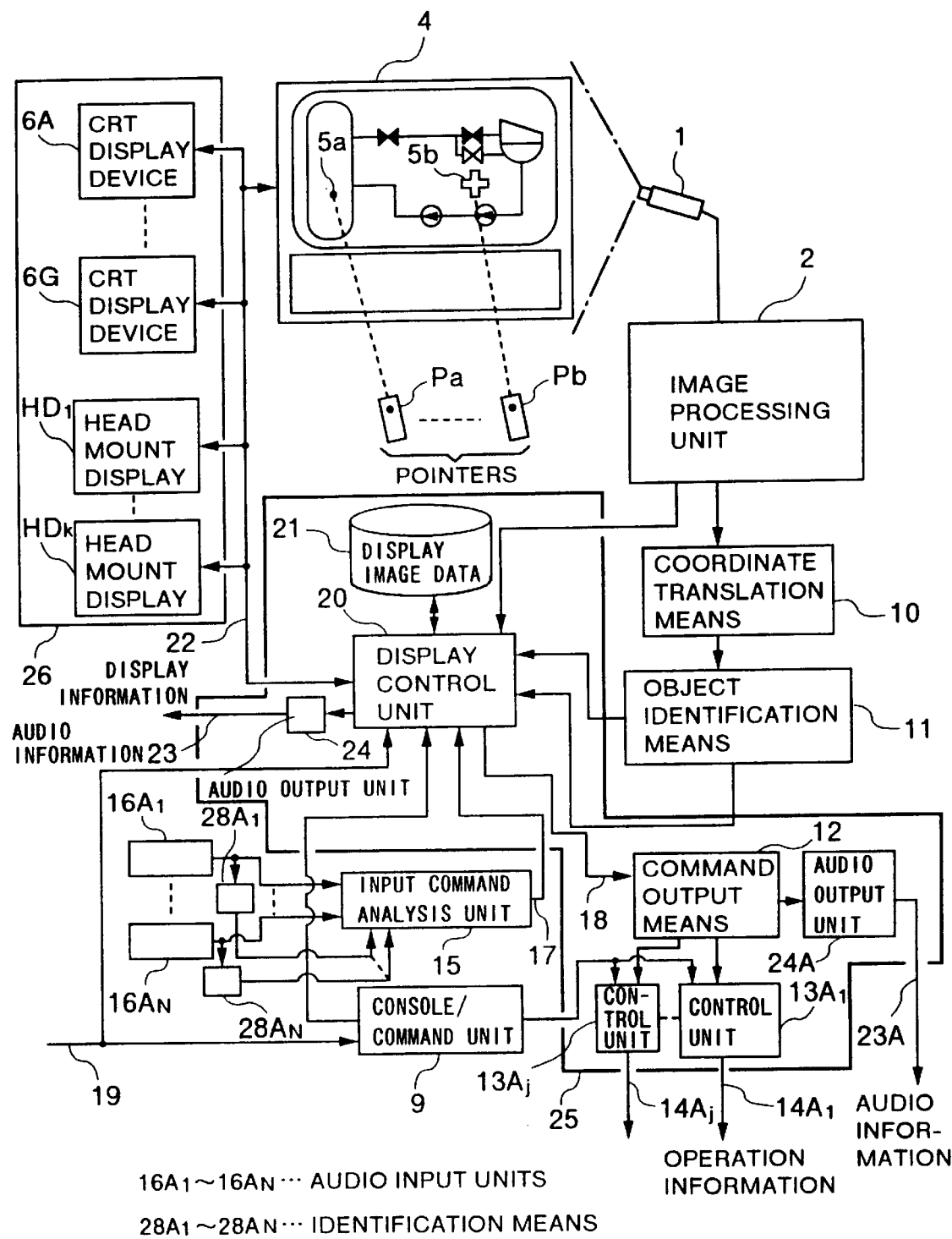
FIG. 28 shows a configuration of a console/monitor unit in accordance with other embodiment of the present invention.

Referring to FIG. 28, other embodiment of the console/monitor unit of the present invention is explained. The present embodiment differs from the embodiment of FIG. 27 in that object specifying means 11 is provided in place of the pointed area detection means, and identification means $28A_1-28A_N$ for identifying the pointers by using audio input information are provided in place of the identification means 27. Each of the identification means $28A_1-28A_N$ identifies the corresponding pointer by using the output signal of the corresponding one of the audio input units $16A_1-16A_N$. The pointers and the audio information on the attendants who input the audio information while using the pointers are associated in one-to-one relation so that the identification means $28A_1-28A_N$ may identify the pointer based on the audio information. The identification information which are the output signals of the identification means $28A_1-28A_N$ are supplied to the input command analysis unit 15 which outputs the analysis result of the command by the audio input to the display control unit 20. In this manner, the pointer may be identified by using the audio input signal. By associating the pointers Pa–Pb to the audio input units $16A_1-16A_N$ in one-to-one relation, the identification means $28A_1-28A_N$ may determine the presence or absence of the user by checking the outputs signals (audio information) from the audio input units $16A_1-16A_N$. When the analysis result is outputted to the input command analysis unit 15 as the identification information, the process by the identification means $28A_1-28A_N$ is very much simplified.

Figure 29:
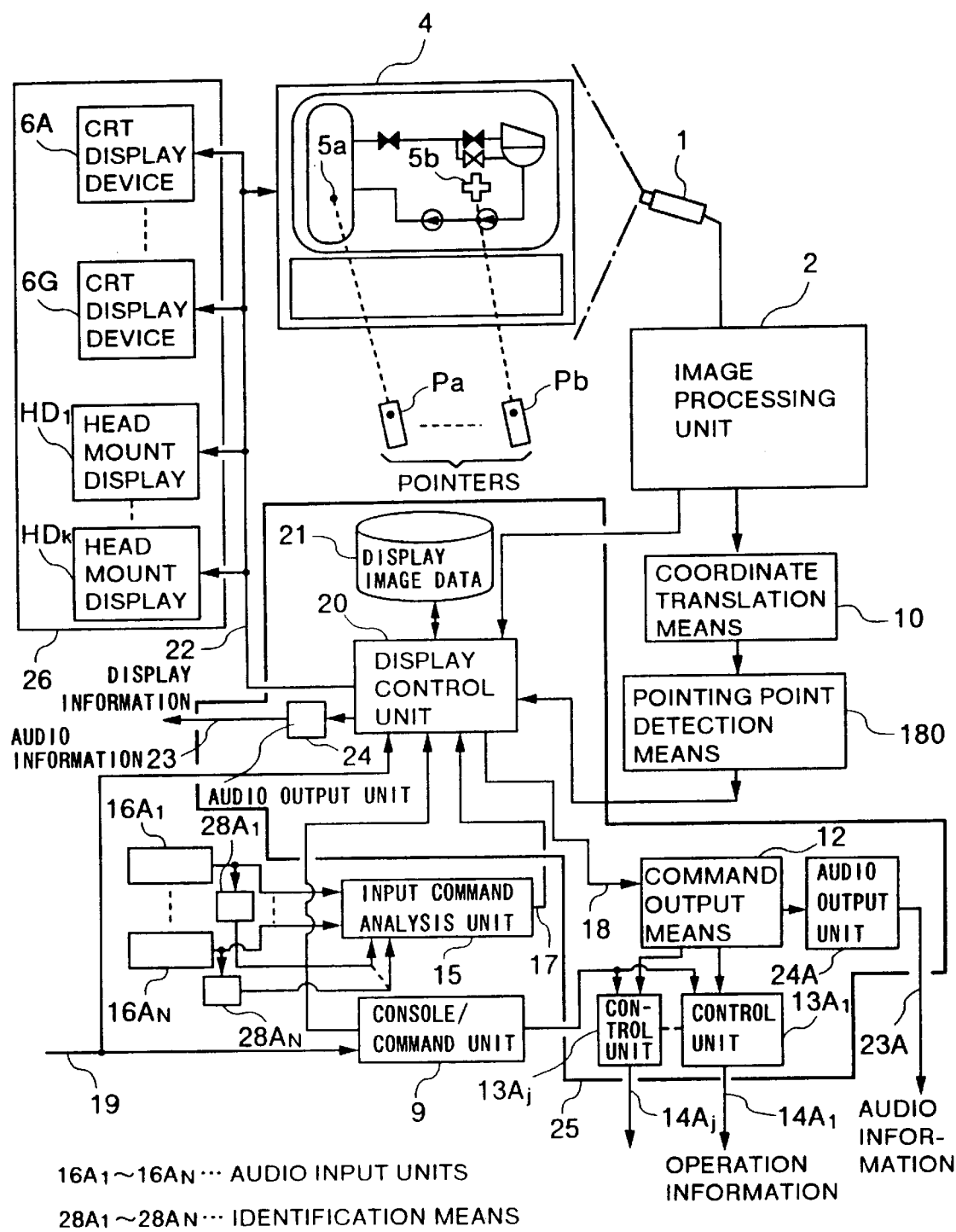
FIG. 29 shows a configuration of a console/monitor unit in accordance with other embodiment of the present invention.

FIG. 29 shows other embodiment of the console/monitor unit of the present invention. The present embodiment differs from the embodiment of FIG. 28 is that pointed area detection means 180 is provided in place of the object specifying means 11 of the embodiment of FIG. 28. The embodiment of FIG. 28 is applicable to the mimic display where the object to be displayed is fixed while the present embodiment is applicable even when the object is variable. The present embodiment attains the same effect as that of the embodiment of FIG. 1.

Figure 30:
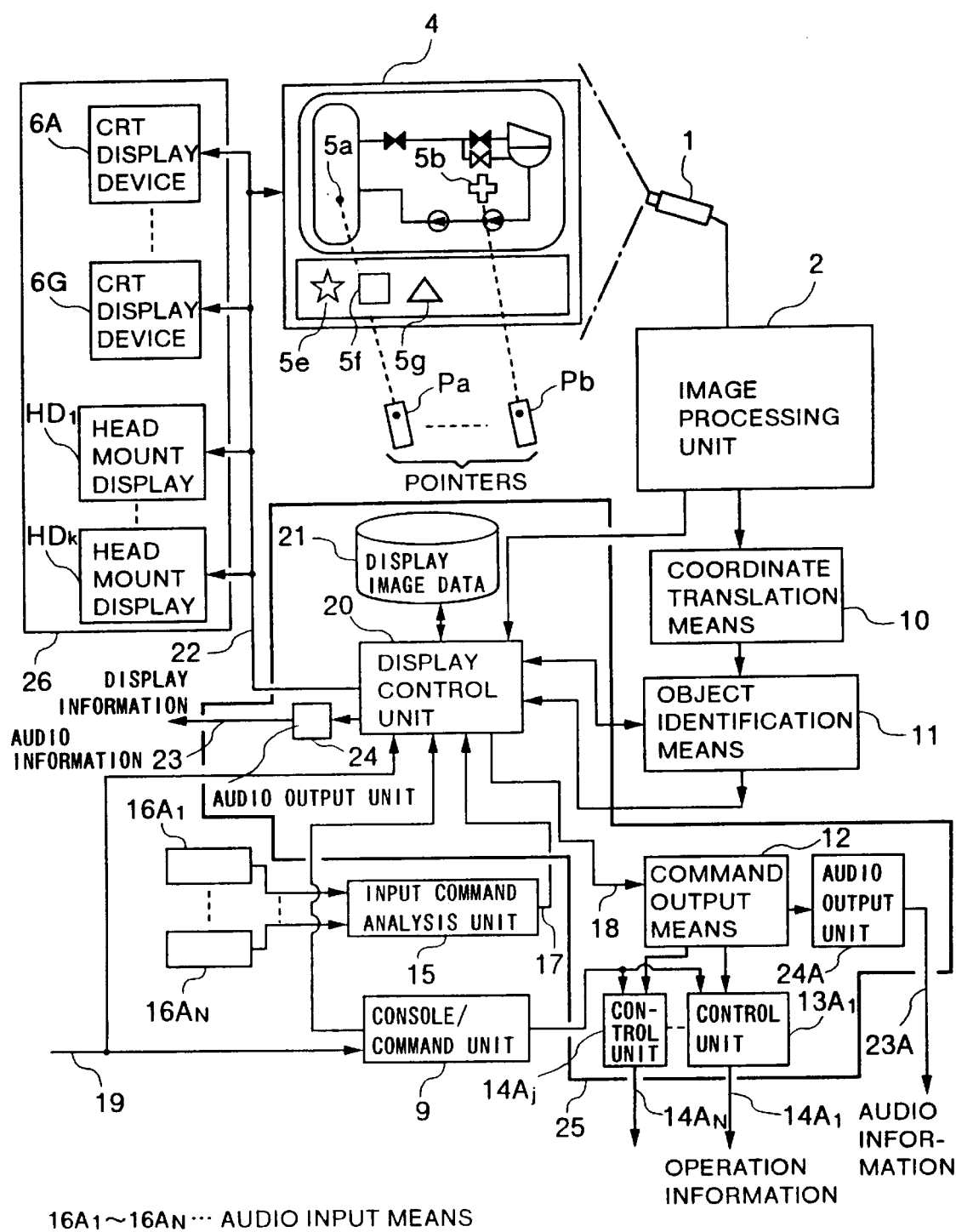
FIG. 30 shows a configuration of a console/monitor unit in accordance with other embodiment of the present invention.

Referring to FIG. 30, other embodiment of the console/monitor unit of the present invention is explained. The present embodiment differs from the embodiment of FIG. 11 in that the markers 5a, 5b, 5e, 5f, 5g, . . . are previously displayed on the large screen display device 4 and the mark is selected by directing the pointing signal of the pointers Pa and Pb to one of the marks. The selected mark is moved onto the object to be displayed by the pointing operation and the pointing signal from the pointer is turned off to select the object to be pointed. This process is executed by the display control unit 20. The display control unit displays the pre-registered marker 5a at the predetermined area (at the bottom of the display screen in FIG. 30) of the large screen display device 4.

In the embodiments of FIGS. 11 and 26–30, various objects to be displayed or various pointing points are pointed by various pointers to generate new information relating to the pointed objects or pointed areas, as described above. However, when roles of the respective operators are predetermined as in the plant control, it may be desirable to restrict the pointing ranges of the respective operators. In order to cope therewith, the pointing range is allocated to each pointer and whether the pointing by the pointer is within the predetermined pointing range or not is determined, and the pointing is accepted only when it is within the pointing range.

Figure 31:
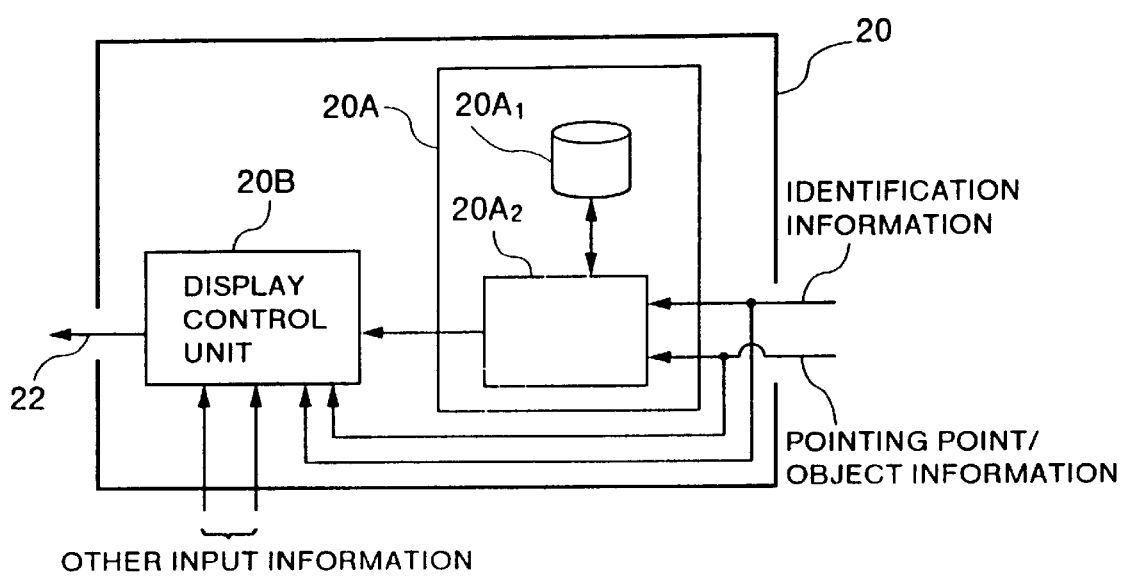
FIG. 31 shows a configuration of other embodiment of the display control apparatus having allocation discrimination means, FIG. 32 illustrate a process of double clicking applied in detecting the pointed object and the pointing point.

The discrimination process is executed by the display control unit 20. In this case, the display control unit 20 has a configuration as shown in FIG. 31, particularly it is provided with allocation discrimination means 20A. The configuration of FIG. 31 may also be applied to the display control units 20 of the embodiments of FIGS. 11 and 26–30.

The allocation discrimination means 20A has a pointing range registered information storage means $20A_1$ and coincidence detection means $20A_2$. When the coincidence detection means $20A_2$ receives the pointer identification information (which indicates the identification result of the pointer) and the pointing point/object information (which indicates the pointing point or the pointed object), it reads information indicating a range permitted for pointing (pointing range registered information) corresponding to the identification information from the pointing range registered information storage means $20A_1$. The read information is compared with the input pointing point/object information, and if they match, a permission signal to permit the pointing is outputted to the display control unit 20B. If they do not match, non-permission signal is outputted. Thus, the pointing range for each pointer may be restricted.

The display control unit 20B has the functions of the input statement analysis unit and the display information generation unit in the display control unit of the embodiments of FIGS. 11 and 26–30. Accordingly, when the display control unit 20B receives the permission signal, it generates the corresponding display information by the process of the input statement analysis unit and the display information generation unit and outputs it to the corresponding display device.

Figure 32:
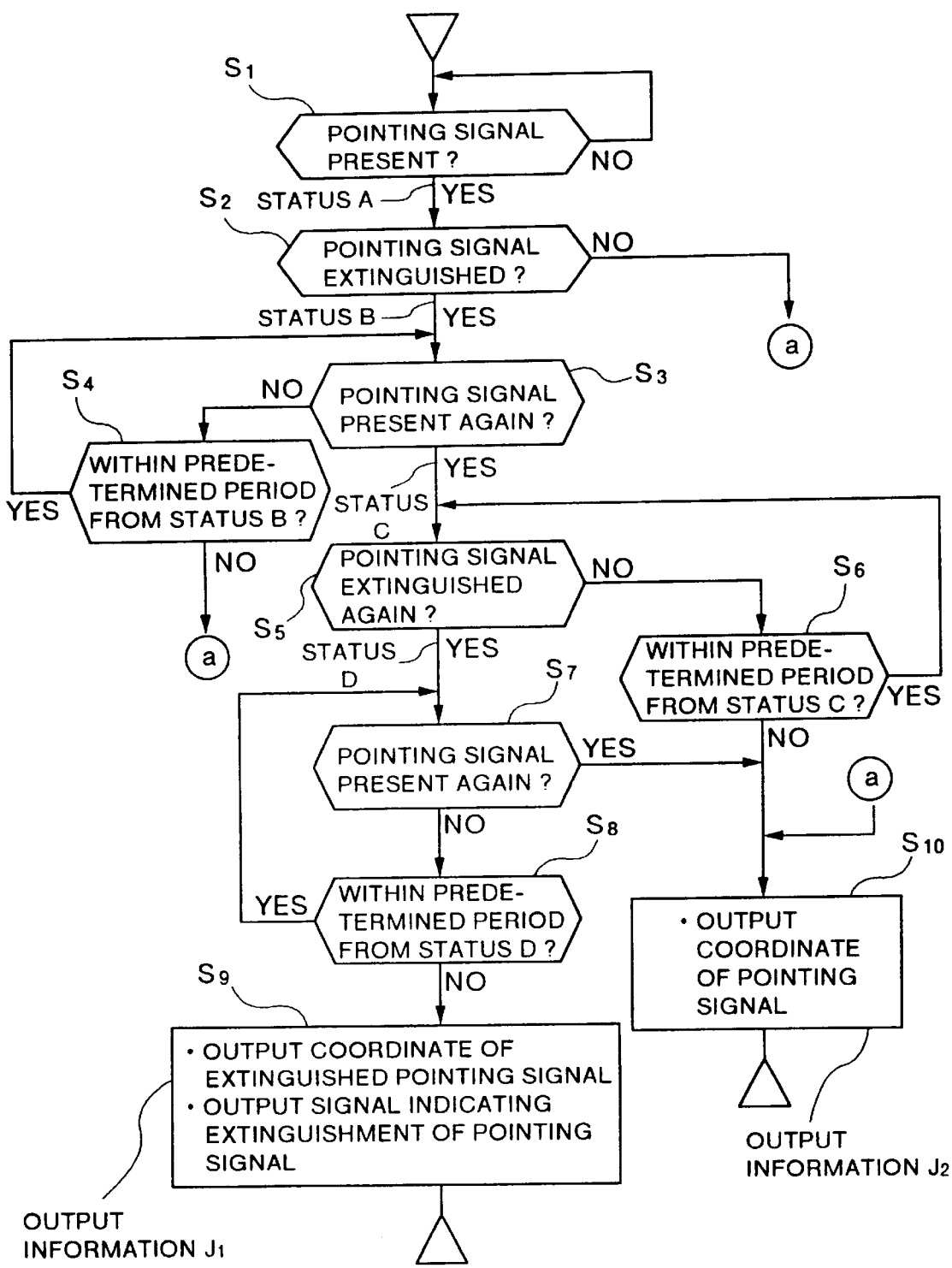

In the foregoing description, the pointed area or pointed object pointed immediately before the pointing information emitted from the pointer is extinguished is recognized as the point or object pointed by the pointer. However, it may occur that the user inadvertently turns off the switch ($K_5$ in FIGS. 6 and 7) of the pointer or other person intercepts the space between the pointer and the large screen display device so that the pointing information is temporarily extinguished and the point or object which is different from that the user wanted to point may be recognized as the pointed area. This problem may be solved by recognizing the extinguishment of the pointing signal when the switch of the pointer is turned off twice in a predetermined time period. Namely, when the pointing signal is extinguished once, again emitted in a predetermined period and extinguished again, the extinguishment of the pointing signal is recognized. Namely, the extinguishment of the pointing signal is recognized by the double clicking of the switch of the pointer. A process therefor is shown in FIG. 32. It is executed by the image processing unit 2 (or the display control unit 20) in the embodiments of FIGS. 1, 11 and 26–30.

The process of FIG. 32 is explained in detail. FIG. 32 shows the process when the pointing signal is detected and this process is repeatedly executed. The output information $J_1$ of FIG. 32 indicates that the pointing signal has been extinguished correctly. Only when the output signal $J_1$ is generated, the display control unit 20 generates new information for the indication of the pointer. For the output information $J_2$, it merely indicates the position of the pointing signal and it is used for the display of the marker. In FIG. 32, when the pointing signal is issued three times or more, the output information A is not supplied to enhance the reliability of the detection of the pointing signal. In actual trial of the double clicking of the pointer, the switch of the pointer was depressed three times in several cases. In FIG. 32, the output information $J_1$ may be generated immediately when the state D is produced. Thus, the process which meets the actual manipulation may be attained.

Figure 33:
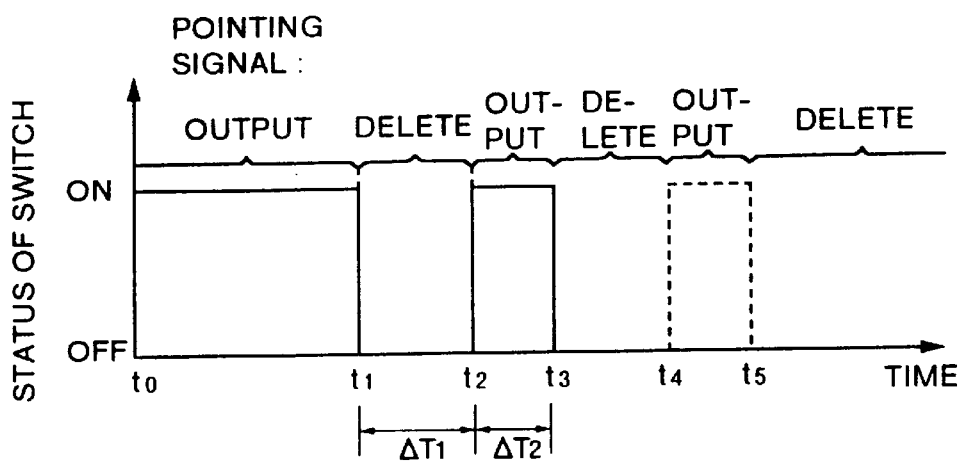
FIG. 33 illustrates output status of the designated information to the double clicking of the pointer of FIG. 32.

FIG. 33 shows an output status of the pointing signal to the double clicking of the pointer.

In the process of FIG. 32, the pointing signal is detected in a step $S_1$, and the extinguishment of the pointing signal is detected in a step $S_2$. If the pointing signal is not extinguished, the process proceeds to a step 10, returns to the beginning and processes the steps $S_1$ and $S_2$. When the extinguishment of the pointing signal is detected in the step $S_2$, the process proceeds to a step $S_3$. This state is shown in FIG. 33 in a period $\Delta T_1$ from $t_0$ to $t_1$.

If the absence of the pointing signal is detected in the step $S_3$, the process proceeds to a step $S_4$. As shown in the step $S_4$, if the decision is YES, the process returns to the step $S_3$. Namely, the process is in the period $AT_1$. If the decision of the step $S_4$ is NO, it indicates that the reissuance of the output of the pointing signal has no occurred in the period $\Delta T_1$ and the process return to the start after the processing of the step $S_{10}$. Namely, it is determined that the pointer was not double-clicked. Thus, the reliability of the detection of the pointing signal is enhanced.

If the decision of the step $S_3$ is YES, the process proceeds to a step $S_5$. This indicates that the status is now that of $\Delta T_2$ of FIG. 33. In the step $S_5$, if the decision is NO, the process proceeds to a step $S_6$. In the step $S_6$, if it is determined that the pointing signal is not extinguished after the elapse of $AT_2$, it indicates that the double clicking of the pointer has not been made, and the process returns to the start after the process of the step $S_{10}$. If the decision of the step $S_6$ is YES, the step returns to $S_5$. If the decision of the step S5 is YES, the process proceeds to a step $S_7$. The status of the step $S_7$ is same as that between $t_3$ and $t_4$ of FIG. 33. If the decision of the step $S_7$ is NO and the decision in the step $S_8$ is also NO, it indicates that the pointer has been double-clicked. Accordingly, the process returns to the step $S_7$ after the process of the step $S_9$ if the decision in the step $S_8$ to return to the start is YES. If the decision of the step $S_7$ is YES, the status is that between $t_4$ and $t_5$ of FIG. 33. Namely, it indicate that the double clicking or multiple clicking has been made and the process returns to the start after the process of the step $S_{10}$.

As described above, only when the double clicking is made in the predetermined time period, it is recognized that the pointing signal has pointed a specified area. Where the multiple clicking (for example, triple clicking) is permitted, the steps $S_7$ and $S_8$ may be eliminated if the decision of the step $S_5$ is YES and the step $S_9$ may be executed. In FIG. 33, the status after $t_3$ is permitted. Thus, even if the user is not practiced in the manipulation of the pointer, the pointing which permits it may be attained. In the step $S_{10}$, the coordinate of the extinguished pointing signal is outputted. In actual, however, since the extinguished pointing signal cannot be detected, the coordinate of the pointing signal immediately before the extinguishment of the pointing signal is outputted.

The approach to enhance the reliability of the detection of the pointing signal described above is applicable whether the types of pointer included are plural or single. Further, it is applicable whether the number of pointers is plural or single. It is true for the following embodiments.

FIG. 32 shows other embodiment for the approach to enhance the reliability of the detection of the pointing signal. The large screen display device 4 is considered for the purpose of explanation. An ineffective display area AR1 is provided for the display screen of the large screen display device 4 and the information is not displayed in AR1 but displayed in an effective display area AR2 (within the pointing range). This is effected by the display control unit 20 of FIG. 11. By providing the ineffective display area AR1 in the periphery of the display screen of the display device, the user is prevented from pointing the ineffective display area AR1 by the pointer and if the pointing signal is in AR1, the pointing is not recognized as effective even if the pointing signal is extinguished in AR1. If AR1 is not provided and if the pointing signal is moved toward the right top and moved beyond the large screen display device 4 and disappears, the coordinate of the pointing signal immediately before the disappearance may be recognized as the extinguishment position of the pointing signal. On the other hand, when the display screen of the large screen display device is handled in the manner shown in FIG. 34, the above problem is solved. When the pointing signal is present in the ineffective display area AR1, the marker is displayed in AR1.

Figure 34:
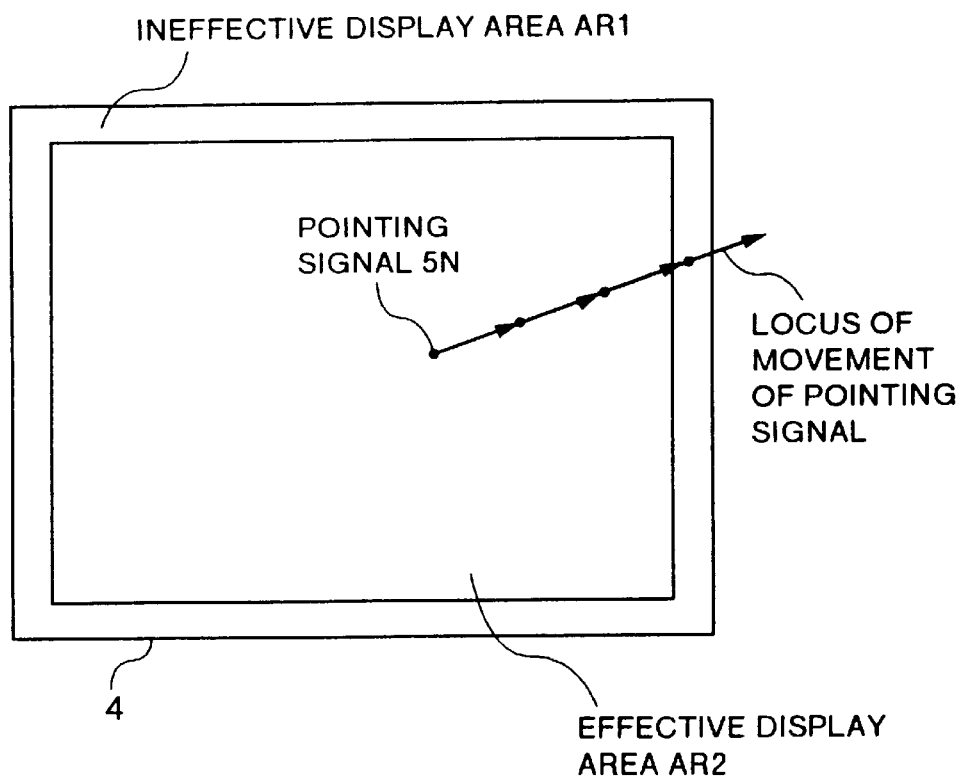
FIG. 34 shows other embodiment for improving a reliability of the detection of the designated information.

For the pointing of the display device such as the mimic display and the console/monitor board, the pointing range is set to the effective display area AR2 and the others are set in the same manner as that shown in FIG. 34 and the areas other than the effective display area AR2 are set to the ineffective display area AR1.

Figure 35:
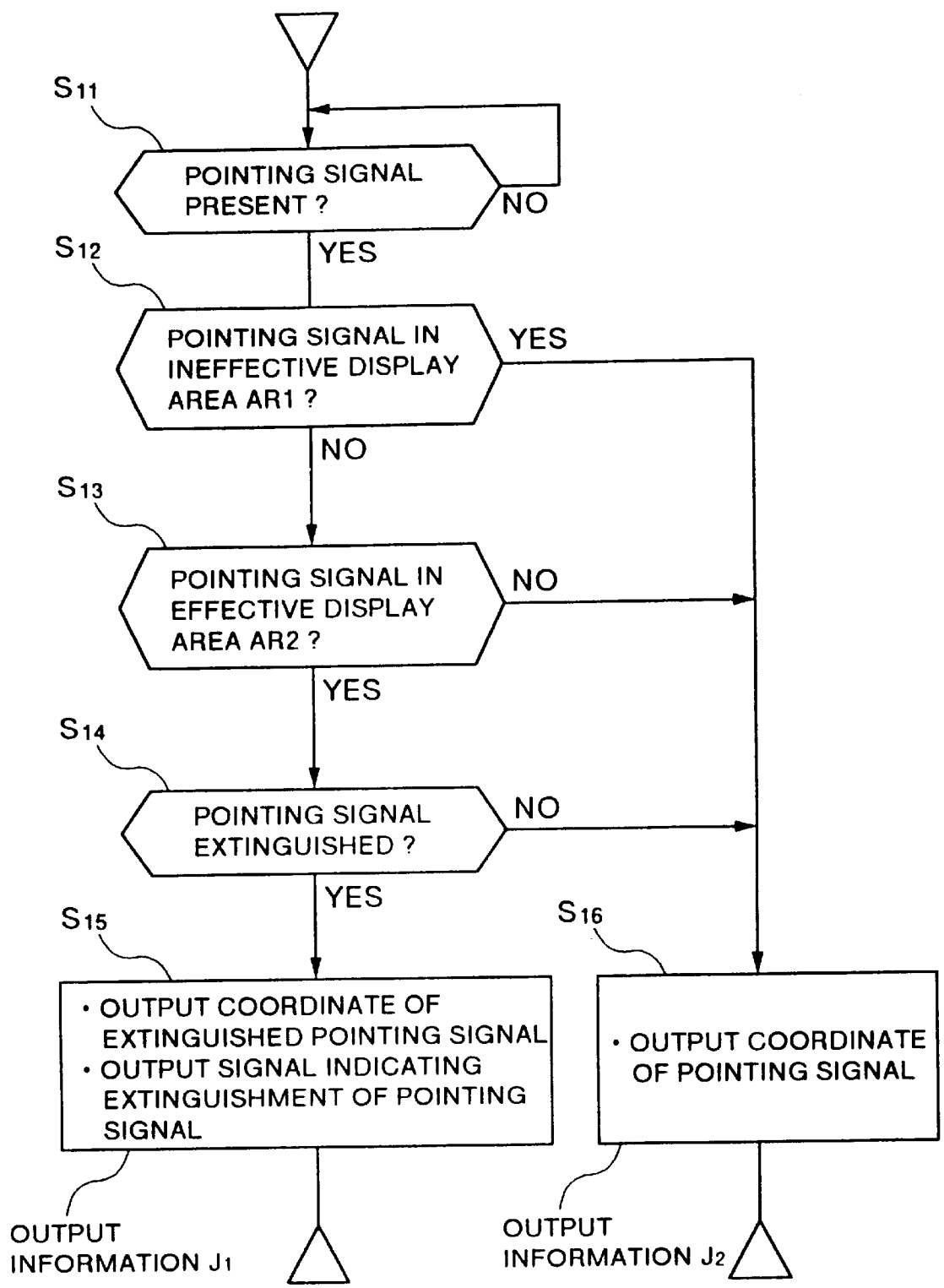
FIG. 35 illustrates a process for enhancing the reliability of detection in detecting the pointed object or pointing point in FIG. 34.

FIG. 35 shows a process executed by the image processing unit 2 (or the display control unit 20) in the embodiments of FIGS. 1, 11 and 26–30. The output information $J_1$ of FIG. 35 indicates the correct pointing, and only when this information is produced, the display control unit 20 generates new information for the pointing by the pointer. The output information $J_2$ merely indicates where the pointing signal is and it is used for the display of the marker.

In FIG. 35, the pointing signal is detected in a step $S_{11}$, and whether the pointing signal is in the ineffective display area AR1 or not is determined in a step $S_{12}$. If the decision is YES, the process executes a step $S_{16}$ and returns to the start. Namely, when the pointing signal is in the ineffective display area AR1, it is not regarded effective even if the pointing signal is extinguished in the ineffective display area AR1. If the decision in the step $S_{12}$ is NO, the process proceeds to a step $S_{13}$. If the pointing signal is in the effective display area AR2, the process proceeds to a step $S_{14}$ to determine if the pointing signal has been extinguished or not. If the pointing signal has been extinguished, the process proceeds to a step $S_{15}$ to output the output information $J_1$, and the process returns to the start. Otherwise, the step $S_{16}$ is executed and the process returns to the start. The output information $J_1$ of FIG. 35 is same as that of FIG. 32, and the output information $J_2$ of FIG. 35 is same as that of FIG. 32. Thus, only when the pointing signal is extinguished when the pointing signal points the effective display area AR2, the new information is generated for the pointed area or object and the reliability of the detection of the pointing signal is enhanced.

In the process of FIG. 35, the output information $J_1$ may be outputted only when the pointing signal is extinguished by the double clicking of the pointer. Namely, the processes of FIGS. 25 and 32 are used in combination. This is attained by substituting the step $S_2$ onwards (namely, $S_2$–$S_{10}$) of FIG. 32 by the step $S_{14}$ onwards (namely, $S_{14}$–$S_{216}$) of FIG. 35. Thus, the reliability to the detection of the pointing signal is further enhanced. The pointing signal may be extinguished while it is moved. The causes therefor are the intentional extinguishment of the pointing signal by the pointing operation of the user and the move-off of the pointing signal from the large screen display device. The former is of no problem but for the latter, the moving locus of the pointing signal is tracked and when it is anticipated that the pointing signal move off the large screen display device, it is not recognized as an effective signal even if the pointing signal is extinguished.

The above processes are in accord to the actual manipulation of the pointer and may enhance the reliability to the detection of the pointing signal.

Figure 36:
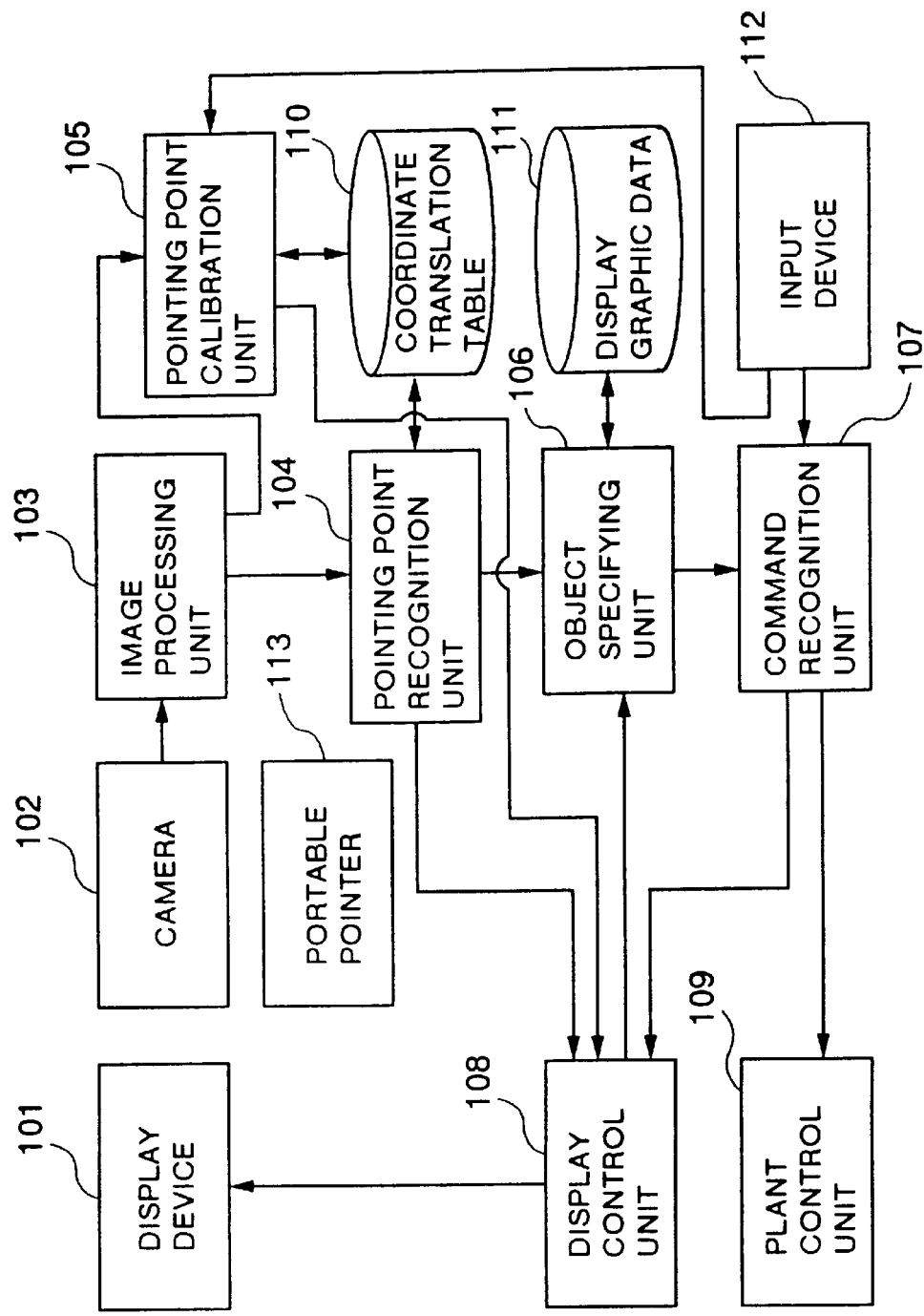
FIG. 36 shows a configuration of an information display apparatus in accordance with other embodiment of the present invention.

Referring to FIG. 36, other embodiment of the information display apparatus of the present invention is explained.

The information display apparatus of the present embodiment comprises a display device 101, a TV camera (for example, an infrared camera) 102 which is image pickup means, an image processing unit 103, a pointing point recognition unit 104, a pointing point calibration unit 105, an object specifying unit 106, a command recognition unit 107, a display control unit 108, a plant control unit 109, memories 110 and 111, and an input device (keyboard, mouse and audio input unit) 112. The display device 101 may be of CRT type or liquid crystal type having a display screen, or may have a screen and an image projector for projecting an image on the screen (for example, a projection display device 7 shown in FIG. 1 of JP-A-4-37922). In the present embodiment, a large screen display device having the CRT as the display screen is used as the display device 101. In this type of display device, the entire display screen is the area in which the image is displayed. Numeral 113 denotes a portable pointer for outputting an infrared laser beam which is the pointing signal to the display screen of the display device 101.

The display screen of the display device 101 is pointed by the infrared laser beam (pointing signal) emitted from the pointer 113. In the present embodiment, when the switch of the infrared laser beam emission of the pointer 113 is turned on and then turned off, the input of the pointing point is recognized. The TV camera 2 picks up the image of the display screen of the display device 101. The image processing unit 103 processes the image picked up by the TV camera 2 to determine the coordinate of the pointing point pointed by the infrared laser beam. The pointing point recognition unit 104 corrects the coordinate of the pointing point derived from the image processing unit 103 by using the calibration data (for example, the coordination translation data) stored in the memory 110 to determine the actual position (coordinate) of the pointing point on the display screen of the display device 101 and recognize the position of the pointing point. The object specifying unit 106 specifies the object (the object to be displayed pointed by the pointer 113) at the pointing point recognized by the pointing point recognition unit 104, of the objects displayed on the display screen of the display device 101 by using the data of the information (stored in the memory 111) displayed on the display screen of the display device 101 at the time when pointed by the pointer. The object specifying unit 106 outputs information of a character string representing the specified object. The command recognition unit 107 combines the character string information and the information supplied from the input device 112 (for example, audio information or input information form the keyboard) into a single input statement. The command recognition unit 7 further analyzes the input statement and prepares a command to the display control unit 108 and/or the plant control unit 109. The command signal derived by the recognition by the command recognition unit 107 is supplied to the display control unit 108 (or in some cases to the plant control unit 109). The display control unit 108 prepares the information to be displayed on the display device 101 based on the command signal by using the information in the memory 111. The prepared information is supplied to the display device 101 for display.

When the pointing point calibration unit 105 receives a calibration command signal, it prepares calibration data which associates specified display position of the marker displayed on the display screen with the position information of the image of the marker on the display screen picked up by the TV camera 102. When the specified position recognition unit 104 receives the calibration command signal outputted from the input device 112, it does not correct the pointing point by using the calibration data in the memory 110. The calibration command signal is outputted from the input device 112 by the user manipulation.

After the information display apparatus of the present embodiment is installed at a predetermined position for use, the position of the marker recognized by the image of the marker picked up by the TV camera 102 is calibrated before the use of the information display apparatus in order to reduce the adverse affect to the recognition of the pointing point due to the distortion of the picked-up image due to the lens aberration of the TV camera 102 and the installation position of the TV camera 102. This calibration mode is effected by using the pointing point calibration unit 105 of the present embodiment and the image processing unit 103.

The calibration mode is first explained.

Figure 37:
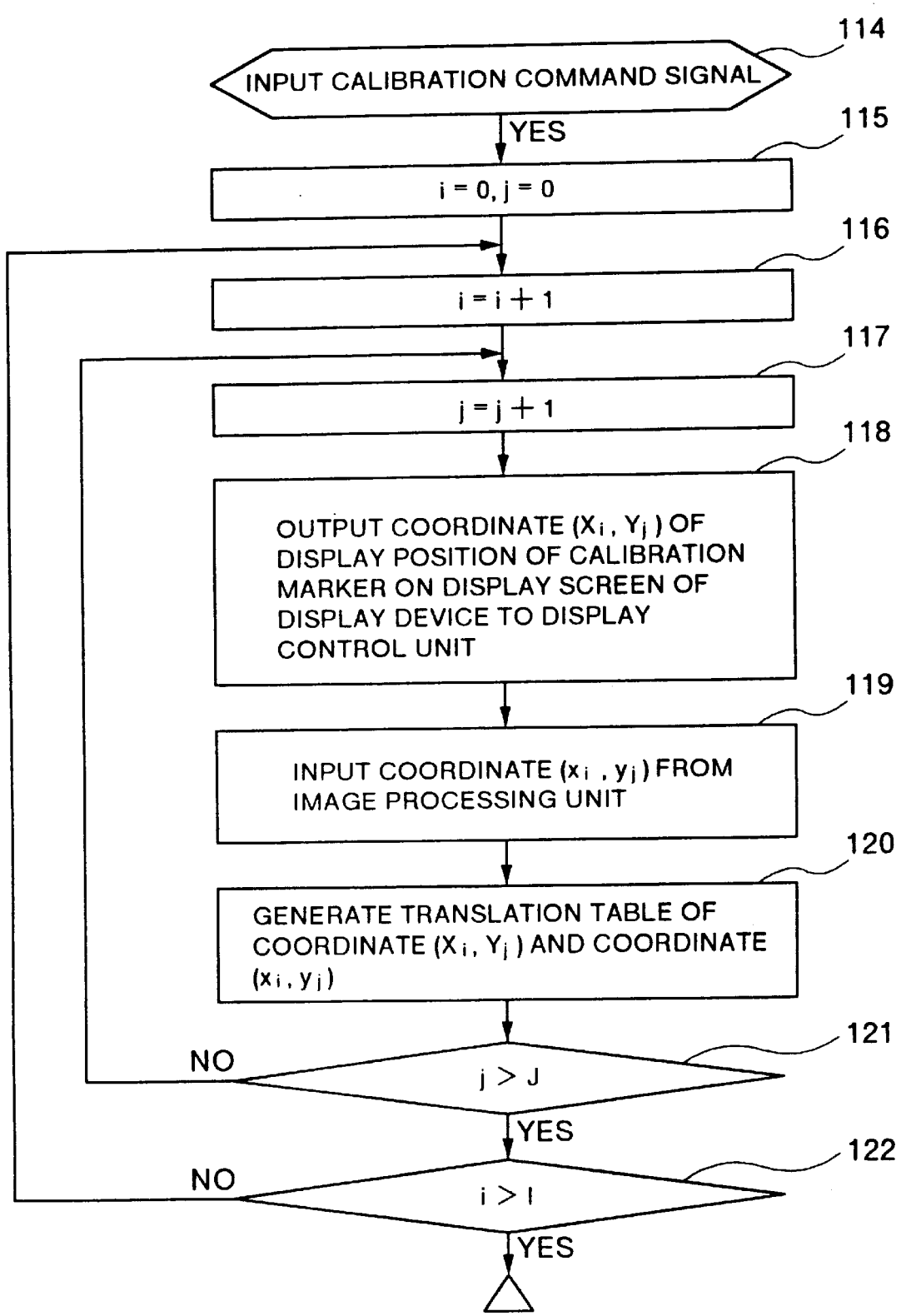
FIG. 37 illustrates a process executed by a pointing point calibration unit of FIG. 36, FIG. 38 illustrate a status of a calibration marker displayed on a display device.
Figure 45:
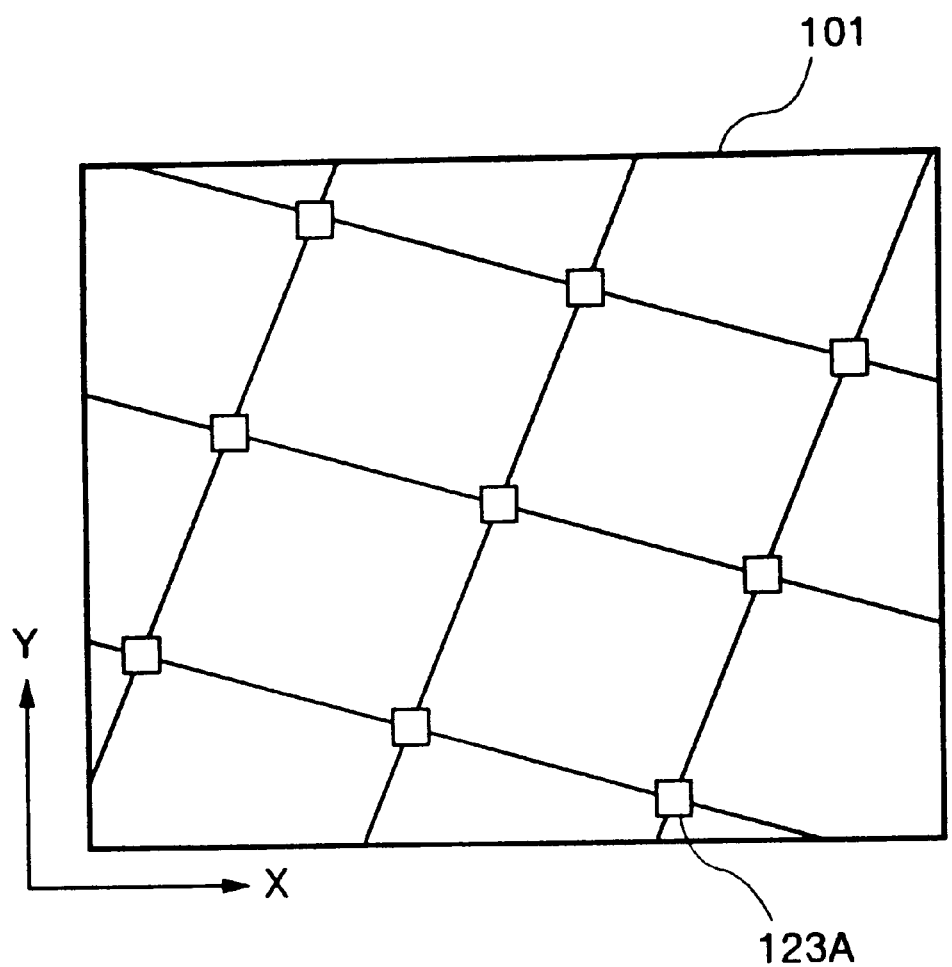
FIG. 45 illustrates other display status of the calibration marker on the display device in other embodiment of the information display apparatus.

When the calibration command signal is inputted to the pointing point calibration unit 105, the pointing point calibration-unit 105 executes a process shown in FIG. 37. The pointing point calibration apparatus 105 determines whether the calibration command signal has been entered or not in a step 114. If the decision is YES, the pointing point calibration unit 105 stores flag "1" in the calibration command signal storage area in the memory 110. Further, it sets i=0 and j=0 (step 115). Then, it sets to i=i+1 (step 116) and j=j+1 (step 117). The pointing point calibration unit 105 outputs the coordinate $(X_i, Y_j)$ of the specified pointing point of the calibration marker on the display screen of the display device 101 to the display control unit 108 (step 118). n coordinates (arranged in i rows and j columns) of the specified display positions are stored in the memory 110. The coordinates of the specified display positions are set such that they are distributed to the periphery and the center of the display screen as shown in FIG. 45. Those specified display positions may be specified by the user by using the input device 112.

Figure 38:
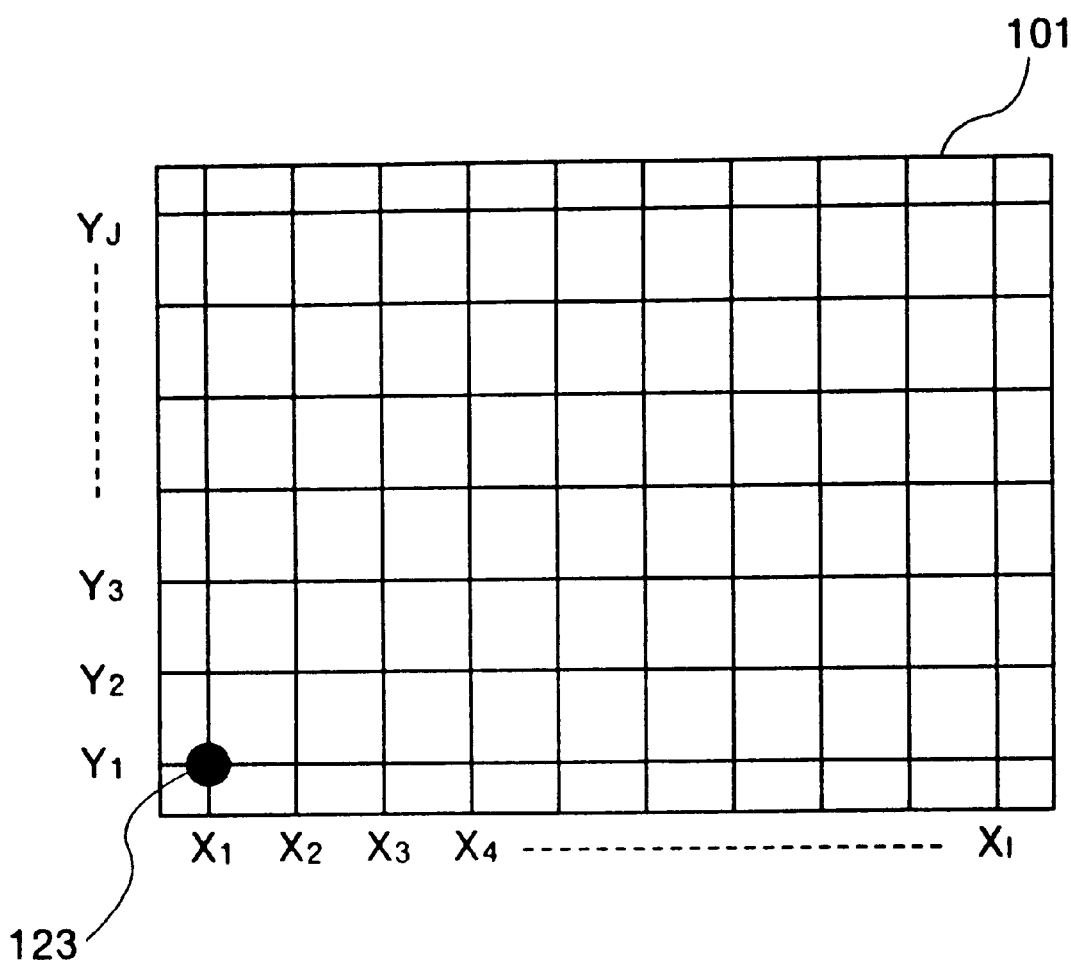

The display control unit 108 comprises means for generating graphic information of the calibration marker to execute the predetermined process in the calibration mode to input the coordinate $(X_i, Y_j)$, means for generating brilliance information of the marker and means for generating the display information based on the command signal outputted from the command recognition unit. The calibration marker graphic information generation means generates the calibration marker graphic information to display the calibration marker (for example, ●) at the specified display position on the display screen. The calibration marker graphic information generation means further outputs the information (coordinate($X_i$, $Y_j$)) of the specified display position together with the calibration marker graphic information to the display device 101. The display device 101 displays the calibration marker 123 at the coordinate ($X_i$, $Y_j$) as shown in FIG. 38. The image of the marker 123 is a visible ray image. The marker brilliance information generation means adds the information for enhancing the brilliance of the marker 123 higher than the brilliance of the background of the display screen (on which the image other than the marker 123 is not essentially displayed) to the graphic information of the marker 123 in order to facilitate the identification of the image of the marker 123 in the image processing of the image processing unit 103. Alternatively, the marker brilliance information generation means may add graphic information for lowering the brilliance of the marker 123 lower than the brilliance of the background to the graphic information of the marker 123.

The TV camera 102 picks up the display screen on which the marker 123 is displayed. The image signal of the display screen picked up by the TV camera 102 is supplied to the image processing unit 103.

Figure 39:
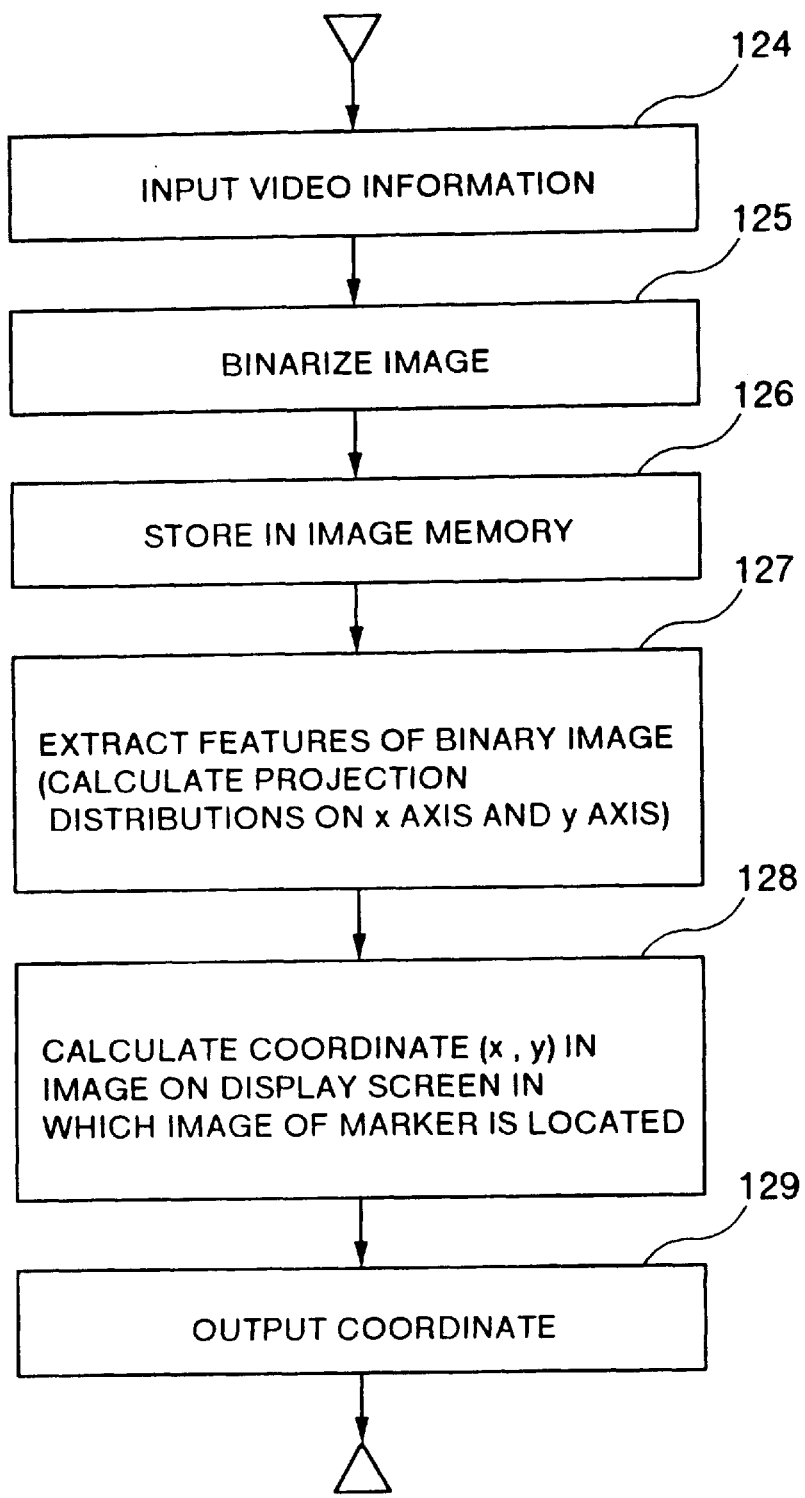
FIG. 39 illustrates a process executed by an image processing unit of FIG. 36, FIGS. 40A, 40B and 40C illustrate a method for determining a projection distribution and a center coordinate of a marker image.

A process executed by the image processing unit 103 is shown in FIG. 39.

The image processing unit 103 first receives the image information outputted from the TV camera 102 (step 124). The image signal is binarized to produce the binary image of the display screen in order to eliminate the noise from the image signal (step 125). The binary image is stored in an image memory (not shown) in the image processing unit 103 (step 126).

Figures 40A, 40B, 40C, 41:
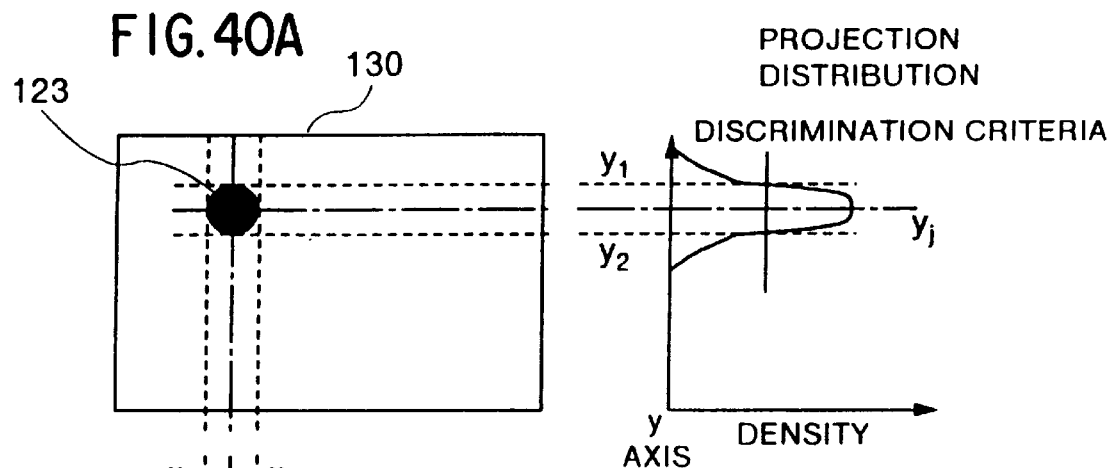
FIG. 41 illustrates configuration data derived by the pointed position calibration unit.

Features of the binary image are extracted based on the binary image in the image memory (step 127). The features of the binary image are extracted by calculating the projection distributions of densities of the binary image on the x axis and the y axis as shown in FIGS. 40A, 40B and 40C. The projection distributions are determined by summing the densities of the binary image of the marker 123 along the x axis and the y axis. By this process, the density distributions (the features of the binary image) along the x axis and the y axis are acquired.

The coordinate ($x_i$, $y_j$) of the position of the image of the marker 123 in the image on the display screen picked up by the TV camera 102 is calculated by using the features of the binary image (step 128). The coordinate ($x_i$, $y_j$) is for the image on the display screen of the display device 101 along the x axis and the y axis. The coordinate ($x_i$, $y_j$) is the coordinate of the center of the area in which the density of the binary image of the marker 123 exceeds the predetermined determination criteria (see FIG. 40A). Namely, in the example of FIG. 40, $x_i$ is equal to ($x_1+X_2$)/2, and $y_j$ is equal to ($y_1+y_2$)/2. The derived coordinate ($x_i$, $y_j$) is outputted to the pointing input recognition int 104 and the pointing point calibration unit 105 (step 129). The pointing input recognition unit 104 searches the calibration command signal storage area in the memory 110, and if the flag "1" is stored in the storage area, it does not input the coordinate ($x_i$, $y_j$).

In the present embodiment, it is assumed that the density of the marker 123 in the binary image is higher than the density of the background. When the density of the marker is lower than the density of the background, the inversion of the density provided in the conventional image processing unit may be conduced to conduct the process in the same manner as that described above. In the present embodiment, the information display apparatus determines the coordinate of the image of the marker by the image processing unit although the same process may be attained by using a conventional computer instead of the dedicated image processing unit.

The pointing point calibration unit 105 reads the coordinate ($x_i$, $y_j$) outputted from the image processing unit 103 (step 119). The coordinate ($x_i$, $y_j$) is stored in the memory 110 in association with the coordinate ($X_i$, $Y_j$) of the corresponding specified display position (step 120). Then, j>J is determined (step 121). If the decision is NO, the process returns to the step 117, and if it is YES, i>I is determined (step 122). If the decision is NO, the process returns to the step 116. If the decision in the step 122 is NO, the pointing point calibration unit 105 outputs the information of the end of calibration to the display control unit 108 and clears the flag "1" of the calibration command signal storage area in the memory 110 to "0". The information of the end of calibration is displayed on the display device 101 so that the user is informed-of the end of calibration.

The pointing point calibration unit 105 comprises calibration signal generation means for executing the process of the step 118 and calibration data generation means for executing the process of the steps 119 and 120.

Since the present embodiment is provided with the pointing point calibration unit 105, the calibration data having the coordinate ($X_i$, $Y_j$) of the calibration marker indicating the real position on the display screen associated with the coordinate ($x_i$, $y_j$) of the position of the image of the calibration marker in the picked-up image on the display screen having the distortion due to the aberration of the lens of the TV camera 102 and the installation position of the TV camera 102 can be readily acquired. Since the marker is displayed on the display screen of the display device 101, that is, in the area in which the image is displayed, any position in the display screen may be designated as the specified display position for the marker and the generation of the calibration data to which the distortion of the image on the display screen is reflected can be readily made. An example of the calibration data stored in the memory 110 is shown in FIG. 41.

In the present embodiment, it is an inherent function to display detailed information on the information pointed by the pointing signal outputted from the pointer, of the information displayed on the display screen of the display device 101 on the display screen. To this end, it is necessary to recognize the information pointed by the pointing signal. The mode to execute this process is the recognition mode, which is explained below.

The user enters a switching request of the information displayed on the display screen and an operation command to the plant by the audio input by the input device 112.

The image of the display screen picked up by the TV camera 102 is read into the image processing unit 103. The image includes the image of the pointing signal on the display screen outputted from the pointer 113. Since the pointing signal is the infrared laser beam, the TV camera 102 is operated with a reduced sensitivity to the visible ray. Thus, the affect by the system diagram (visible ray) displayed on the display screen is eliminated and the image processing to the pointing signal is facilitated. The change of the state of the TV camera in the calibration mode and the recognition mode may be effected by the attachment and detachment of a visible ray cut filter the adjustment of a lens diaphragm and/or the adjustment of a shutter speed of the TV camera.

When the image processing unit 103 receives the video signal outputted from the TV camera 102, it executes a process shown in FIG. 39. The coordinate ($X_r$, $y_r$) (corresponding to the coordinate ($x_i$, $y_i$) in FIG. 39) of the position of the image of the infrared laser beam on the display screen is determined. The coordinate is supplied to the pointing point recognition unit 104 and the pointing point calibration unit 105. In the pointing point calibration unit 105, since the flag in the calibration command signal storage area in the memory 110 is "0", the decision of the step 114 of FIG. 37 is NO and the process of the step 115 and the subsequent steps is not executed.

Figure 42:
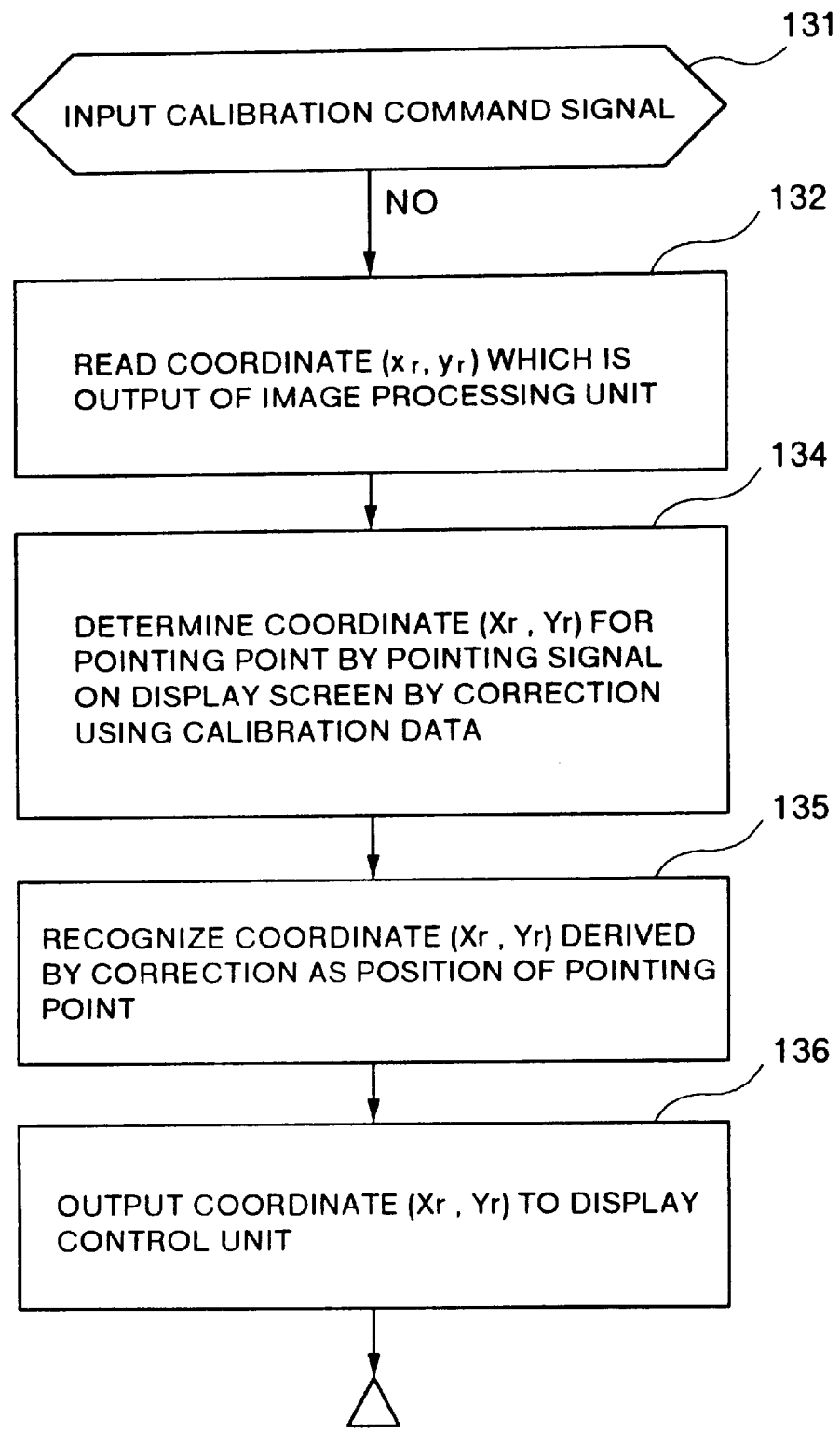
FIG. 42 illustrates a process executed by a pointed position recognition unit of FIG. 36.

The pointing point recognition unit 104 executes a process of FIG. 42. First, whether the calibration command signal has been inputted or not is determined (step 131). Since the flag of the calibration signal storage area of the memory 110 is "0" in the recognition mode, the decision is NO. Accordingly, a process of a step 132 and the subsequent steps is executed. In the step 132, the coordinate ($x_r$, $y_r$) which is the output from the image processing unit 103 is supplied to the pointing point recognition unit 104. The input coordinate ($x_r$, $y_r$) is corrected by using the calibration data stored in the memory 110 (the coordinate ($x_i$, $y_j$) of the position of the image of the calibration marker and the position ($X_i$, $Y_j$) of the corresponding calibration marker) (step 134). It is determined by interpolating between four coordinates ($X_i$, $Y_j$) corresponding to four coordinates ($x_i$, $y_i$) by using the positional relation between the coordinate ($x_r$, $y_r$) and the four coordinates ($x_i$, $y_j$) located in the vicinity of the coordinate ($x_r$, $y_r$). By this correction, the coordinate of the position actually pointed by the pointing signal from the pointer 113 may be precisely determined. The correction reduces the error of the coordinate ($x_r$, $y_r$) of the position of the image of the pointing signal, due to the distortion of the image picked up by the TV camera 102 due to the aberration of the lens of the TV camera 102 and the installation position of the TV camera 102.

The coordinate ($X_r$, $Y_r$) derived by the correction is recognized as the position on the display screen actually pointed by the pointing signal (step 135). In the present embodiment, the position of the pointing point on the display screen pointed by the pointing signal can be precisely recognized.

The coordinate ($X_r$, $Y_r$) is outputted to the display control unit 108 (step 136). The display control unit 108 generates the graphic information of the cursor at the position of the coordinate ($X_r$, $Y_r$), and outputs it to the display device 101. The display device 101 displays the graphics of the cursor at the position of the cursor ($X_r$, $Y_r$). The user cannot watch the infrared laser beam outputted from the pointer 113 but can recognize the position actually pointed by the pointer 113. Thus, if the pointing is made to a wrong position, the user can readily direct the pointing signal of the pointer 113 to the intended position on the display screen. Thus, the position pointed by the user and the position recognized by the pointing point recognition unit 104 match.

The decision steps in the step 131 executed by the pointing point recognition unit 104 and the step 114 executed by the pointing point calibration unit 105 are a kind of switching means for switching the pointing point recognition unit 104 and the pointing point calibration unit 105 in accordance with the presence or absence of the calibration command signal. By providing this mechanism, the generation of the calibration data by using the coordinate ($x_r$, $y_r$) of the position of the image of the pointing signal by the pointing point calibration unit 105 in the recognition mode in which the calibration command signal is not inputted is prevented. Accordingly, the normal calibration data (stored in the memory 110) generated in the calibration mode is not adversely affected. If the calibration data is generated by using the position coordinate ($x_r$, $y_r$), the correction of the position coordinate ($x_r$, $y_r$) in the recognition mode would become meaningless.

In the present embodiment, the area including the display screen is picked up by the TV camera although only a portion of the display screen may be picked up. In this case, the area permitted for the pointing by the pointer 113 is restricted by the image pickup area of the TV camera.

Figure 44:
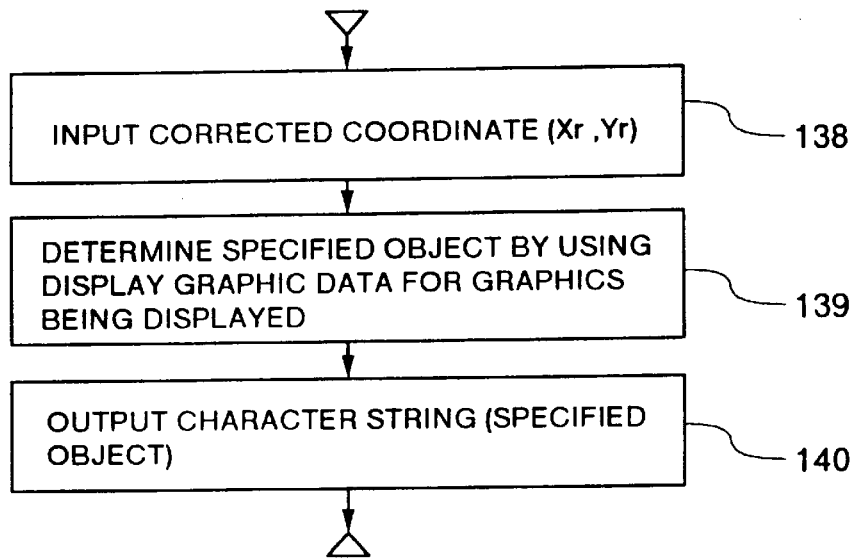
FIG. 44 illustrates display information displayed on the display device.

Referring to FIG. 43, a process by the object specifying unit 106 is now explained. The coordinate ($X_r$, $Y_r$) derived from the correction is inputted (step 138). An object to be displayed at the position of the coordinate ($X_r$, $Y_r$) is specified by using the display data displayed on the display device 101 (step 139). The display data is read from the memory 111. The display data is prepared for each drawing as shown in FIG. 44, which shows an example of a water supply system. The data includes a start point of the pointing area (coordinate ($X_r$, $Y_r$)), a range of the pointing area and an output character string. The object to be displayed is specified by acquiring the output character string of the object to be displayed which is displayed in the area determined by the coordinate ($X_r$, $Y_r$) of the pointing point. The acquired character string is outputted to the command recognition unit 107 (step 140). In the embodiment of FIG. 36, the pointing input is detected when the switch of the pointer 13 for the infrared laser beam is turned off. Accordingly, when the switch is turned on and then turned off, the coordinate ($X_r$, $Y_r$) derived when the switch was turned on is outputted until the switch is next turned on.

When the display control unit which displays the information by multiple windows, the window which currently displays the information on the display device is determined by using the input coordinate ($X_r$, $Y_r$). Then, a relative coordinate ($X_w$, $Y_w$) in the window to the coordinate ($X_r$, $Y_r$) is calculated. The specification of the object to be displayed in the step 139 is effected by using the relative coordinate ($X_w$, $Y_w$).

The command recognition unit 107 executes the recognition process of the input command by the process shown in FIG. 13. In a specific example of the process shown in FIG. 13, "nuclear reactor water level" is pointed by the pointer 13 and "graphically present a trend" is inputted by the audio input.

The information consolidation means of the command recognition unit 107 consolidates the character string outputted from the object specifying unit 106 and the audio information inputted from the input device 112 to generate an input statement. Specifically, the input statement analysis means in the command recognition unit 107 executes the process of FIG. 13. Namely, the input statement is read (step 60). It is itemized by using the grammar and the dictionary data stored in a memory (not shown) of the command recognition unit 107 and "meaning" and "meaning category" are associated therewith (step 38). The meaning category means a category of the meaning of the word used in the field of technology related to the displayed information. In the example of FIG. 13, "system" and "status amount" are meaning categories.

The meaning of the input statement is analyzed by using the result of the step 38. The analysis of meaning is effected in two steps ① and ② as shown in FIG. 13. First, the type of content of request of the input statement is identified. The command recognition unit 107 is provided with standard statement forms in the memory for each type of request for the identification purpose. The standard statement forms are described in a form of rule by using the "meaning" or the "meaning category". The type of content of request is identified by matching the statement form to the "meaning" or the "meaning category" of the input statement. In the illustrated example, the statement form "<Present trend_ graph>□" matches so that the type of request is identified as the trend graphic presentation request "trend". The symbol "< >" means the use of the meaning category for the matching and "□" means that any number of words may be included.

After the above step ①, the step ② (acquiring of the information necessary to execute the content of the request) is-executed. The necessary information and the method for acquiring it are prepared in the memory of the command recognition unit 7 as knowledge of frame type. By using this knowledge, the information necessary to execute the content of the request is acquired. In the example of FIG. 13, the system equipment name and the status amount which are the necessary information are acquired from the input statement. If the necessary information is not contained in the input statement, it is acquired from the plant related knowledge, by the use of the dialogue history or by quarrying to the operator.

When the analysis of the meaning of the input statement is completed, a process command is outputted to the corresponding unit (step 40). In the present example, the presentation request for the nuclear reactor water level trend "trend nuclear reactor water level" is outputted to the display control unit 108.

The display control unit 108 generates the display information based on the process command and outputs it to the display device 101.

As described above, in accordance with the present embodiment, the calibration data which associates the coordinate of the pointing point on the display screen of the display device 101 pointed by the pointer 113 and the coordinate of the position of the picked-up image of the pointing point on the display screen is automatically generated by the function of the pointing point calibration unit 105. That is, the generation of the calibration data is very much facilitated.

By the correction using the calibration data, the affect by the installation position of the TV camera 102 and the aberration of the leans is reduced and the position of the pointing point by the pointer on the display screen can be precisely determined. This is not limited by the installation position of the TV camera 102 and the freedom to select the installation position of the TV camera 102 and the lens of the TV camera 102 is increased. The user operability of the information display apparatus is enhanced accordingly.

When the large screen display device is used as the display device, the installation position of the TV camera in the case of the large screen display device and the section of the leans are tend to be restricted as the size of the case becomes compact. However, by effecting the calibration of the present embodiment and using the calibration data to correct the pointing point, the above problem may be more readily solved.

The present embodiment further allows the saving in the manufacture and maintenance of the apparatus. Namely, it is not necessary to provide the special position correction marker on the display device.

Further, instead of directly pointing the actual pointing point, the pointing point recognized by the apparatus is displayed by the cursor so that the affect by the fluctuation of the pointing point due to the affect by the hand swing is avoided and the user can readily input the pointing signal.

The present embodiment enhances the sensitivity of the TV camera to the visible ray in the calibration mode and enhances the sensitivity of the TV camera to the infrared ray in the recognition mode by adjusting the mechanism of the TV camera or exchanging the filter. Such change of the sensitivity allows the execution of both modes by the single TV camera without needing additional TV camera. When separate TV cameras are used in the calibration mode and the recognition mode, the adjustment of the positions of those TV cameras is required. The present embodiment can avoid such a problem In the CRT display device and the projection type display device, the information is normally displayed by visible ray so that the user can recognize the displayed information. Thus, in the calibration mode, the marker displayed on the display device should be visible ray. On the other hand, in the recognition mode, various information are displayed on the display device by the visible ray. Thus, if the visible ray is emitted from the pointer as the pointing signal, the process to recognize the pointing signal by the image recognition unit is complex. When the infrared ray is used for the pointing signal, the recognition process in the image recognition unit is simple. Accordingly, the switching of the sensitivity of the TV camera to the visible ray and the infrared ray matches to the requirement of the system to selectively use the visible ray and the infrared ray.

By changing the brilliance of the calibration marker to the background of the display screen of the display device, the image process for identifying the position of the image of the marker is simplified. In the present embodiment, the step of sequentially displaying the marker at the predetermined position on the display screen to generate the calibration data is repeated. Thus, one marker need be processed in each step and the image process is simplified. By providing the calibration data in the table form, the process of determining the coordinate of the pointing point in the recognition mode may be readily implemented by the interpolation of the table of the calibration data.

By using the input from other input means as appropriate based on the pointing input from the pointer, the control command to the plant and the switching request of the display information can be rapidly inputted. Further, by using the pointing input only or in combination with the audio input, the user can remotely input with less restriction.

The philosophy of the embodiment of FIG. 36 is also applicable to the information display apparatus which uses the projection display device including the image projector and the projection screen as shown in FIG. 1 of JP-A-4-37922 instead of the display device shown in FIG. 36. In this case, the display control unit 108 of FIG. 36 is connected to the image projector. Thus, the display information generated by the display control unit 108 is outputted from the image projector and projected to the projection screen. The image projected on the projection screen is picked up by the TV camera 102 and supplied to the image processing unit 103. This configuration can attain the same operation and effect as those of the embodiment of FIG. 36 except that the area in which the image is displayed is the entire display screen of the display device 101 in the embodiment of FIG. 36 while it is a portion of the projection screen in the present embodiment. Namely, in the present embodiment, the size of the area in the projection screen in which the image is displayed varies with the distance between the image projector and the projection screen.

Figure 46:
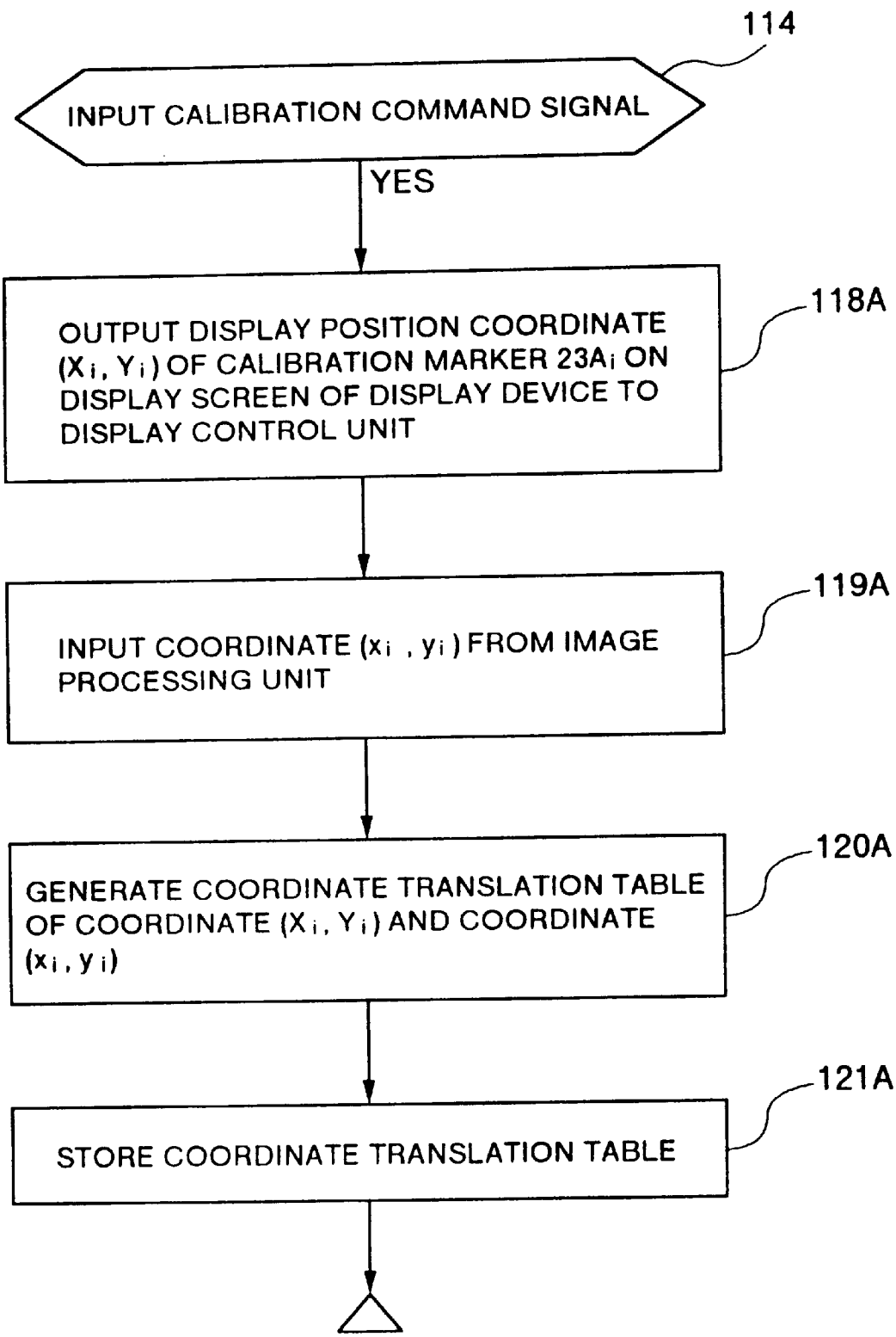
FIG. 46 illustrates a process executed by a second embodiment of the pointed position calibration unit for displaying the calibration marker, FIGS. 47A, 47B and 47C a method for determining a projection distribution for a display status of the calibration marker and a center coordinate of a marker image.

Referring to FIGS. 45, 46, 47A–47B and 48, another embodiment of the information display apparatus of the present invention is explained. The present embodiment has the same configuration as that of the embodiment of FIG. 36 except that the process in the pointing point calibration unit 5 in the present embodiment is different from that of the pointing point calibration unit 105 in the embodiment of FIG. 32. The process in the pointing point calibration unit 105 of the present embodiment is now explained. In the calibration mode, a process shown in FIG. 46 is executed by the pointing point calibration unit 105 of the present embodiment.

In the present embodiment, a plurality of calibration markers 123A are simultaneously displayed on the display device 101 as shown in FIG. 45. Specifically, in the present embodiment, nine calibration markers 123A are displayed.

In the calibration mode, the decision in the step 114 is YES and the coordinates $(X_i, Y_i)$ of the specified display positions of n (for example, n=9) calibration markers $123A_i$ (for example, i=1, 2, . . . , 9) on the display screen of the display device 101 are simultaneously outputted to the display control unit 108 (step 118A). The n coordinates $(X_i, Y_i)$ are set such that the X coordinates differ from each other and the Y coordinates differ from each other on the x axis and the y axis of the display screen. Those coordinates $(X_i, Y_i)$ are stored in the memory 110. The display control unit 108 generates the graphic information (for example, □) of the n calibration markers $123A_i$. The display control unit 108 outputs the graphic information to the display device 101 to display it at he coordinates $(X_i, Y_i)$ of the corresponding n pointing points.

Figure 48:
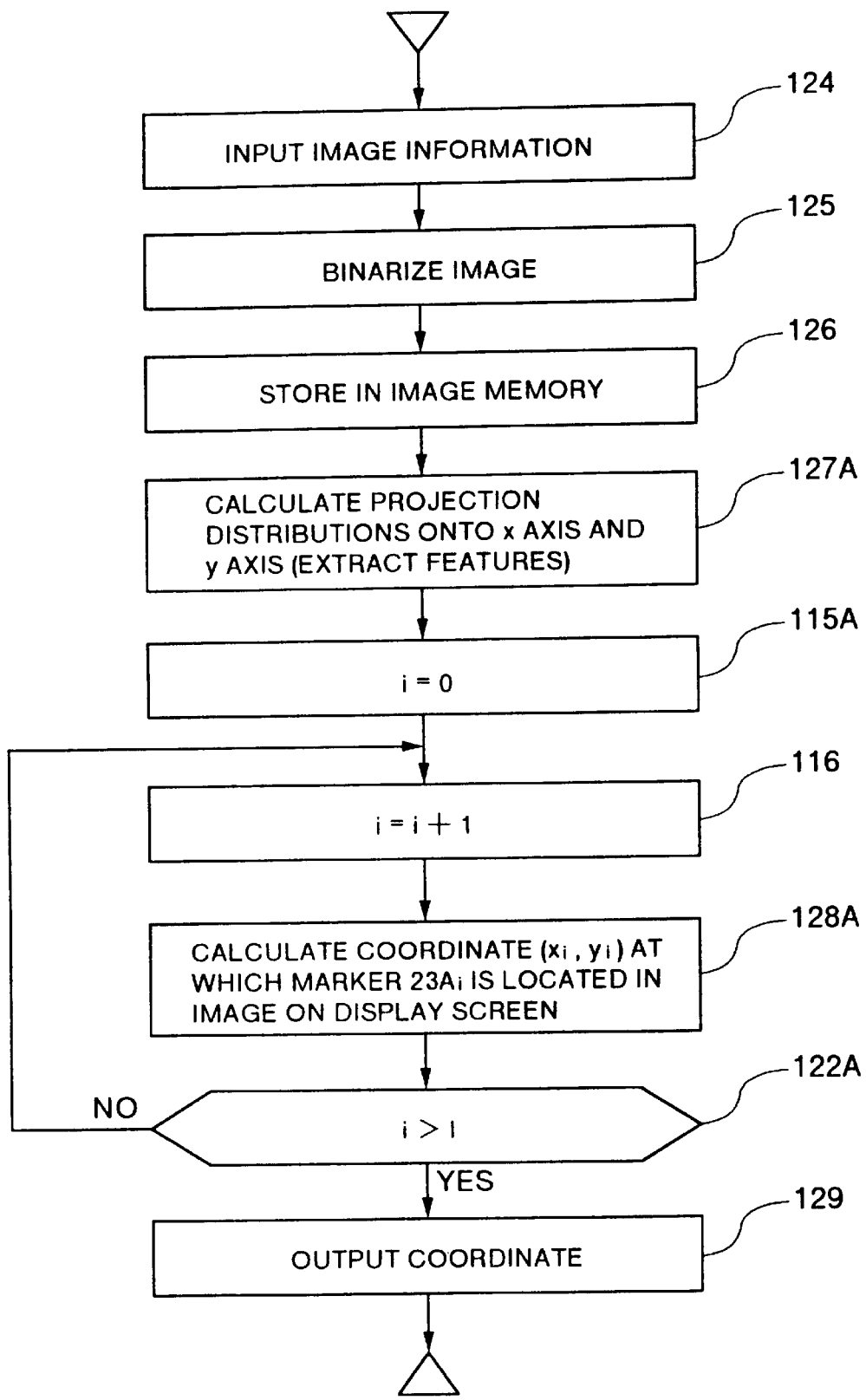
FIG. 48 illustrates a process executed by other embodiment of the image processing apparatus for displaying the calibration marker.

The image processing unit 103 effects the image processing of FIG. 48 which is essentially same as that of the embodiment of FIG. 36 for the image on the display screen picked up by the TV camera 102. Namely, after the execution of the-steps 124, 125, 126 and 127A, i is set to i=0 (step 115A). After the execution of the step 116, a step 128A is sequentially repeated until a decision in a step 122A is YES for each of the images of the markers 123A. (I =(n+1)). The steps 127A and 128A are same as the steps 127 and 128 of FIG. 39 except that in the step 127A, the features for the plurality of markers 123A are extracted one time. FIG. 47A–47B show the features for the nine markers 123A derived in the step 127A. Since the coordinates on the X axis and the Y axis are different from each other as described above, the features and the coordinates $(x_i, y_i)$ for the respective markers 123A can be determined even if the plurality of markers 123A are simultaneously displayed on the display screen.

The pointing point calibration unit 105 receives the coordinates $(x_i, y_i)$ of the respective positions of the images of the n markers 123Ai on the display screen (step 119A). The n coordinates $(x_i, y_i)$ are associated with the coordinates $(X_i, Y_i)$ of the corresponding specified display positions stored in the memory 110 to generate the calibration data (step 120A). The calibration data is stored in the memory 110 as the coordinate translation table (step 121A).

The present embodiment described above can attain the same effect as that of the embodiment of FIG. 36. In the present embodiment, the plurality of markers 123A are simultaneously displayed and the images of those markers 123A are simultaneously supplied to the image processing unit 103 for image processing. Thus, the time required for the calibration mode can be reduced. By simultaneously displaying the plurality of markers 123A simultaneously, detailed calculation data can be acquired in a short time.

Figure 49:
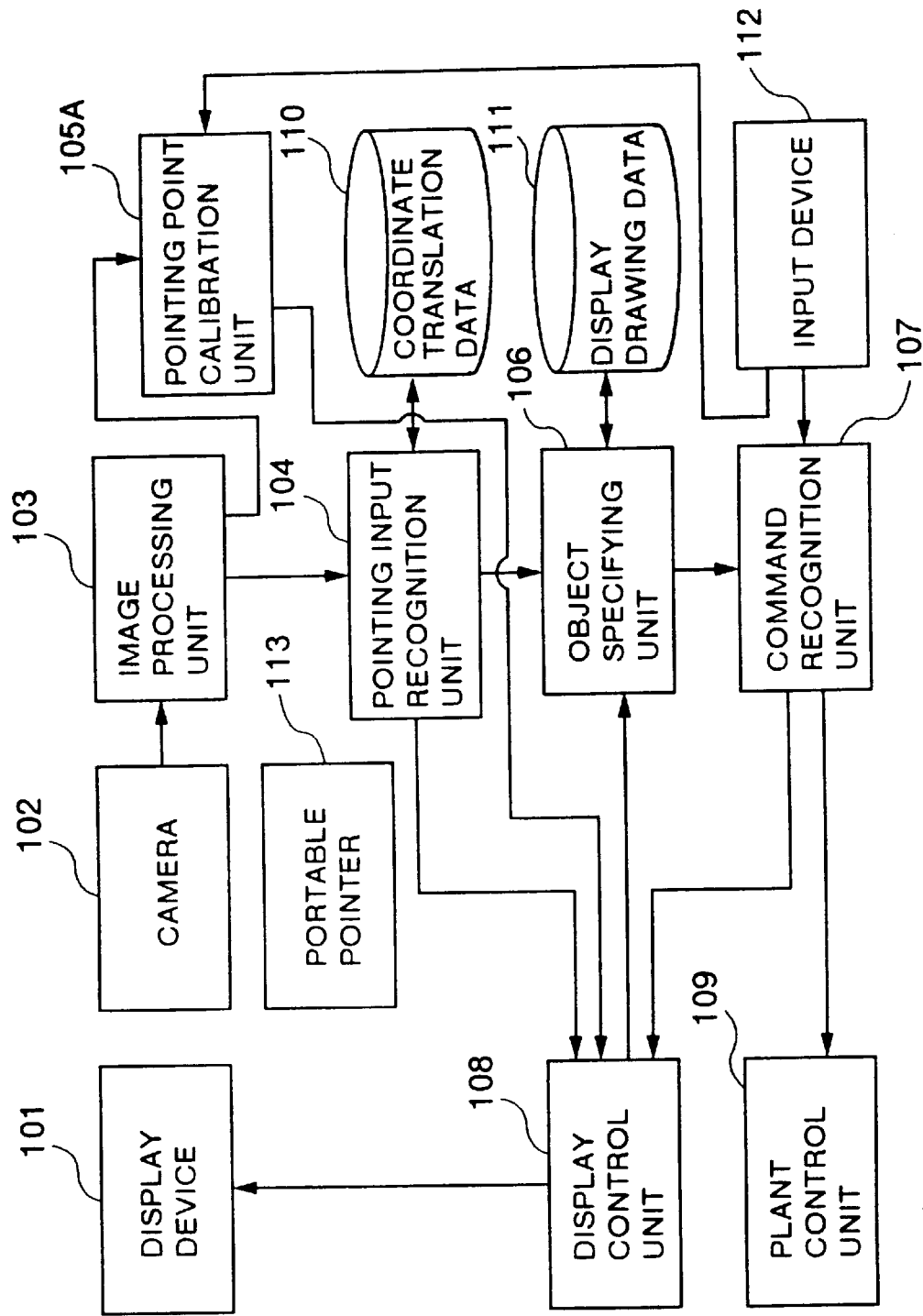
FIG. 49 shows a configuration of an information display apparatus in accordance with other embodiment of the present invention.

Referring to FIG. 49, other embodiment of the information display apparatus of the present invention is explained. The present embodiment has the same configuration as that of the embodiment of FIG. 36 except that the pointing point calibration unit 105 of FIG. 36 is replaced by the pointing point calibration 10 unit 105A.

The operation of the present embodiment is explained primarily about the different units than those of the embodiment of FIG. 36, that is, the process in the pointing point calibration unit 105A. The pointing point calibration unit 105A executes the process shown in FIG. 37 and then executes a process shown in FIG. 51.

Figure 51:
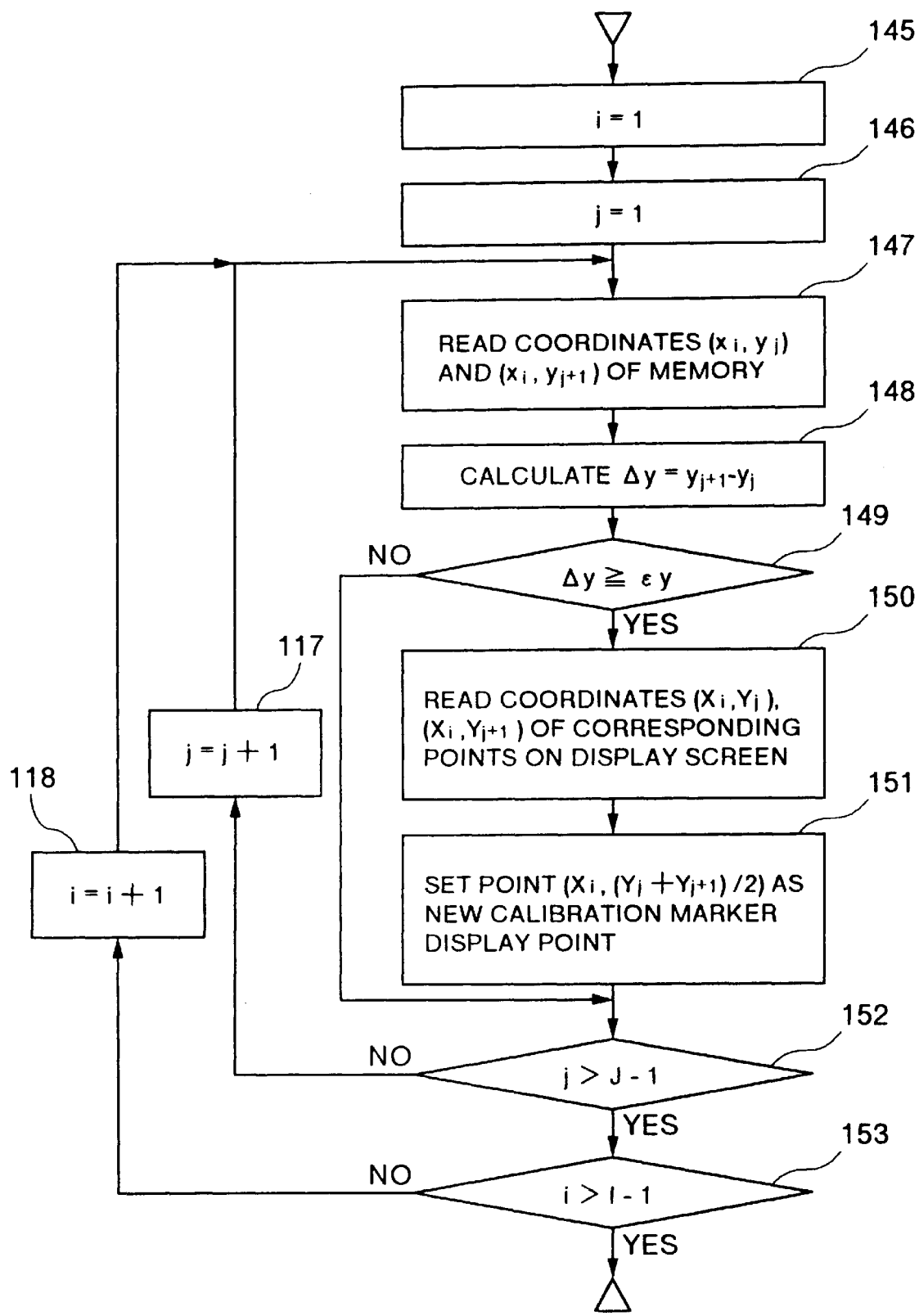
FIG. 51 illustrates a portion of a process executed by the pointed position calibration device of FIG. 49.

In the step 120 of FIG. 37, the coordinates $(x_i, y_i)$ of the images in the calibration data are arranged as shown in FIG. 50 and stored in the memory 110. The process of FIG. 51 shows the addition of the calibration markers 123 and the determination of the coordinates for the images of the added markers 123. The process of FIG. 51 particularly shows the addition of the calibration markers 123 along the y axis. The same process is executed for the addition of the calibration markers 123 along the x axis.

The process of FIG. 51 is executed by using the calibration data of FIG. 50. i=1 and j=1 are set (steps 145 and 146). The coordinates $(x_i, y_j)$ and $(x_j, y_j)$ are read (step 147). A difference $\Delta y (=Y_{j+1}-y_j)$ between those coordinate along the y axis is calculated (step 148). Whether $\Delta y$ is no smaller than a predetermined value $\epsilon y$ or not is determined (step 149), where $\epsilon y$ represents a predetermined distance between the two y coordinates along the y axis. If $\Delta y$ is no smaller than $\epsilon y$, the coordinates $(X_i, Y_j)$ and $(X_i, Y_{j+1})$ corresponding to the coordinates $(x_i, y_j)$ and $(x_i, Y_{j+1})$ are read (step 150). The display position of the new display marker 123 is determined by using the coordinates $(X_i, Y_j)$ and $(X_i, Y_{j+1})$ (step 151). The display position of the new calibration marker 123 is the midpoint coordinate of the coordinates $X_i, Y_j)$ and $(X_i, Y_{j+1})$ along the y axis, that is, $(X_i, (Y_{j+}Y_{j+1})/2)$. The above step is repeated until j>J–1(step 152) and i>I–1 (step 153). In this manner, all of the specified display positions of the new calibration markers 123 are determined. The above steps are also executed for the x axis so that the calibration markers are displayed in a fine manner. The process of FIG. 37 is executed for the coordinates of the specified display positions added in the above steps.

The specified display positions initially set to be uniformly displayed on the display screen are not always uniform in the image of the display screen picked up by the TV camera 102 due to the affect by the aberration of the lens of the TV camera and the installation position of the TV camera. In the present embodiment, the calibration markers are increased in the area in which the images of the markers are arranged in a large pitch in the image of the display screen so that the calibration data can be generated at a narrower pitch of the calibration markers. Accordingly, the precision of detecting the pointing point by the pointer 113 is further enhanced. The present embodiment can attain the same effect as that of the embodiment of FIG. 36. The process of FIG. 51 of the present embodiment is applicable to the pointing point calibration unit 105 of the previous embodiment which executes the process of FIG. 46.

Figure 52:
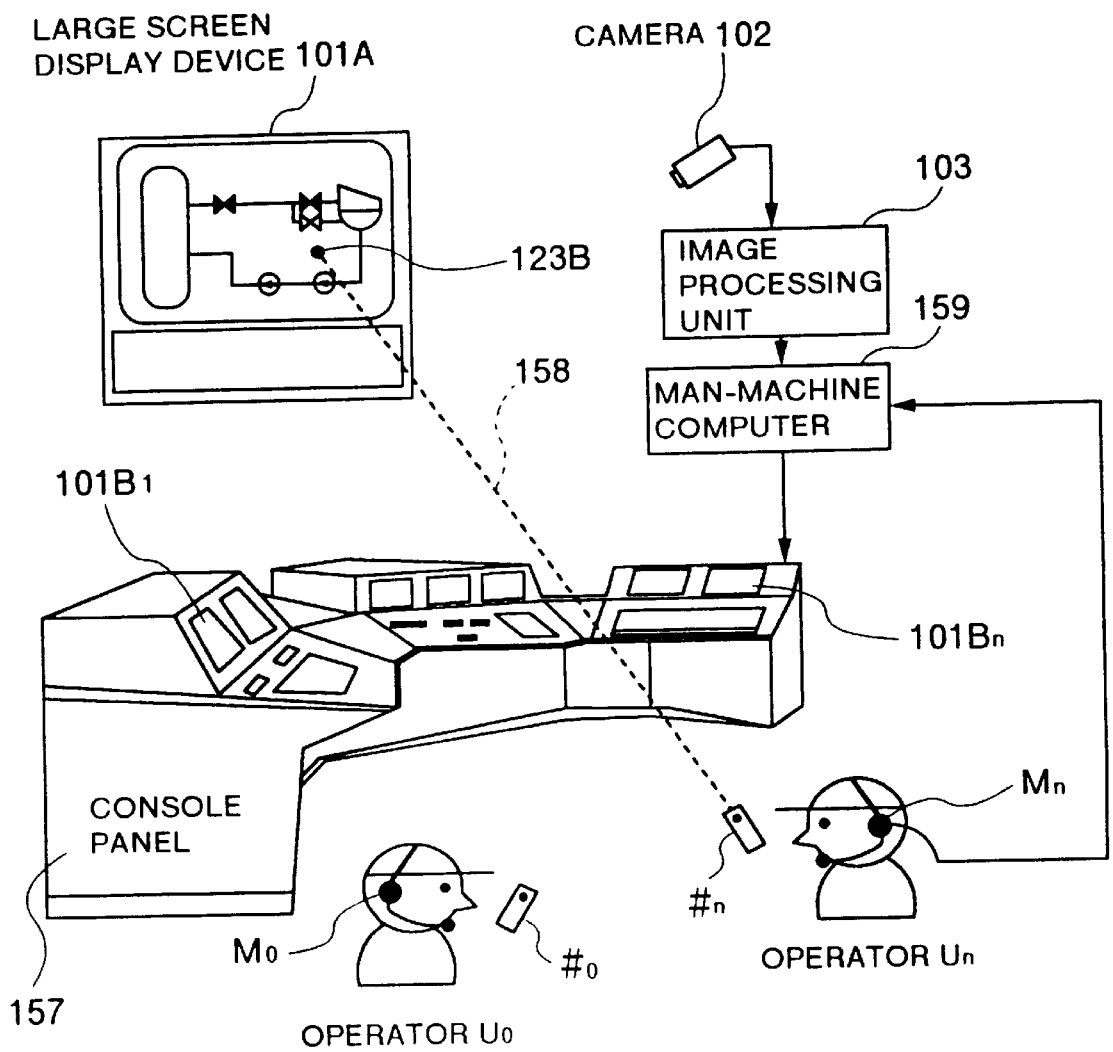
FIG. 52 shows a configuration of an information display apparatus in accordance with other embodiment of the present invention.

Referring to FIG. 52, other embodiment of the information display apparatus of the present invention is explained.

In the present embodiment, a large screen display device 101A (a display device having a CRT) and CRT'S $101B_1$–$101B_n$ having small display screens mounted on the console board 157 are used as the display devices. A man-machine computer 159 receives the output from the image processing unit 103 to generate the display information and outputs the information to the large screen display device 101A and the CRT'S 101B$_1$–101B$_n$. The operators U$_0$–U$_N$ use the pointers #0–#n and the head set microphones M$_0$–M$_n$, respectively. Numeral 123B denotes a cursor displayed at the pointing point by the pointer, and numeral 158 denotes an infrared laser beam outputted from the pointer. The pointing by the pointers #0–#n is effected to the large screen display device 101A. The pointers #0–#n emit the laser beams of different wavelengths in the visible band as the pointing signals.

Figure 53:
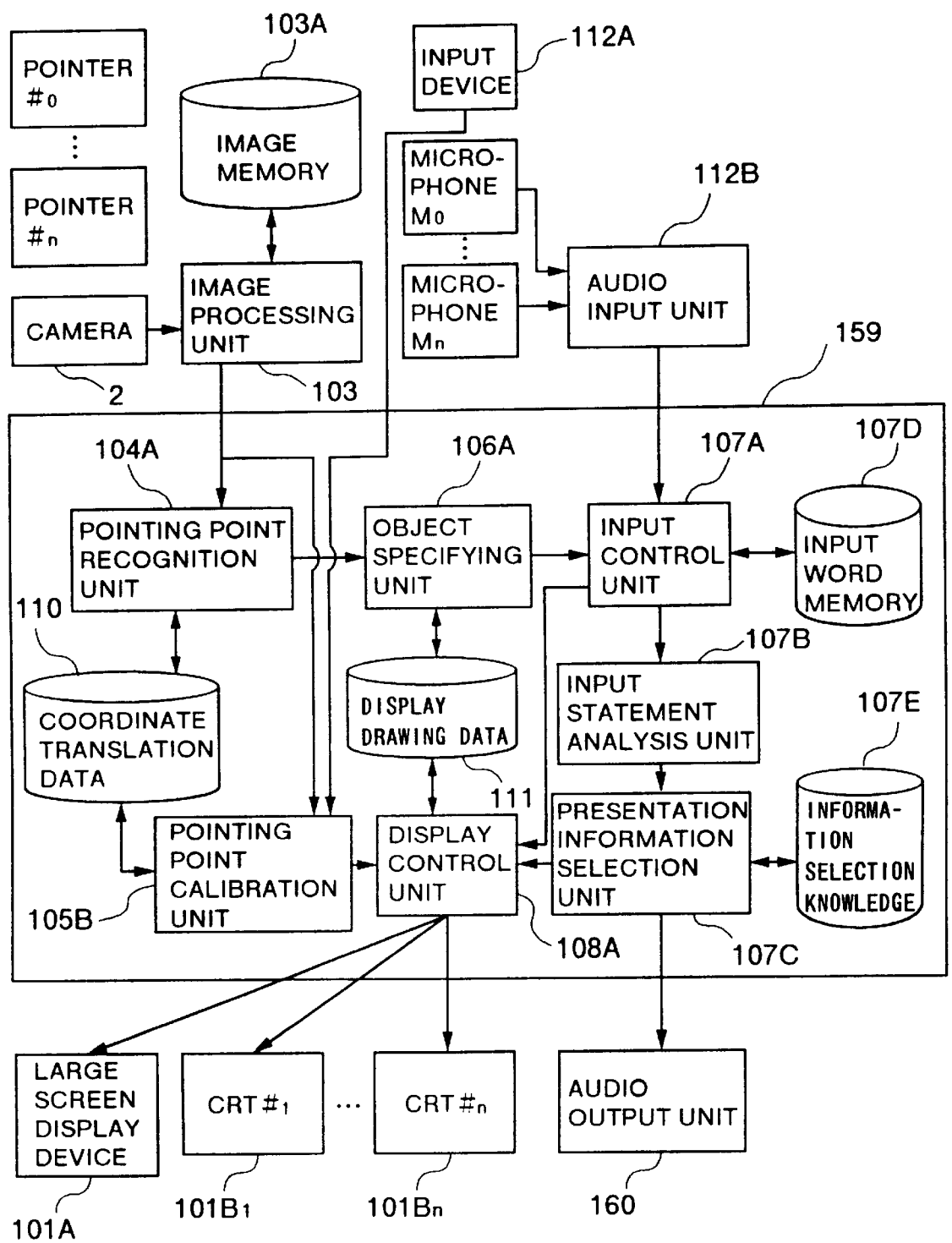
FIG. 53 illustrates a functional configuration of a man-machine computer of FIG. 52.

The man-machine computer 159 has a function shown in FIG. 53. The pointing point recognition unit 104A, the pointing point calibration unit 105B, the object specifying unit 106A and the display control unit 108A in the man-machine computer 159 have the essentially same functions as those of the pointing point recognition unit 104, the pointing point calibration unit 105, the object specifying unit 106 and the display control unit 108 of FIG. 36. The input control unit 107A, the input statement analysis unit 107B, the presentation information determination unit 107C and the memories 107D and 107E in the man-machine computer 159 correspond to the command recognition unit 107 of FIG. 36. The memory 103A stores the image data outputted from the TV camera 102 and supplied to the image processing unit 103. The display information generated in the display control unit 108A is displayed on the large screen display device 101A and the CRT's 101B$_1$–101B$_n$. The audio information inputted by the microphones M$_0$–M$_n$ are supplied to the input control unit 107A through the audio input device. The audio information outputted from the presentation information determination unit 107C is outputted to the audio output device 160.

Figure 54:
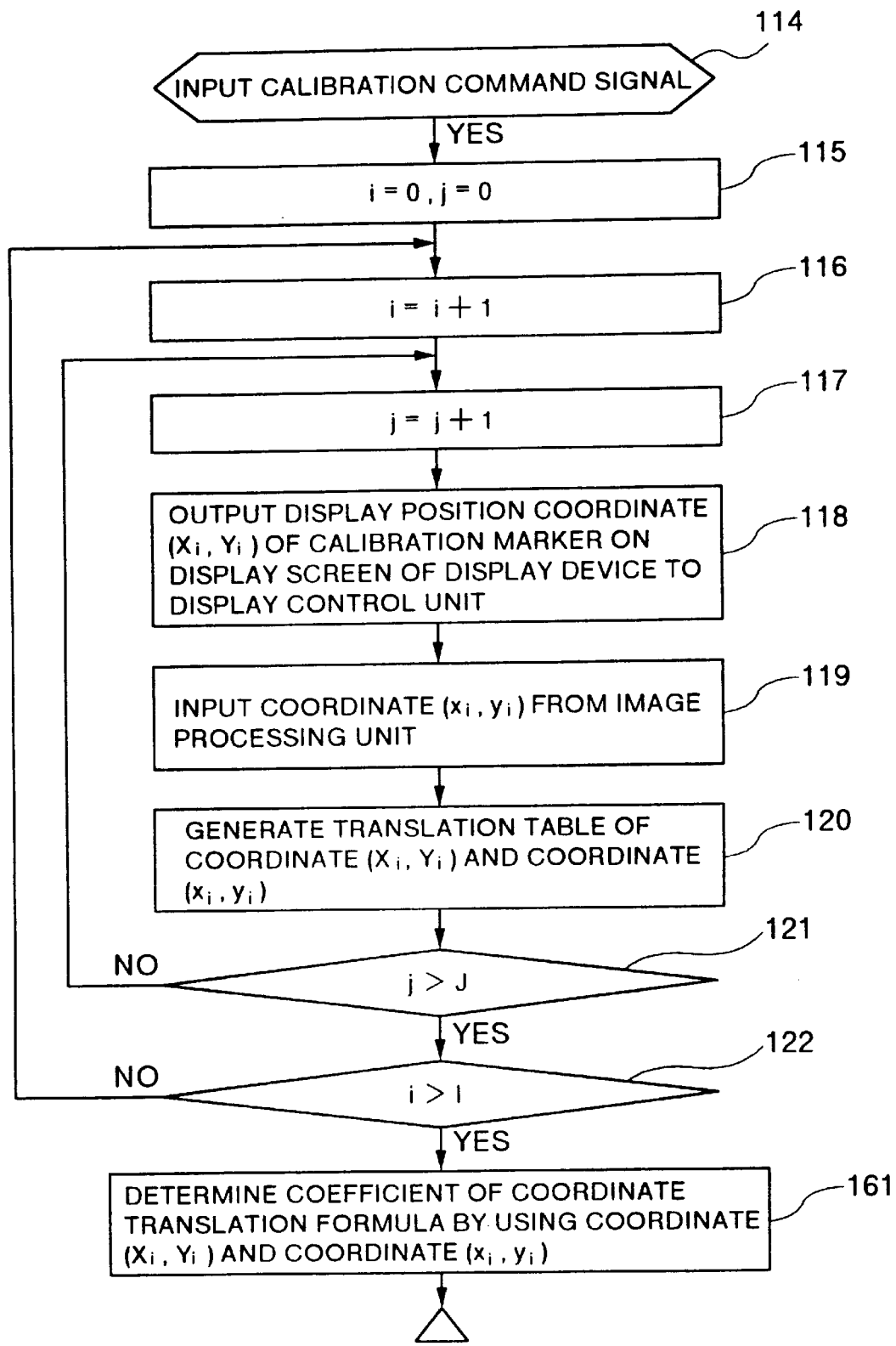
FIG. 54 illustrates a process executed by a pointed position calibration unit of FIG. 53.

In the calibration mode of the present embodiment, the pointing point calibration unit 105B executes a process of FIG. 54. Of the process shown in FIG. 54, the steps 114–122 are same as the corresponding steps in FIG. 37. The calibration command signal is supplied from the input device 112A so that the process of FIG. 54 is executed. The display control unit 108A generates the graphic information of the marker 123 to be displayed at the specified display position based on the coordinate X$_i$, Y$_j$) of that position outputted by the process of the step 118 and outputs it to the large screen display device 101A.

The display screen of the large screen display device 101A having the marker 123 displayed thereon is picked up by the TV camera 102. The image processing unit 103 receives the image signal derived by the image pick-up and executes the process shown in FIG. 39. The image processing unit 103 outputs the coordinate (x$_i$, y$_j$) derived by the step to the pointing point calibration unit 105B, which executes the process of the steps 119–122 and 161 of FIG. 54. The calibration data derived in the step 120 is temporarily stored in the memory 110.

In the step 161, the coefficients a$_3$, a$_2$, a$_1$, a$_0$, b$_3$, b$_2$, b$_1$, b$_0$, c$_3$, c$_2$, c$_1$, c$_0$, d$_3$, d$_2$, d$_1$, and d$_0$ of the coordinate translation formulas (1) and (2) are calculated by the minimum square method by using the coordinate X$_i$, Y$_j$) of the specified display position and the coordinates (x$_i$, y$_j$) derived by the image processing.

$$X=a_3x^3+a_2x^2+a_1x+a_0+b_3x^3+b_2x^2+b_1x+b_0 \quad (1)$$

$$Y=c_3x^3+c_2x^2+c_1x+c_0+d_3x^3+d_2x^2+d_1x+d_0 \quad (2)$$

where X is the X coordinate of the actual pointing point by the pointer on the display screen of the large screen display device 101A, Y is the Y coordinate of the actual pointing point by the pointer on the display screen of the large screen display device 101A, x is the x coordinate for the image of the pointing point on the display screen derived by the image processing unit 103, and y is the y coordinate for the image of the pointing point on the display screen derived by the image processing unit 103.

In the present embodiment, the coordinate translation equations use the three-dimension equations although the equations of higher dimension or lower dimension, or other function such as an exponential function may be used. The formulas (1) and (2) which determine the coefficients a$_3$, a$_2$, a$_1$, a$_0$, b$_3$, b$_2$, b$_1$, b$_0$, c$_3$, c$_2$, c$_1$, c$_0$, d$_3$, d$_2$, d$_1$ and d$_0$ are stored in the memory 110.

The image processing unit 103 reads the color image signal outputted from the TV camera 102 and image-processes it for each wavelength (for example, in the order of red and green) of the light emitted from the pointer 113. Namely, the image processing unit 103 determines the coordinates (X$_r$, Y$_r$) for each type of the pointer 113.

When the step 161 is completed, it is displayed on the large screen display device 101A as it is in the embodiment of FIG. 36 and the "1" flag of the calibration command signal storage area in the memory 110 is cleared to "0".

Figure 55:
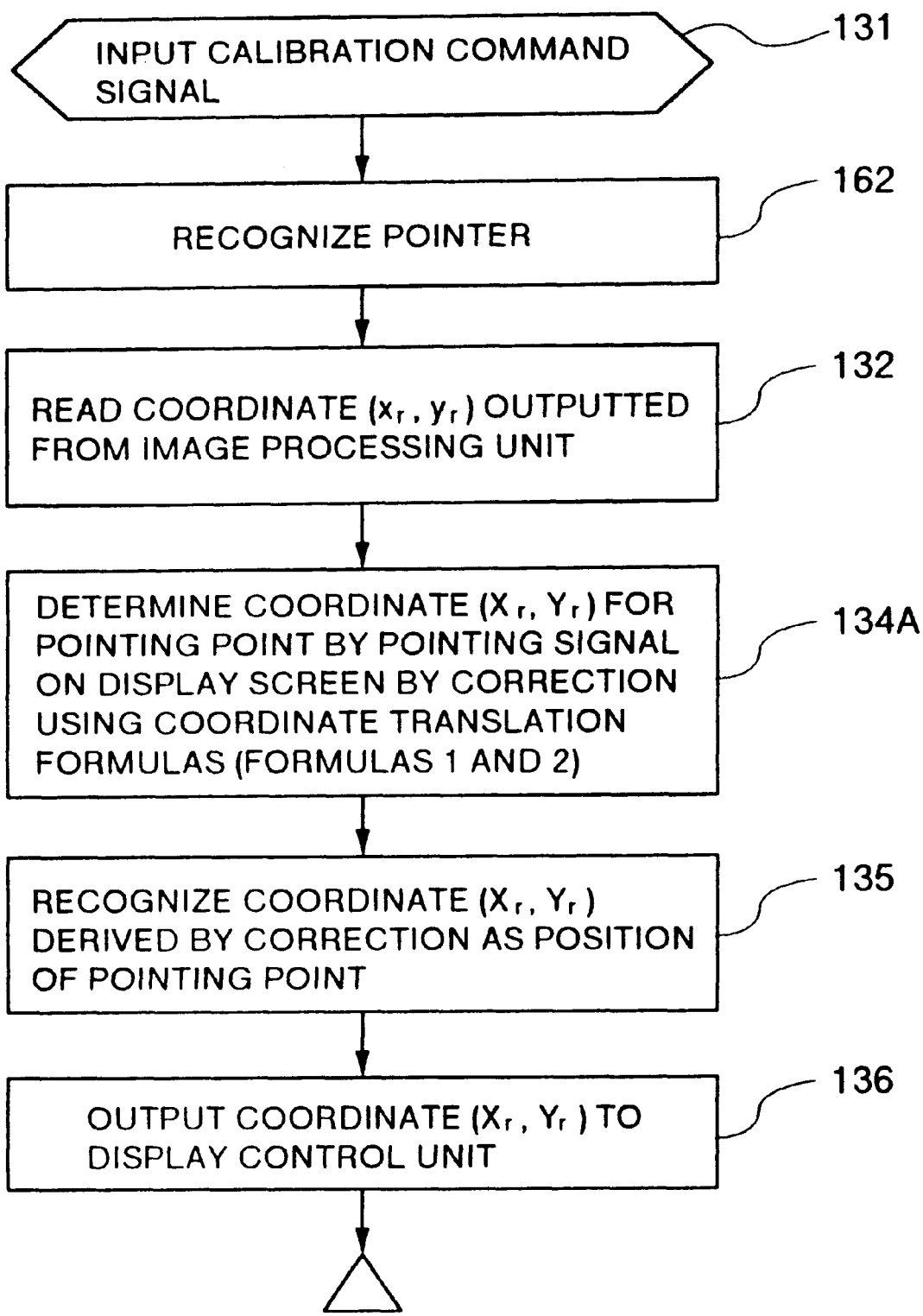
FIG. 55 illustrates a process executed by a pointed position recognition unit of FIG. 53.

FIG. 55 shows a process executed by the pointing point recognition unit 104A in the recognition mode. When the flag of the calibration command signal storage area is "0", the step 162 of FIG. 55 is executed. Namely, the information on the type of pointer is entered from the image processing unit 103 to recognize the pointer 113 (for example, the pointer 113 which emits the red ray). The n pointer have different wavelengths of output pointing signals (visible rays). The corresponding pointer is recognized in accordance with the wavelength. Then, the step 132 is executed. the coordinate (x$_r$, Y$_r$) derived by the image processing unit 103 is corrected by using the coordinate translation formula (step 134A). The coordinate (X$_r$, Y$_r$) of the position on the display screen of the large screen display device 101A actually pointed by the pointing signal from the pointer is determined through the correction. The coordinate X$_r$ is determined by placing the x coordinate x$_r$ and the y coordinate Y$_r$ of the coordinate (X$_r$, Y$_r$) to the variables x and y of the formula (1). The coordinate Y$_r$ is determined by placing the x coordinate x$_r$ and the y coordinate y$_r$ Of the coordinate (x$_r$, Y$_r$) to the variables x and y of the formula (2). When the coordinate (X$_r$, Y$_r$) derived by the correction in the step 134A is recognized as the position on the display screen of the large screen display device 101A actually pointed by the pointing signal.

Since the pointer outputs the visible ray as the pointing signal, the visible ray is displayed on the display screen of the large screen display device 101A. Thus, in the present embodiment, the step 136 of FIG. 42 is not necessary.

The object specifying unit 106A executes the process of FIG. 43 to specify the object displayed at the position of the coordinate (X$_r$, Y$_r$) recognized in the step 35 of the pointing point recognition unit 104A. Further, the object specifying unit 106A outputs the character string relating to the specified object.

The input control unit 107A consolidates the character string (for example, "water supply pump") relating to the specified object and the words by the audio input from the audio input device 112B and stores it in the memory 107D. When the signal indicating the end of input is supplied to the input control unit 107A, it outputs the consolidated information in the memory 107D to the input statement analysis unit 107B in a form of single statement. The input statement analysis unit 107B executes the process shown in FIG. 13 to analyze the input statement. The presentation information determination unit 107C determines the information to be presented to the large screen display device 101A by using the information selection knowledge based on the process command derived by the analysis. The information to be presented is outputted to the audio output unit 160 and the display control unit 108A. The display control unit 108A generates the display information based on the information to be presented and outputs the display information to the display device corresponding to the recognized pointer. In the present example, since the pointer #0 is recognized in the step 162, the display information is outputted to the large screen display device 101A corresponding to the recognized pointer #0.

Figure 56:
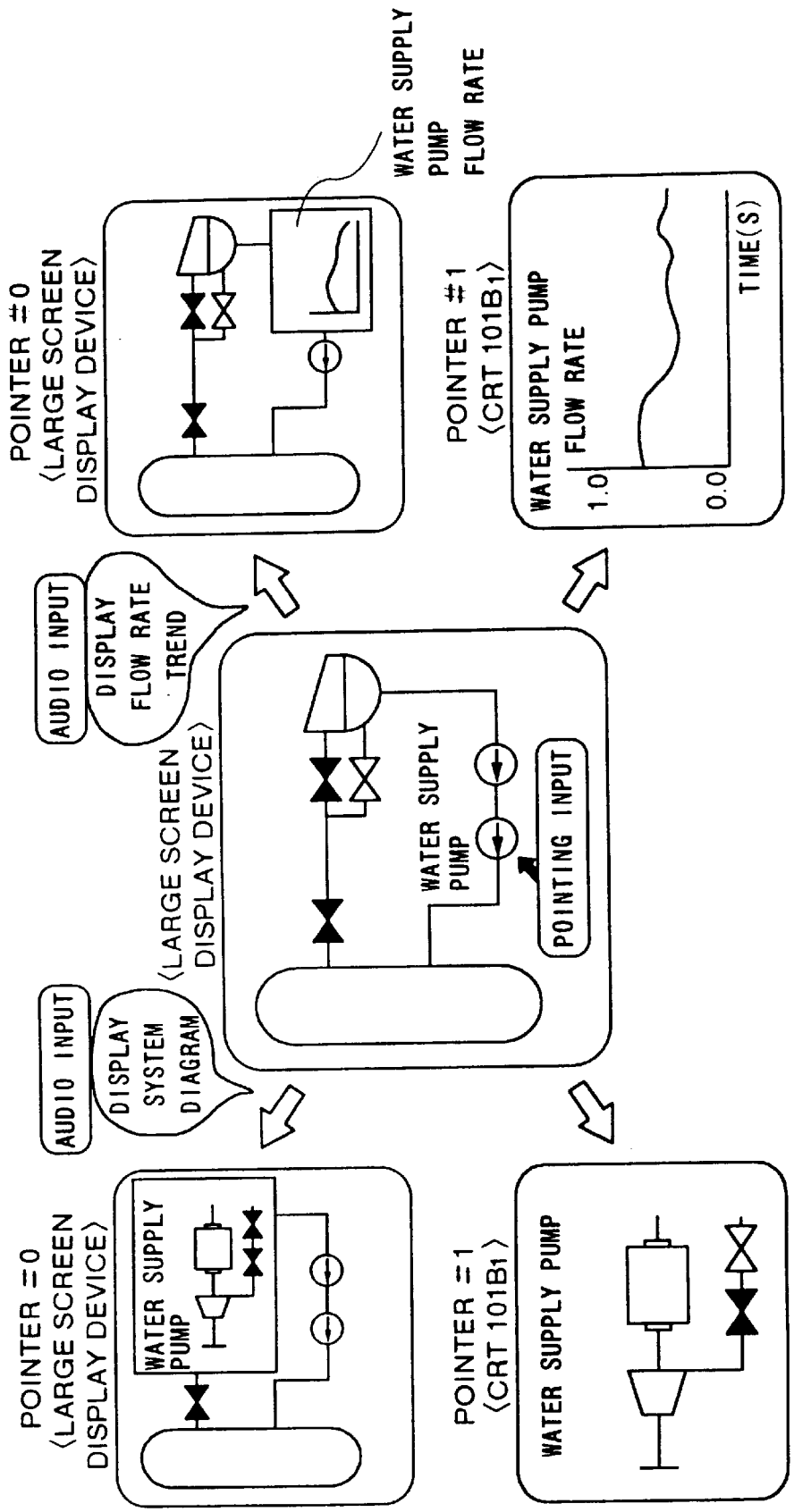
FIG. 56 illustrates an outline of an operation of the embodiment of FIG. 52.

An outline of the operation of the present embodiment is shown in FIG. 56. For example, when the water supply pump in the overall system diagram of the plant pointed by the large screen display device 101A is pointed by the pointing signal outputted from the pointer and "Graphically present system diagram" is inputted by the audio input, the water supply pump system diagram is displayed on the large screen display device 101A if the pointer is the pointer #0 for controlling the large screen display device, and on the CRT 101B₁ if the pointer is the pointer #1 for controlling the CRT 101B₁. Similarly, when the water supply pump is pointed and "Display flow rate trend" is inputted by the audio input, the trend chart of the water pump flow rate is displayed on the large screen display device or the CRT #1. This is essentially same as the operation shown in FIG. 16 in the embodiment of FIG. 11.

In accordance with the preset embodiment, the coordinate translation formula for the correction which presents the relation between the coordinate of the specified display position and the coordinate of the calibration marker derived by the image processing of the image picked up by the TV camera can be automatically generated. By placing the coordinate derived by the image processing to the coordinate translation formula, the coordinate for the pointing point on the display screen can be readily determined. It is also possible to specify the position of the object on the display screen included in the picked-up image by using the coordinate translation formula. In the present embodiment, the display screen is pointed by the laser beams of different wavelengths. However, it need not be limited to the light beam but the pointing point on the display screen by a pointing bar can be recognized in the same manner if the detection of the tip end of the pointing bar is effected by the image processing.

The present embodiment allows the operation by a plurality of operators by using a plurality of pointers which emit laser beams of different wavelengths. The position to display the information may be changed by the type of pointer to provide an environment to facilitate the monitoring of the plant by the operators. Since only one type of coordinate translation formula need be prepared, it is not necessary to prepare a new formula when the type of pointer is changed and the addition of the pointer is facilitated.

The present embodiment can attain the same effect as that of the embodiment of FIG. 36. Since the present embodiment uses a plurality of pointers of different pointing signals, the same effect as that of the embodiment of FIG. 1 can also be attained.

Figure 57:
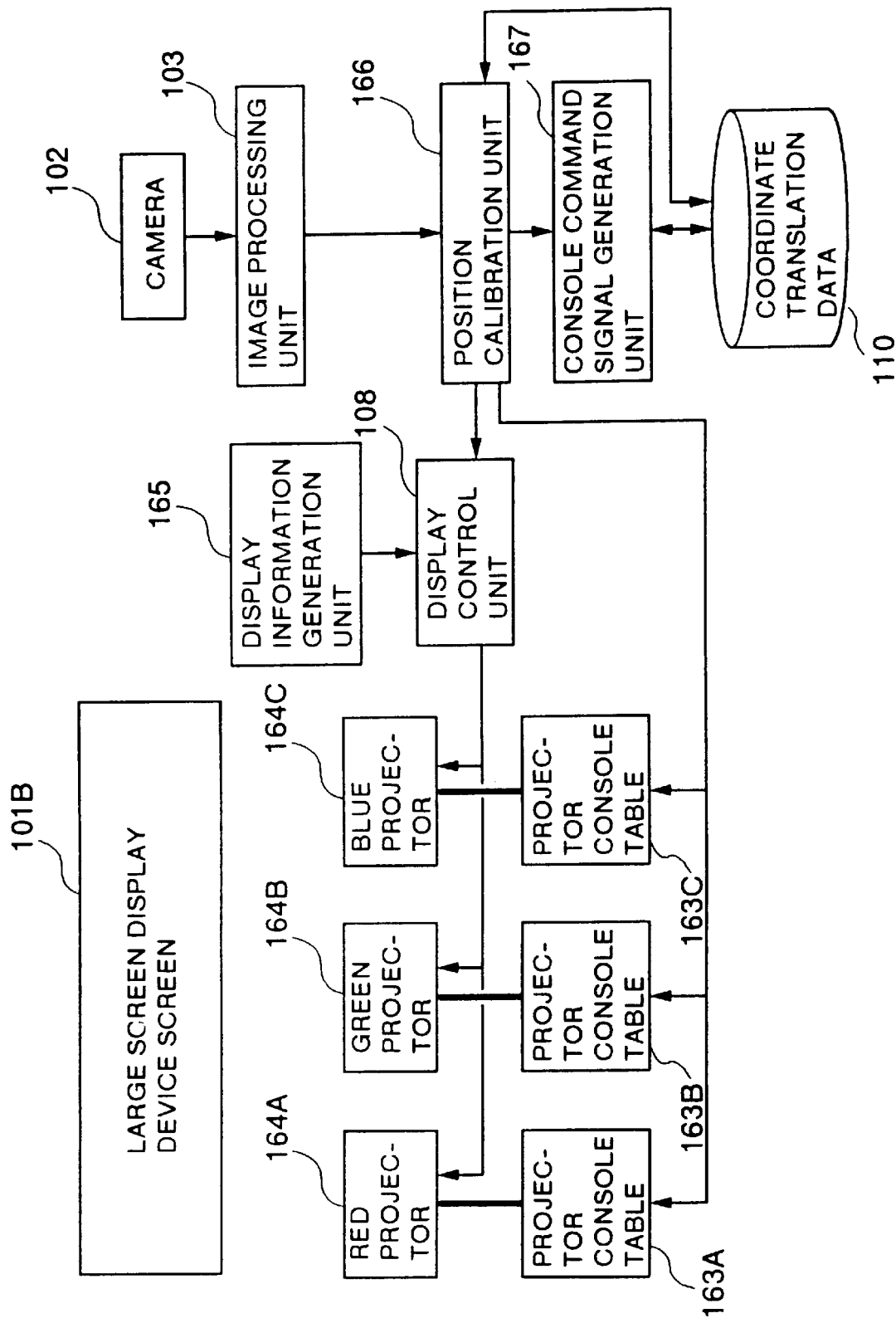
FIG. 57 shows a configuration of other embodiment of the present invention.

Referring to FIG. 57, other embodiment of the information display apparatus of the present invention is explained. The present embodiment relates to the projection type information display apparatus, and it differs from the configurations of the embodiment of FIG. 36, the embodiments of FIGS. 46 and 48, the embodiment of FIG. 49 and the embodiment of FIG. 52, and the calibration method of one of those embodiments is applied to the position control of the projectors of element colors.

The present embodiment comprises the TV camera 102 for picking up the screen (display screen) 101B of the large screen display device, the image processing unit 103, the display control unit 108, the memory 10, the projector console tables 163A, 163B and 163C, the red projector 164A for projecting a red ray to the screen 101B, the green projector 164B for projecting a green ray to the screen 101B, the blue projector for projecting a blue ray to the screen 101B, the position calibration unit 166, the console command signal generation unit 167 and the display information generation unit 165.b The red, green and blue rays are element rays.

Normally, the display control unit 108 outputs the display information of the corresponding element rays to the red projector 164A, the green projector 164B and the blue projector 164C to display the display information outputted from the display information generation unit 165 to the screen 101B. The red projector 164A, the green projector 164B and the blue projector 164C simultaneously display the information of the corresponding element rays in overlap. Thus, the information is projected in color on the screen 101B. The red projector 164A is mounted on the projector console table 163A. The green projector 164B is mounted on the projector console table 163B. The blue projector 164C is mounted on the projector console table 163C. The projector console tables 163A, 163B and 163C are rotatable horizontally and vertically in the same manner as a tripod for a camera. Thus, by rotating the projector console tables, the orientations of the projectors mounted on the projector console tables can be changed. Of the elements of the present embodiment, at least the projector console tables 163A, 163B and 163C, the red projector 164A, the green projector 164B and the blue projector 164C are mounted on the rear side of the screen 101B in the case of the large screen display device 101B. Namely, the images from the respective projectors are projected to the screen 101B from the rear side. In the present embodiment, the entire screen 101B is the area in which the image is displayed.

However, if the positions of the red ray, the green ray and the blue ray emitted from the projectors 164A, 164B and 164C deviate from each other, the images of the respective colors are displayed in stagger on the screen 101B. Thus, the user is hard to watch the image displayed on the screen. In order to avoid it, it is necessary to previously adjust the directions of emission of the projectors 164A, 164B and 164C so that the images of the respective element rays are not displayed in stagger.

The adjustment is explained below.

The user inputs the calibration command signal from the input device (not shown). The calibration command signal is supplied to the position calibration unit 166. The position calibration unit 166 executes the process shown in FIG. 46. Since the decision in the step 114 is YES, the steps 118A, 119A, 120A and 121A are sequentially executed. In the step 118A, the coordinates $(X_i, Y_i)$ of the specified display positions of the plurality of markers 123A are outputted to the display control unit 108. In the present embodiment, the coordinate $(X_i, Y_i)$ of the specified display position is set to the red projector 164A although it may be set to the projector 164B or the projector 164C. The display control unit 108 generates the graphic information of the markers 123A for the plurality of coordinates $(X_i, Y_i)$ and outputs them to the red projector 164A. The red projector 164A emits the graphic information of the red marker 123A to the screen 101B so that it is positioned at the coordinates ($X_i$, $Y_i$). The screen 101B displays the plurality of red markers 123Ai as shown in FIG. 45. The image processing unit 103 executes the process of FIG. 48 for the input image picked up by the TV camera 102 and outputs the plurality of coordinates ($x_i$, $y_i$).

The position calibration unit 166 executes the steps 119A and 120A to generate calibration data which associates the coordinates ($X_i$, $Y_i$) with the coordinates ($x_i$, $y_i$) of the red markers 123Ai corresponding to the coordinates ($X_i$, $Y_i$). Then, the step 129 is executed. When the step 129 is over, the position calibration unit 166 outputs a start of adjustment signal to the console command signal generation unit 167.

In the present embodiment, the image of the display screen of the large screen display device 101B picked up by the TV camera 102 includes a distortion due to the aberration of the lens of the TV camera 102 and the installation position of the TV camera 102, as it does in the embodiment of FIG. 36. Accordingly, the position of the image of the calibration marker 123A$_i$ in the image of the display screen deviates from the coordinate ($X_i$, $Y_i$) of the pointing display position. In the present embodiment, the calibration data (coordinate translation table) which associates the coordinates ($X_i$, $Y_i$) of the pointing display position with the coordinates ($x_i$, $y_i$) of the positions of the calibration markers 123A$_i$ which are affected by the distortion of the image on the display screen can be readily generated.

Figure 58:
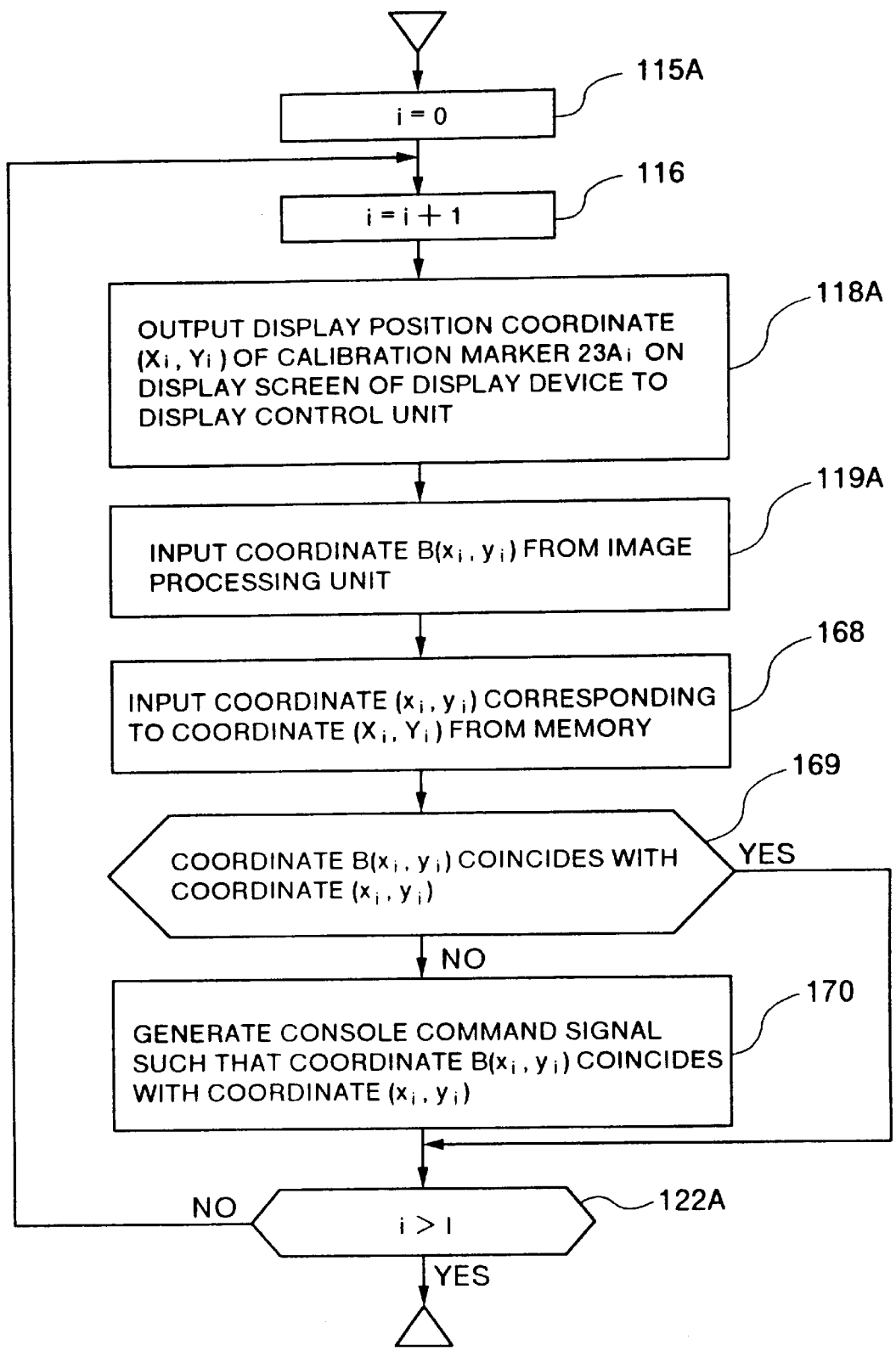
FIG. 58 illustrates a process executed by an operation command signal generation unit of FIG. 56.

When the console command signal generation unit 167 receives the start of adjustment signal, it executes a process of FIG. 58.

The console command signal generation unit 167 executes steps 115A, 116 and 118A. The steps 118A, 119A, 168 and 170 of FIG. 58 are first effected to the green projector 164B, and then to the blue projector 164C. The display control unit 108 generates the graphic information of the marker 123A for the coordinates ($X_i$, $Y_i$), which is outputted to the green projector 164B. The green projector 164B projects the graphic information of the green marker 123A to the screen 101B such that they are positioned at the coordinates ($x_i$, $y_i$). The image processing unit 103 executes the process of FIG. 48 to the input image picked up by the TV camera 102, and outputs the coordinates B ($x_i$, $y_i$) derived for the green marker 123A.

The console command signal generation unit 167 receives the coordinates B ($x_i$, $y_i$) (step 119A) and receives the coordinates ($x_i$, $y_i$) of the red markers 123A$_i$ for the coordinates ($X_i$, $Y_i$) from the memory 110 (step 168). Whether the coordinate B ($x_i$, $y_i$) of the green marker 123A$_i$ and the coordinate ($x_i$, $y_i$) of the red marker 123A$_i$ of the same coordinates ($X_i$, $Y_i$) coincide or not is determined (step 169). If the decision is YES, a step 122A is executed, and if the decision is NO, a step 170 is executed. The console command signal is generated such that the coordinate B ($x_i$, $y_i$) coincide (step 170). The console command signal is outputted to a drive unit of the projector console table 163B. The drive unit rotates the projector console table 163B horizontally or vertically such that the coordinate B ($x_i$, $y_i$) coincides with the coordinate ($x_i$, $y_i$), and adjusts the direction of the green projector 164B relative to the screen 101B. If the decision in the step 122A is YES, the adjustment of the projection direction of the image of the green projector 164B for the green marker is terminated.

By this adjustment, the coordinates B ($x_i$, $y_i$) for all green markers coincide to the coordinates ($x_i$, $y_i$) for all red markers. Accordingly, there is no shift between the image from the red projector 164A and the image from the green projector 164B displayed at the same positions on the display screen of the large screen display device 101B.

A similar process is effected for the blue projector 164C and the direction of the blue projector 164C is adjusted by the projector console table 163C as the green projector 164B is. Accordingly, the images projected from the red projector 164A, the green projector 164B and the blue projector 164C to display the images at the same position on the display screen of the large screen display device 164B are not deviated from each other.

The red projector 164A, the green projector 164B and the blue projector 164C have been adjusted in the stage of manufacture of the information display apparatus to a preferred condition of the projection direction of the images. However, the projection directions of the images may be slightly changed by the movement to the installation position after the shipment from the manufacuterer to the user and the change of the installation position. The present embodiment is particularly useful in such a situation to adjust the directions of the projectors.

In the present embodiment, one marker is displayed each time to output the console command signal to the projector console table and this process is repeated. Alternatively, the console command signal generation unit 67 may generate the console command signal to the drive unit of the projector console table by consolidated calculation based on the coordinates ($X_i$, $Y_i$) derived from the correction by using the coordinate ($X$, $Y$) of the pointing display position and the calibration data. In this process, the console command signal is generated by determining the deviation of the markers at a plurality of positions on the display screen by using the previously prepared knowledge.

In accordance with the present embodiment, the directions of the projectors for the element colors can be automatically adjusted. In the past, such adjustment took a considerable time of an experienced attendant. In the present embodiment, the adjustment is effected in a simple manner in a short time.

Figure 59:
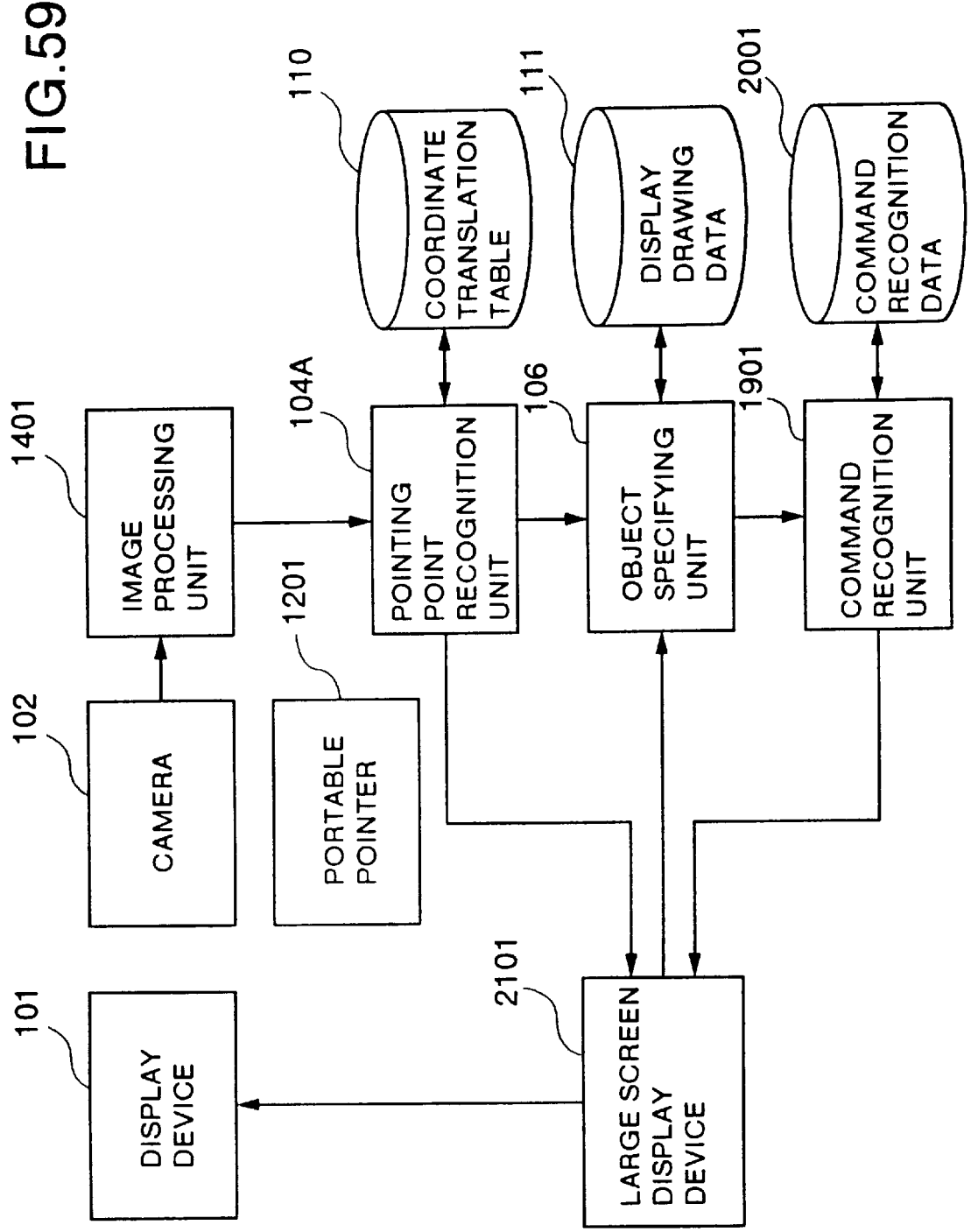
FIG. 59 shows a configuration of an information display apparatus in accordance with other embodiment of the present invention.

Referring to FIG. 59, other embodiment of the information display apparatus of the present invention is explained.

In FIG. 59, numeral 101 denotes a display device for displaying graphic and symbols and numeral 1201 denotes a portable pointer for remotely pointing the display screen of the display device 101. The portable pointer 1201 emits an infrared laser beam. The display device 101 is a large screen display device. A camera 102 for picking up an area including the display screen has a visible ray cut filter mounted thereon to sense only an infrared ray. Numeral 1401 denotes an image processing unit for processing the picked-up image to determine a coordinate of a pointing point to the display screen based on a pointing signal outputted from the portable pointer 1201 and the input mode, numeral 1501 denotes a pointing point recognition unit for recognizing a position of the pointing point by the portable pointer 1201, numeral 104A denotes a memory for storing a coordinate translation table, numeral 106 an object specifying unit for specifying a displayed object on the display screen pointed by the pointing signal, numeral 111 denotes a memory for storing display graphic data, numeral 1901 denotes a command recognition unit for recognizing an input command to generate a process command to a display control unit 2101, numeral 2001 denotes a memory for storing data for recognizing the command, and numeral 2101 denotes a display control unit.

Figure 60:
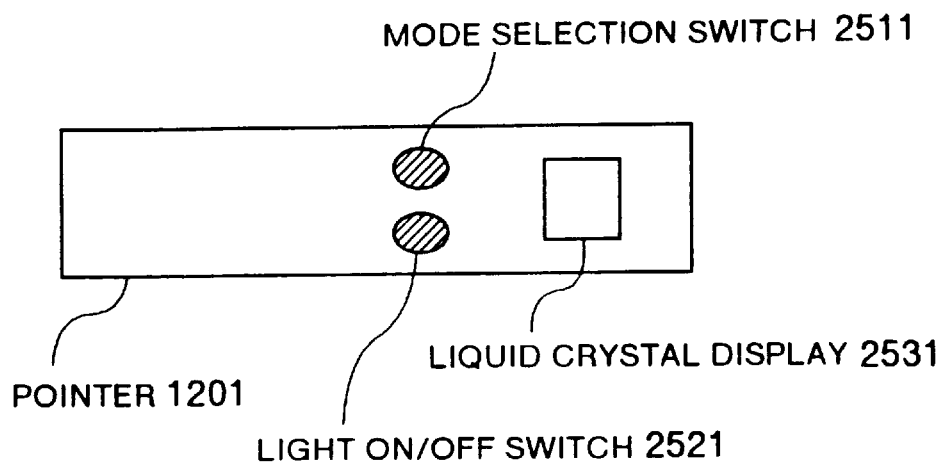
FIG. 60 shows an outer view of a portable pointer of FIG. 59.

As shown in FIG. 60, the portable pointer 1201 comprises a mode selection switch 2511, a light on/off switch 2521 and a liquid crystal display 2531. The mode selection switch 2511 is used to select an input mode. The light on/off switch 2521 is used to turn on and off the emitted light which is the pointing signal. The liquid crystal display 2531 is used to display the information on the output mode (a feature of the pointing signal) of the emitted light.

Figure 61:
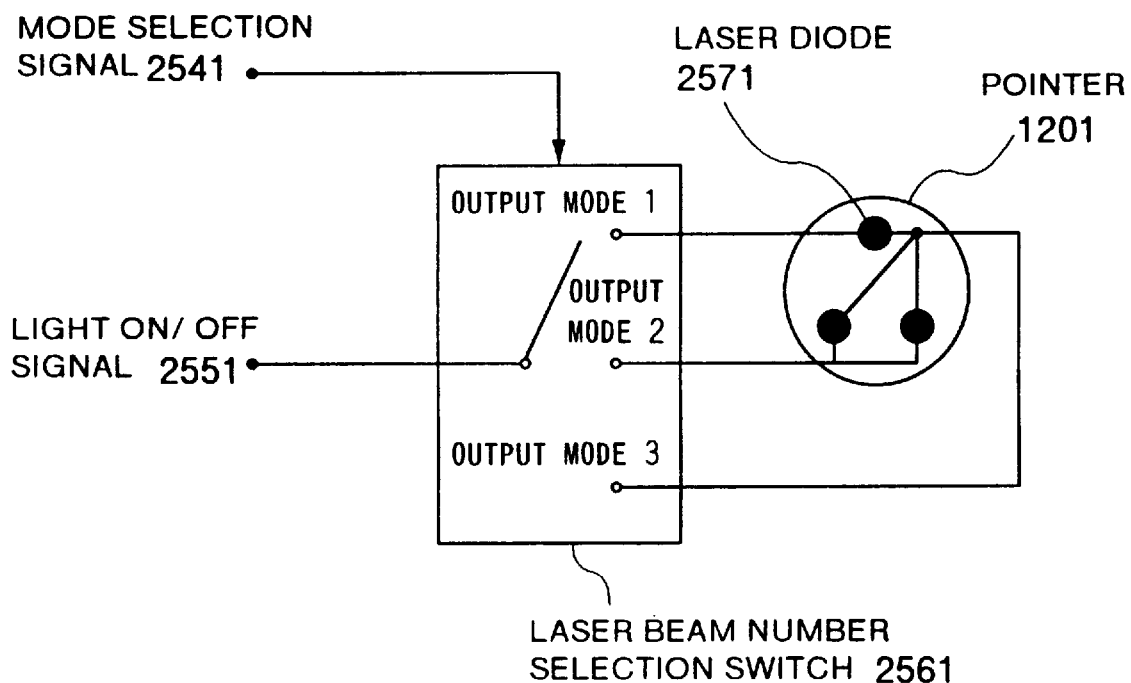
FIG. 61 shows a control circuit diagram for an exit light of a pointer of FIG. 60.

FIG. 61 shows a circuit for switching the emitted lights from the portable pointer 1201. A mode selection signal 2541 is inputted when the mode selection switch 2511 is depressed. The light on/off signal 2511 is on while the light on/off switch 2521 is depressed. When the mode selection signal 2541 is applied to a laser beam number selection switch 2561, it sequentially switch the output mode of the emitted light to the modes 1, 2 and 3. When a desired output mode is selected, the depression of the mode selection switch 2511 is terminated and it is rendered free. The laser beam number selection switch 2561 then sets the desired output mode. When the light on/off signal 2511 is on, the laser diode 2571 in accordance with the output mode set by the laser beam switch 2561 is turned on. Namely, in the output mode 1, one laser diode 2571 is turned on.

In the output mode 2, two laser diodes 2571 are turned on and in the output mode 3, three laser diodes 2571 are turned on. Thus, when the input mode is set by the mode selection switch 2511 and the light on/off switch 2521 is depressed, the laser beam in accordance with the output mode is emitted.

Figure 62:
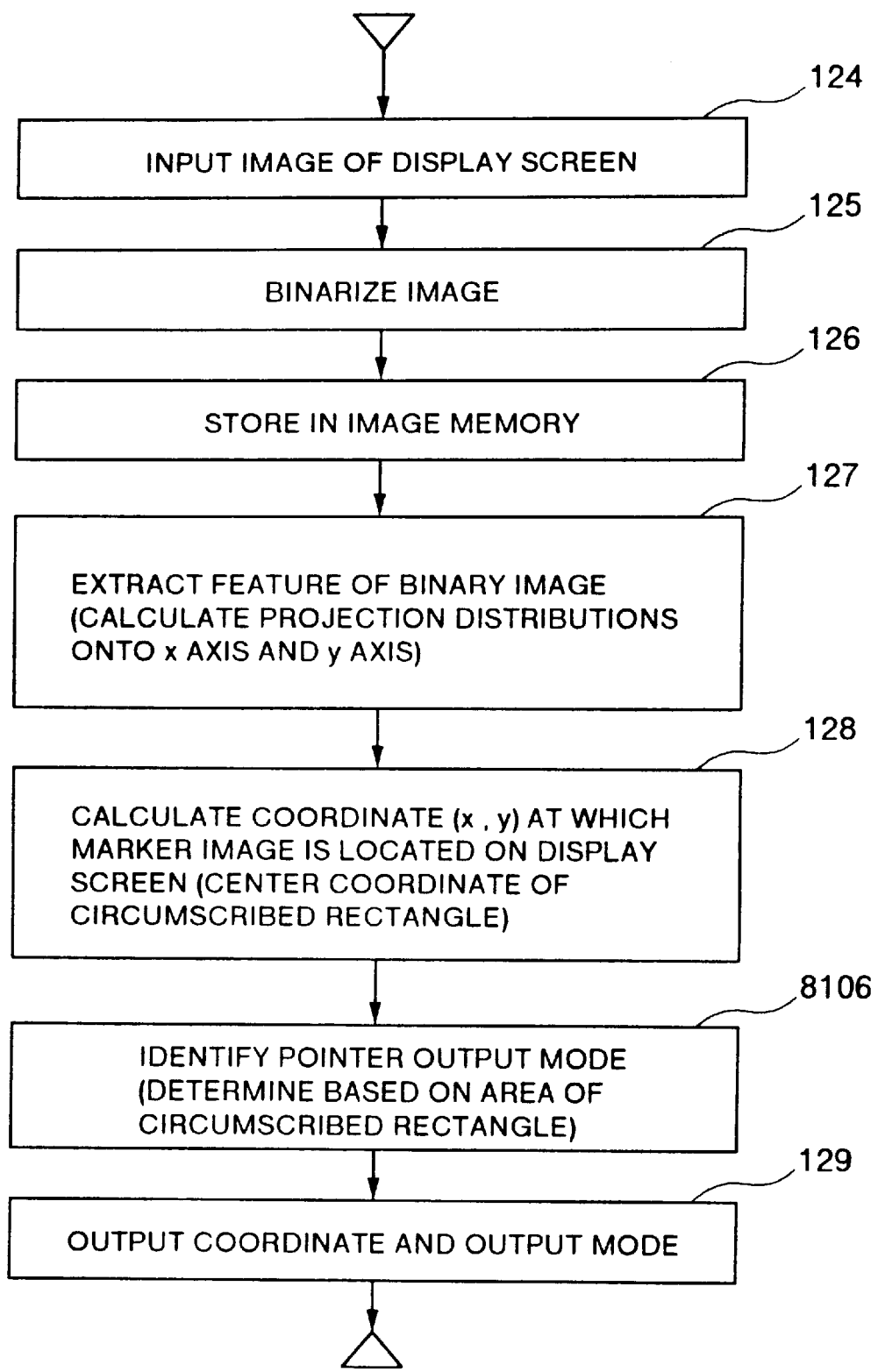
FIG. 62 shows a flow chart of a process of an image processing unit of FIG. 59, FIGS. 63A, 63B and 63C illustrate a method for recognizing a projection distribution and a center coordinate as well as a pointer output mode executed by the image processing unit of FIG. 59.

FIG. 62 shows a process executed by the image processing unit 1401. The image processing unit 1401 first executes steps 124, 125 and 126. It extracts a feature of the pointing signal outputted from the pointer based on the binary image (step 127). By using the result thereof, a center coordinate (x, y) of a circumscribed rectangle is calculated. The resulting center coordinate (x, y) is a coordinate of the position pointed by the pointing signal on the display screen (step 128). The output mode of the pointer is determined based on the area of the circumscribed rectangle (step 8106). This process utilizes the change in the area of the circumscribed rectangle depending on the number of emitted lights from the pointer (the area is larger when the output lights from the pointer are three than when it is one). Then, the coordinate and the detected input mode are outputted to the pointing point recognition unit 104A (step 129).

FIGS. 63A–63C show a schematic diagram of a calculation method of a projection distribution and a coordinate effected by the image processing unit 1401. The projection distributions to the x axis and the y axis are attained by summing densities of the images (infrared rays from the pointer) along the x axis and the y axis. By this process, the density distributions along the x axis and the y axis are derived as shown in FIGS. 63B and 63C. The coordinates $x_1$, $x_2$, $y_1$, $y_2$ of the area in which the density exceeds a predetermined criteria are determined. The center coordinate of the circumscribed rectangle is determined based on the above coordinates to produce the coordinate (x, y) in the image memory of the center of the infrared ray 2301 which is the pointing signal. The area of the circumscribed rectangle differs depending on whether the number of infrared rays 2301 outputted from the pointer 1201 is one, two or three. Thus, the input mode may be discriminated from the area by comparing it with a discrimination criteria, as it is in FIG. 40A, 40B and 40C.

In this manner, the image processing is simplified and the pointing point on the display screen at which the pointing signal arrives and the output mode of the pointer 1201 can be determined. In the present embodiment, the coordinate of the pointing point and the output mode are determined by the image processing unit 1401 although they may be determined by using a conventional computer instead of the dedicated image processing unit.

The pointing point recognition unit 104A executes steps 132–136 excluding a step 131 shown in FIG. 42. In the present embodiment, the infrared ray is used as the pointing signal although a visible ray may be used as the pointing signal. In this case, since the position of the visible ray arrived at the display screen can be directly recognized, the display process for the cursor is not necessary. The visible ray cut filter is not used for the camera 102. In order to distinguishably read the image of the visible ray pointing signal from other image displayed on the display screen, it is necessary to enhance the intensity of the visible ray pointing signal and adjust a diaphragm of the camera 102 to suppress the affect to the image on the display screen.

Figure 12:
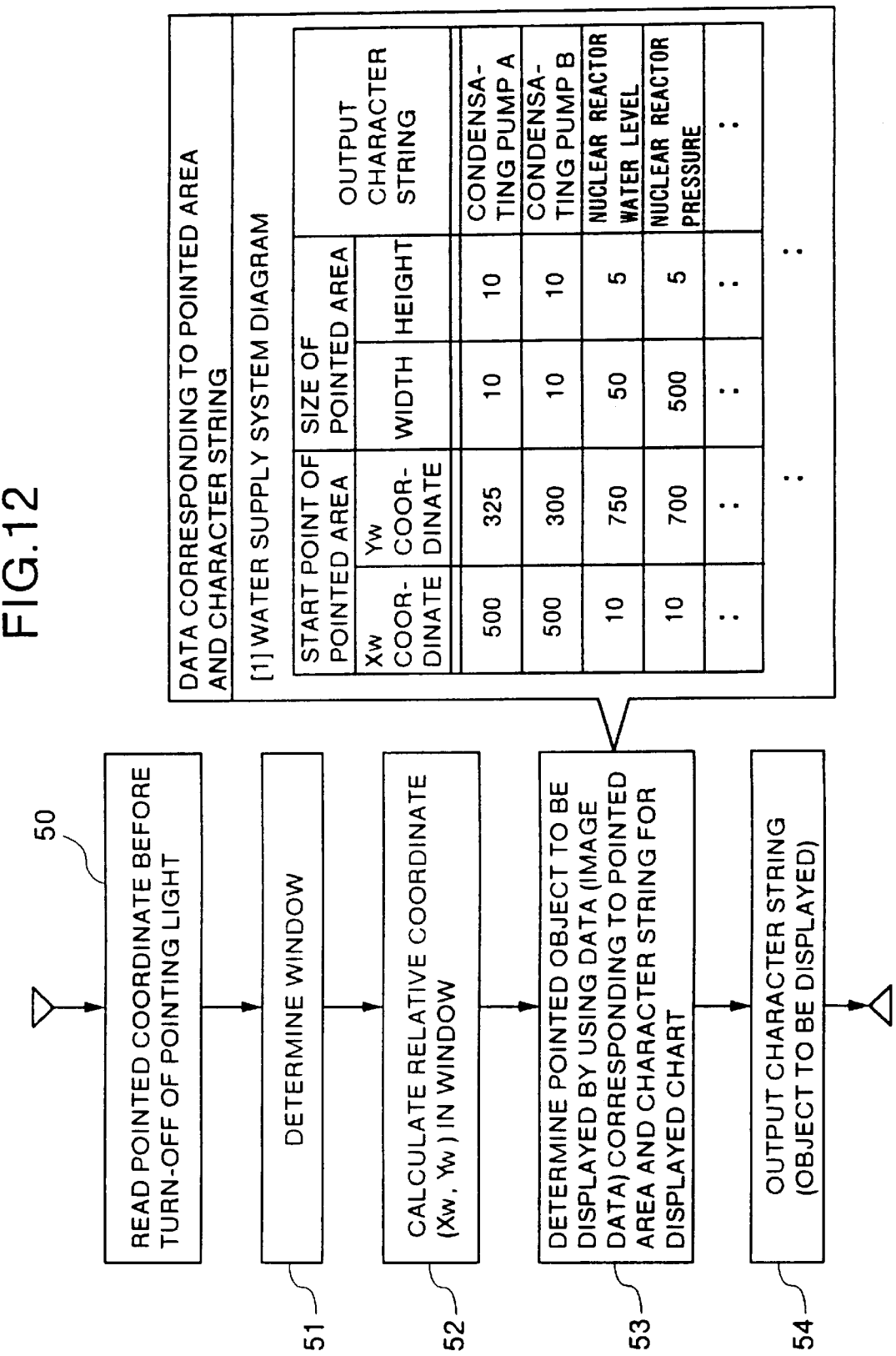
FIG. 12 illustrates a process executed by an object identification means of FIG. 11.

The object specifying unit 106 executes steps 50–54 shown in FIG. 12.

The command recognition unit 1901 receives the character string of the object to be displayed specified by the object specifying unit 106 and the output mode of the pointer and executes a process shown in FIG. 64. It determines the output form by using the mode-output form table based on the output mode (step 8401). As shown in FIG. 65, the mode-output form table indicates the output mode number and the corresponding output form such as a system diagram, a trend chart and an ITV image. The table is previously prepared and stored in the memory 2001. Based on the character string of the object to be displayed and the output form thereof, the information to be outputted to the display device 101 is determined (step 8402). To this end, the data of the output information management table shown in FIG. 66(*a*) is used. The data provides the information to be outputted for each specified display object and output form and it is previously stored in the memory 2001 as the command recognition data. When the operator points the "turbine" on the displayed drawing and if the output form is a system diagram, a system diagram of the turbine is selected as the information to be outputted to the display device 101. The result is outputted to the display control unit 2101 (step 8403).

In the present embodiment, as shown in FIG. 66(*a*), the output form is changed in accordance with the output mode of the pointer. Alternatively, the information item may be changed in accordance with the output mode of the pointer. For example, the output mode 1 of the pointer is related to the rotating speed and the output mode 2 of the pointer is related to the shaft vibration. Thus, as shown in FIG. 66(*b*), when the specified object to be displayed is the turbine and the output mode of the pointer is the mode 1, that is, corresponds to the rotating speed, a trend chart of the turbine rotating speed is outputted to the display device 101 as the output information. On the other hand, when the output mode of the pointer is the mode 2, that is, corresponds to the shaft vibration, a trend chart of the turbine shaft vibration amplitude is outputted to the display device 101 as the output information. As shown in FIG. 66(*c*), the output mode 1 of the pointer may be related to the information for the operator, the output mode 2 of the pointer may be related to the information for a maintenance person, and the output mode 3 of the pointer may be related to the information for a responsible manager. For example, when the turbine is pointed and the output mode of the pointer is the mode 1, a start procedure for the turbine is selected as the output information for the operator, and if the output mode of the pointer is the mode 2, a maintenance procedure for the turbine is selected as the output information for the maintenance people. The display form of the information may be changed in accordance with the input mode. In the output mode 1, the output information is displayed on the entire display screen of the display device 101.

Figure 67:
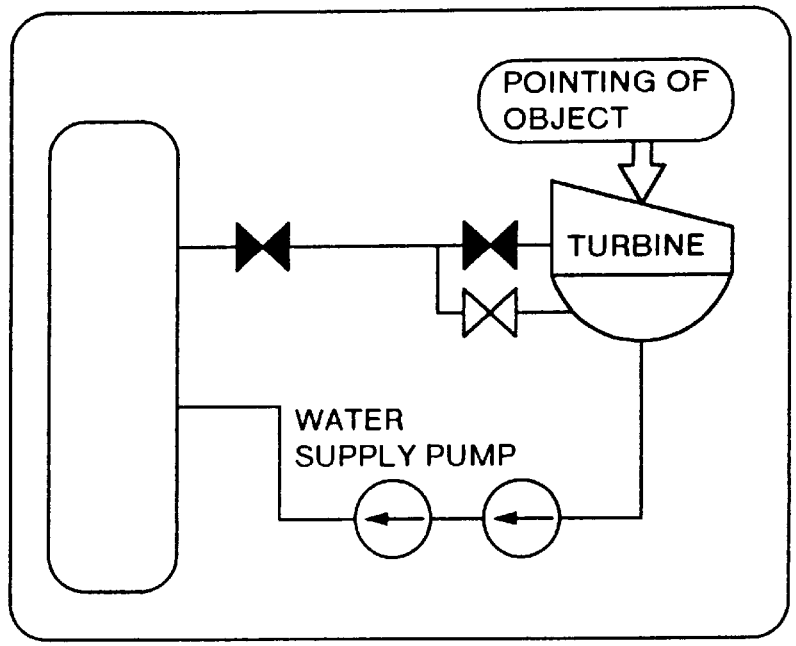
FIG. 67 illustrates the pointing by a pointing signal from a display screen in the embodiment of FIG. 59.
Figure 68:
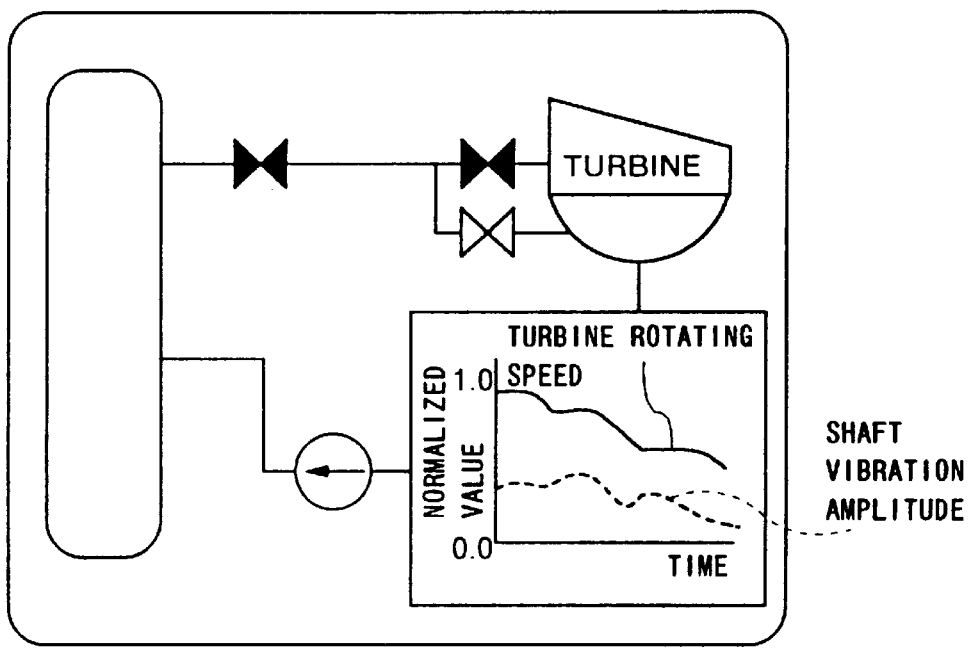
FIG. 68 illustrates a display of a trend chart corresponding to a pointing signal of FIG. 67.

FIGS. 67 and 68 show an operation of the present embodiment. A plant system diagram as shown in FIG. 67 is displayed on the display screen of the display device 101. When the operator points the turbine by the portable pointer 1201 in the output mode 2, the output form corresponding to the output mode 2 is a trend chart as seen from FIG. 65 and the trend chart of the turbine rotating speed and the turbine shaft vibration amplitude is displayed on the display screen of the display device 101 as shown in FIG. 68. In the present embodiment, the trend chart is displayed in a window in the system diagram.

In accordance with the present embodiment, the pointing is made by the portable pointer while the output mode is selected so that the information necessary to monitor the plant may be remotely selectively displayed. Thus, the plant operator may remotely selectively command the information necessary for the plant operation without restriction to the input site and can readily display it on the display screen for confirmation.

In accordance with the present embodiment, the output mode and the pointing point can be determined with the simple image processing. Thus, the system configuration is simpler than that when the input mode is separately determined by using a separate system or apparatus. The output mode of the pointer is selected by the manipulation of the mode selection switch 2511 of the pointer 1201. By this manipulation, the turn- on and the turn-off of the laser diode which emits the laser beam is controlled and the number of emitted lights is set. Thus, the portable pointer 1201 may be readily manufactured without using a complex circuit.

The information on the set output mode is displayed on the liquid crystal display device 2531 mounted on the pointer 1201. Thus, the operator can confirm the set output mode. The mode number may be directly displayed on the display device 2531, or the output form of the mode, that is, the system diagram or the trend chart may be displayed. In the present embodiment, the information on the output mode is displayed on the liquid crystal display device 2531 of the pointer 1201. Alternatively, the output mode may be confirmed by the shape of the cursor of the pointing signal displayed on the display screen of the display device 1201, or a message.

In the present embodiment, since the infrared ray is used for the exit light from the pointer 1201, the deviation of the recognized pointing point from the actual pointing point due to the recognition error in the image processing and the distortion of the camera image may be corrected. Namely, the pointing is made while the recognized pointing point is confirmed by the cursor so that the erroneous pointing of the object is prevented.

Figure 69:
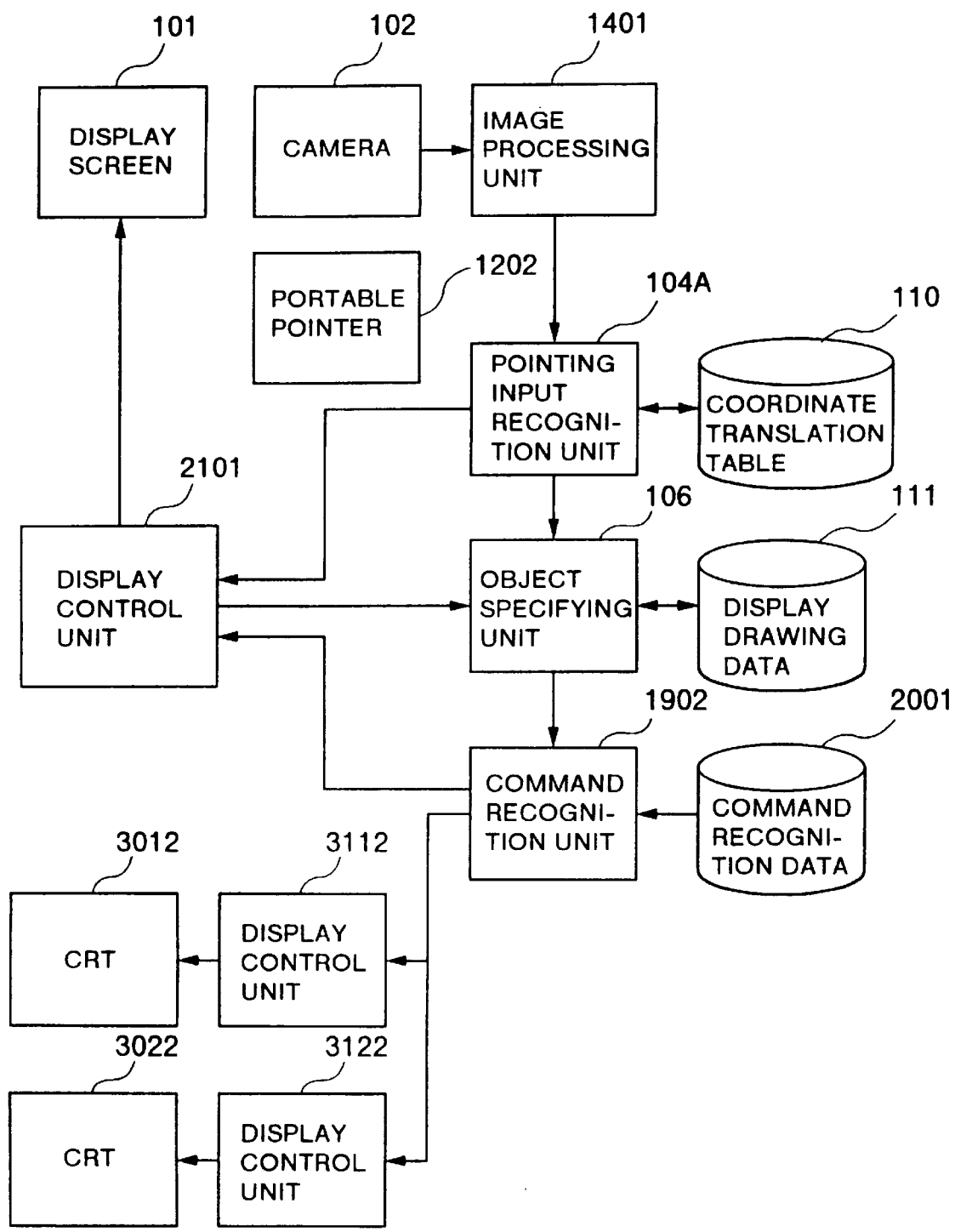
FIG. 69 shows a configuration of an information display apparatus in accordance with other embodiment of the present invention.

Referring to FIG. 69, other embodiment of the information display apparatus of the present invention is explained. The like elements to those of FIG. 59 are designated by the like numerals. The present embodiment differs from the embodiment of FIG. 59 in that a pointer 1202 and a command recognition unit 1902 are provided, and display control units 3112 and 3122 and CRTs 3012 and 3022 are provided.

The portable pointer 1020 and the command recognition unit 1902 are explained below. Other processes are identical to those of the embodiment of FIG. 59.

Figures 70, 71:
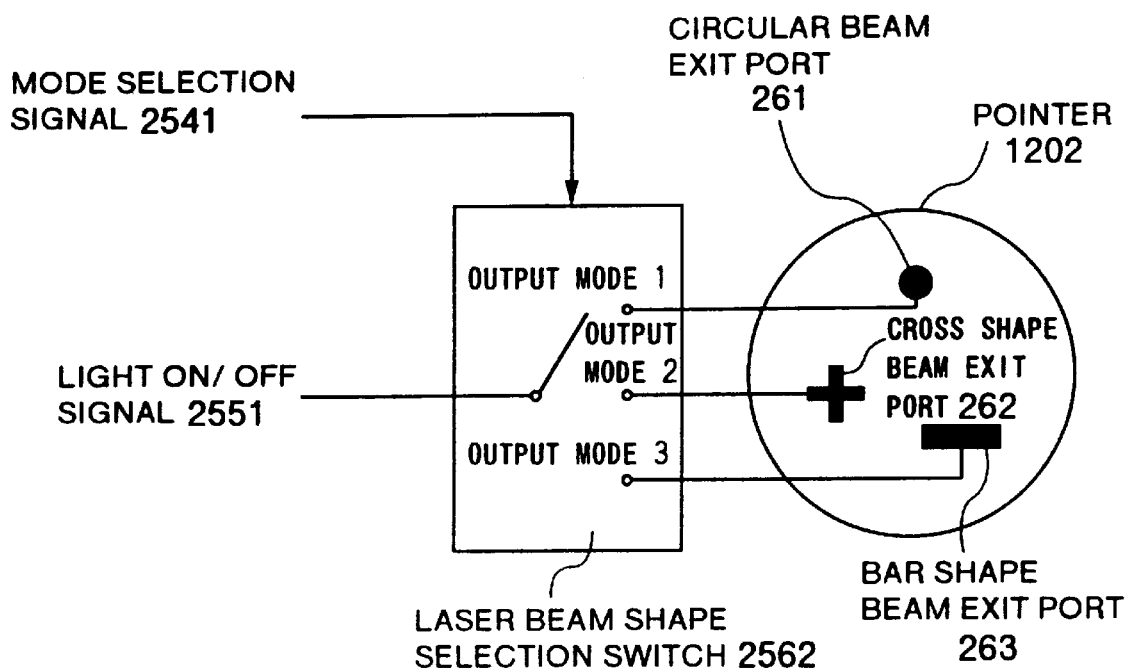
FIG. 70 shows a control circuit for an exit light shape of a pointer of FIG. 69.
FIG. 71 illustrates a content of a pointer output mode versus output device table used in the embodiment of FIG. 69.

FIG. 70 shows a circuit diagram for controlling the exit light of the pointer 1202. When the mode selection switch 2511 is depressed, the mode selection signal is applied to a laser beam shape switch 2562. While the light on/of switch 2521 is depressed, the light on/off signal 2552 is turned on and applied to the laser beam shape switch 2562. When the mode selection signal 2542 is inputted to the laser beam shape switch 2562, it switches the output mode of the exit light in the order of 1, 2 and 3. While the on light on/off signal 2552 is applied, the laser diode is turned on in accordance with the output mode set by the laser beam shape switch 2562. Namely, in the output mode 1, the laser diode which emits a circular laser beam is turned on and the laser beam is emitted from a circular beam exit port 261. In the output mode 2, a laser diode which emits a cross shape laser beam is turned on. Thus, the laser beam is emitted from a cross shape exit port 262. In the output mode 3, a laser diode which output a bar shape laser beam is turned on. Thus, the laser beam is emitted from a bar shape beam exit port 263. Thus, by depressing the light on/off switch 2521 after the exit light output mode has been set, the laser beam of the shape for the output mode is outputted from the pointer 1201. In the present embodiment, the shape of the beam is changed by using the leans. By the difference between the shapes of the exit lights, the output mode can be recognized by the image processing unit 1401 as it is in the embodiment of FIG. 59.

FIG. 71 shows a chart of the content of the mode-output device table prepared in the memory 2001 as the command recognition data. In the present embodiment, this data is used to switch the output device (the display control units 2101, 3112 and 3122) which displays the information. For example, in the present embodiment, when the type of the input command is limited to the display command for the trend chart and the operator points the water supply pump displayed in the system diagram, the trend chart prepared for the water supply pump, that is, the trend chart of the water pump flow rate (not shown) is displayed. By switching the output device of the trend chart to be displayed by using the mode-output device table, the trend chart is selectively displayed on the display device 101, the CRT 3012 or the CRT 3022 depending on the output mode 1, 2 or 3. Namely, when the output mode is the mode 1, the trend chart is displayed on the display screen of the display device 101. On the other hand, in the output mode 2 or 3, the trend chart is displayed on the CRT display device 3012 or 3022.

In the present embodiment, the input command is limited to the switch command of the information although the output destination of the process command may be the plant control unit. In this case, a manipulation command for the plant equipment may be inputted in a similar manner.

In the present embodiment, the output device for displaying the information is switched in accordance with the input mode. Alternatively, the display form may be switched, instead of the displaying output device, in accordance with the input mode. For example, the display may be switched such that in the mode 1, the display is totally switched, and in the mode 2, a windows is generated to display the information.

In accordance with the present embodiment, the output mode of the portable pointer is switched to switch the output device which displays the information. Thus, in the plant operation, the large screen display device may be used as the display device for common information to the operator crews and the CRT display devices mounted on the console panel may be used as display devices for personal information for the individual operators.

From the embodiments of FIGS. 59 and 67, the pointing signals of the same area on the display screen may be changed by switching the output mode of the pointer as shown in FIG. 61 and the display device (output device) for displaying the information based on the pointing signal may be changed by the output mode of the pointer shown in FIG. 70. Thus, the input operation to display the personal outputs on the individual CRT display devices of the operators and the information to be monitored by all operators on the large screen display device can be readily implemented. In this manner, the control of the information of the operator crews is attained by the efficient and easy input operation.

In the present embodiment, the switching of the display information has been explained. The calculation process for other common control may be implemented in a similar manner by using the output mode and the pointing point recognized by the image processing. For example, when the water supply pump is specified as the object to be displayed and the output mode is the mode 1, it is determined that the the start of the water pump has been commanded and the control command to start the pump is outputted by the calculation process. On the other hand, when the same water pump is pointed in the output mode 2, it is determined that the command to stop the water supply pump has been issued and the control command to stop the pump is outputted to the plant by the calculation process.

In this manner, in other embodiment of the present embodiment, the calculation process is effected based on the output mode of the pointer and the pointing point recognized by the image processing to output the control command to control the plant.

The pointers of FIGS. 61 and 70 may be used in the embodiments of FIGS. 1, 11, 20, 26'30 and 52. The type of the pointer may be recognized by setting different output mode for each operator to the pointer.

What is claimed is:

1. An information display apparatus comprising:

a display device having a display screen;

a camera for taking a picture said display screen;

means for making said display device display a marker on each of a central area and a peripheral area of said display screen;

means for determining positions of said markers on an image of said display screen taken by said camera;

means for storing the positions of said markers on said display screen and the positions of said markers on said image;

means for determining a position of a pointing signal on said image, said pointing signal being outputted from a pointer onto said display screen; and means for determining a position of said pointing signal on said display screen from the position of said pointing signal on said image based on the stored position of that one of the markers which is located in the proximity of said pointing signal on said display screen and the stored position of said one marker on said image.

2. The information display apparatus according to claim 1, wherein said position calibration information is in the form of a table correlating a plurality of said specified positions with corresponding positions of the images of said marks.

3. The information display apparatus according to claim 1, wherein said position calibration information includes translation formula derived based on a plurality of said specified positions and respectively of corresponding positions of said images of said marks.

4. The information display apparatus according to claim 1, wherein said means for generating display information generates display information on a plurality of said marks to be simultaneously displayed in said area.

5. The information display apparatus according to claim 1, further comprising means for determining a new specified position of a new mark in said area and means for generating display information on the new mark at the new specified position.

6. The information display apparatus according to claim 1, wherein said means for determining a position of said pointing signal on said display screen determines the position of said pointing signal on said display screen by interpolation.

7. The information display apparatus according to claim 6, wherein each of said markers is a visible ray and said pointing signal is an infrared ray, and said information display apparatus further comprising means for changing a sensitivity of said camera between a time when the display screen on which said markers are displayed is taken and a time when the display screen on which said pointing signal is inputted is taken.

8. The information display apparatus according to claim 1, wherein each of said markers is a visible ray and said pointing signal is an infrared ray, and said information display apparatus further comprising means for changing a sensitivity of said camera between a time when the display screen on which said markers are displayed is taken a time and when the display screen on which said pointing signal is inputted is taken.

9. The information display apparatus according to claim 8, further comprising means for displaying a new marker between said markers on said display screen when said markers are apart from each other not less than a predetermined distance on said image.

10. The information display apparatus according to claim, 1, and further comprising means for displaying a new marker between said markers on said display screen when said markers are apart from each other not less than a predetermined distance on said image.

11. An information display apparatus according to claim 1, further comprising:

means for generating position calibration information using said specified positions of a plurality of said markers and corresponding position information representing said positions of said images of said plurality of said markers; and means for correcting the position of the image of said pointing signal by using said position calibration information to determine the position of said pointing signal in said area.

12. An information display apparatus comprising:

a display device having a display screen;

image pickup means for picking up said display screen;

means for generating display information on a mark of visible ray to be displayed at a specified position in an area of said display screen and for outputting said display information to said display device;

means for determining, when an image of said mark is displayed in said area, a position of said image of the mark in said area picked up with said image pickup means and for determining, when a point in said area is pointed to with a pointing signal of infrared ray outputted from a pointing means, a position of an image of said pointing signal in said area picked up with said image pickup means;

means for generating position calibration information using said specified positions of a plurality of the marks and corresponding position information on respective positions of images of the plurality of the marks; and means for correcting the position of the image of said pointing signal using said position calibration information to determine the position of the point pointed to in said area, wherein said image pickup means has an imaging sensitivity which is changeable between when picking up said visible ray and when picking up said infrared ray.

* * * * *

UNITED STATES PATENT AND TRADEMARK OFFICE
CERTIFICATE OF CORRECTION

PATENT NO. : 6,188,388 B1
DATED : February 13, 2001
INVENTOR(S) : Setsuo Arita et al.

It is certified that error appears in the above-identified patent and that said Letters Patent is hereby corrected as shown below:

Column 1,
Line 22, change "plant,," to -- plant, --.

Column 2,
Line 36, change "install" to -- installed --.
Line 40, change "install" to -- installed --.
Line 48, delete "displayed" (second occurrence).
Line 55, change "signa," to -- signal, --.

Column 3,
Line 4, delete "displayed" (second occurrence).

Column 4,
Line 4, change "leans" to -- lens --.

Column 5,
Lines 3-4, delete "is pointed".
Line 40, change "illustrate" to -- illustrates --.

Column 6,
Line 42, after "table," start new paragraph.
Line 66, change "has a" to -- has an --.

Column 8,
Line 16, change "is" to -- are --.
Line 17, change "is" to -- are --.
Line 24, change "$Y_2$" to -- $y_2$ --.
Line 50, change "affect" to -- effect --.

Column 9,
Line 44, after "of" do not start new paragraph.

Column 10,
Line 12, change "operator a" to -- operator A --.
Line 44, change "requires information are" to -- required information is --.

UNITED STATES PATENT AND TRADEMARK OFFICE
CERTIFICATE OF CORRECTION

PATENT NO.   : 6,188,388 B1
DATED        : February 13, 2001
INVENTOR(S)  : Setsuo Arita et al.

It is certified that error appears in the above-identified patent and that said Letters Patent is hereby corrected as shown below:

Column 11,
Line 37 change "SD," to -- 5D --.
Line 39, change "corresponds" to -- correspond --.

Column 12,
Line 6, change "indicate" to -- indicates --.

Column 13,
Line 9, change "repoints" to -- repoint --.
Line 26, change "outputs" to -- output --.

Column 15,
Line 3, change "flame" to -- frame --.

Column 18,
Line 37, change "The" to -- the --.

Column 20,
Line 30, change "manger" to -- manager --.

Column 21,
Line 28, change "mode", "rive" to -- "mode", "drive" --.
Line 44, change "An example where other" to -- As an example, another --.
Line 49, change "watch" to -- monitor --.
Line 56, change "MDRFP-A drip" to -- MDRFP-A TRIP --.

Column 22,
Line 34, after "FIG. 11" insert -- is --.

Column 23,
Line 46, change "is" to -- in --.

Column 24,
Line 37, after "display control unit" insert -- 20 --.
Line 53, after "that" insert -- which --.

UNITED STATES PATENT AND TRADEMARK OFFICE
CERTIFICATE OF CORRECTION

PATENT NO. : 6,188,388 B1
DATED : February 13, 2001
INVENTOR(S) : Setsuo Arita et al.

It is certified that error appears in the above-identified patent and that said Letters Patent is hereby corrected as shown below:

Column 25,
Line 32, change "no" to -- not --.
Line 53, change "indicate" to -- indicates --.

Column 26,
Line 48, change "$S_1$," to -- $S_{11}$ --.

Column 27,
Line 8, change "$S_{14}$-$S_{216}$)" to -- $S_{14}$ -$S_{16}$) --.

Column 28,
Line 35, change "affect" to -- effect --.

Column 29,
Line 58, change "$(x_1+X_2)/2$" to -- $(x_1+x_2/2$ --.
Line 60, change "int 104" to -- unit 104 --.

Column 30,
Line 64, change "affect" to -- effect --.

Column 32,
Line 37, after "unit" delete "which".

Column 33,
Line 26, change "quarrying" to -- querying --.
Line 47, change "affect" to -- effect --.
Line 49, change "leans" to -- lens --.
Line 59, change "leans are" to -- lens --.

Column 34,
Line 3, change "affect" to -- effect --.
Line 4, change "affect" to -- effect --.

Column 35,
Line 30, change "he" to -- the --
Line 54, change "$(x_i, y_i)$" to -- $(X_i, Y_i)$ --.

UNITED STATES PATENT AND TRADEMARK OFFICE
CERTIFICATE OF CORRECTION

PATENT NO. : 6,188,388 B1
DATED : February 13, 2001
INVENTOR(S) : Setsuo Arita et al.

Page 4 of 5

It is certified that error appears in the above-identified patent and that said Letters Patent is hereby corrected as shown below:

Column 36,
Line 6, before "unit" delete "10".
Line 25, after "difference" change "$\Delta y(=Y_{j+1}-y_j)$" to -- $\Delta y=(y_{j+1}-y_j)$ --; change "coordinate" to -- coordinates --.
Line 31, change "$(x_i, Y_{j+1})$" to -- $(x_i, y_{j+1})$ --.
Line 36, change "$(Y_j+ Y_{j+1})/2)$" to -- $(Y_j+ Y_{j+1})/2)$ --.
Line 48, change "affect" to -- effect --.
Line 64, change "CRT'S" to -- CRT's --.

Column 37,
Line 3, change "CRT'S" to -- CRT's --.

Column 38,
Line 35, change "$(x_r, Y_r)$" to -- $(x_r, y_r)$ --.
Line 42, change "$Y_r$" to -- $y_r$ --; change "$(X_r, Y_r)$" to -- $(x_r, y_r)$ --.
Line 44, change "Of" to -- of --.
Line 45, change "$(x_r, Y_r)$" to -- $(x_r, y_r)$ --.

Column 39,
Line 32, change "preset" to -- present --.

Column 40,
Line 48, change "user is hard" to -- user finds it hard --.
Line 49, change "avoid it" to -- avoid this --.

Column 41,
Line 49, change "$(X_r, Y_r)$" to -- $(x_r, y_r)$ --.

Column 42,
Line 11, change "deviated from" to -- misaligned with --.

Column 43,
Line 12, change "switch" to -- switches --.

UNITED STATES PATENT AND TRADEMARK OFFICE
CERTIFICATE OF CORRECTION

PATENT NO.   : 6,188,388 B1
DATED        : February 13, 2001
INVENTOR(S)  : Setsuo Arita et al.

It is certified that error appears in the above-identified patent and that said Letters Patent is hereby corrected as shown below:

Column 44,
Line 10, change "affect" to -- effect --.

Column 45,
Line 17, after "apparatus." start new paragraph.
Line 56, change "on/of" to -- on/off --.
Line 61, before "light" delete "on".

Column 46,
Line 3, change "output" to -- outputs --.
Line 8, change "leans" to -- lens --.

Column 47,
Line 19, after "picture" insert -- of --.

Column 48,
Line 11, change "a time and" to -- and a time --.

Signed and Sealed this

Fifteenth Day of January, 2002

Attest:

JAMES E. ROGAN
*Director of the United States Patent and Trademark Office*

*Attesting Officer*